US008452433B2

(12) United States Patent
Terada

(10) Patent No.: US 8,452,433 B2
(45) Date of Patent: May 28, 2013

(54) PATH SETTING METHOD AND APPARATUS FOR AUDIO SYSTEM, AND AUDIO SYSTEM

(75) Inventor: Kotaro Terada, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 229 days.

(21) Appl. No.: 12/731,092

(22) Filed: Mar. 24, 2010

(65) Prior Publication Data

US 2010/0246830 A1 Sep. 30, 2010

(30) Foreign Application Priority Data

Mar. 24, 2009 (JP) ................................. 2009-072910
Mar. 24, 2009 (JP) ................................. 2009-072911
Mar. 24, 2009 (JP) ................................. 2009-072912
Mar. 24, 2009 (JP) ................................. 2009-072913

(51) Int. Cl.
*G06F 17/00* (2006.01)
*H04B 3/00* (2006.01)

(52) U.S. Cl.
USPC .................................. 700/94; 381/77; 381/80

(58) Field of Classification Search
USPC ...... 700/94; 381/58, 77, 80, 81, 124; 370/386, 370/431, 422, 423
See application file for complete search history.

(56) References Cited

U.S. PATENT DOCUMENTS

| 7,150,032 | B1* | 12/2006 | Sadanaka et al. | 725/80 |
| 7,620,468 | B2* | 11/2009 | Shimizu | 700/94 |
| 7,830,906 | B2* | 11/2010 | Satoh et al. | 370/423 |
| 8,023,514 | B2* | 9/2011 | Shinozaki | 370/395.4 |
| 2002/0122559 | A1 | 9/2002 | Fay et al. | |
| 2003/0023975 | A1* | 1/2003 | Schrader et al. | 725/51 |
| 2007/0025568 | A1 | 2/2007 | Aiso et al. | |
| 2007/0147398 | A1 | 6/2007 | Upp et al. | |
| 2008/0294276 | A1 | 11/2008 | Nakayama | |
| 2009/0099672 | A1* | 4/2009 | Terada | 700/94 |

FOREIGN PATENT DOCUMENTS

| JP | 4-207432 A | 7/1992 |
| JP | 2007-116453 A | 5/2007 |
| JP | 2007-258968 A | 10/2007 |
| JP | 2007-259182 A | 10/2007 |
| JP | 2008-099264 | 4/2008 |

OTHER PUBLICATIONS

European Search Report mailed Sep. 8, 2010, for EP Application No. 10157137.0, five pages.
European Office Action mailed May 30, 2011, for EP Application No. 10157137.0, six pages.
Digital Audio Mixing System, brochure for "PM1D Version2", Yamaha Corporation, Japan, Nov. 2005 (Japanese and English versions), 12 pages, website: http://www.yamahaproaudio.com.
European Search Report mailed Dec. 13, 2012, for EP Application No. 12189991.8, nine pages.
Notice of Grounds for Rejection mailed Feb. 12, 2013, for JP Patent Application No. P2009-072193, with English Translation, six pages.
Notice of Grounds for Rejection mailed Feb. 12, 2013, for JP Patent Application No. P2009-072910, with English Translation, six pages.
Notice of Grounds for Rejection mailed Mar. 12, 2013, for JP Patent Application No. P2009072912, with English Translation, four pages.

* cited by examiner

*Primary Examiner* — Xu Mei
(74) *Attorney, Agent, or Firm* — Morrison & Foerster LLP

(57) ABSTRACT

In a mixing system where a console, engine and I/O devices, each possessing a plurality of supply sources and destinations, are connected to a network, a plurality of transmission channels of the network are allocated to the individual devices. In response to human operator's connection instruction given via the console for instructing a connection between a supply source possessed by one of the devices and a supply destination possessed by another of the devices, the device possessing the supply source transmits an audio signal of the supply source to the network using one of the transmission channels allocated to the device. The device possessing the signal supply destination, for which the connection instruction has been given, receives the audio signal transmitted via the transmission channel and supplies the received audio signal to the supply destination.

13 Claims, 15 Drawing Sheets

TRANSMISSION CHANNEL
ALLOCATION IN SOUND SIGNAL
STORAGE REGION 42

INPUT PATCH SETTING OF MIXER
INPUT PORT

OUTPUT PATCH SETTING OF MIXER
OUTPUT PORT

INPUT PATCH SETTING

NETWORK INPUT PATCH SETTING
OF EACH I/O DEVICE

NETWORK OUTPUT PATCH SETTING
OF EACH I/O DEVICE

PATCH SETTING SCREEN OF SD
(1) LOCAL CONNECTION (2) RECEPTION CONNECTION

PATCH SETTING SCREEN OF SS
(1) LOCAL CONNECTION (2) TRANSMISSION CONNECTION

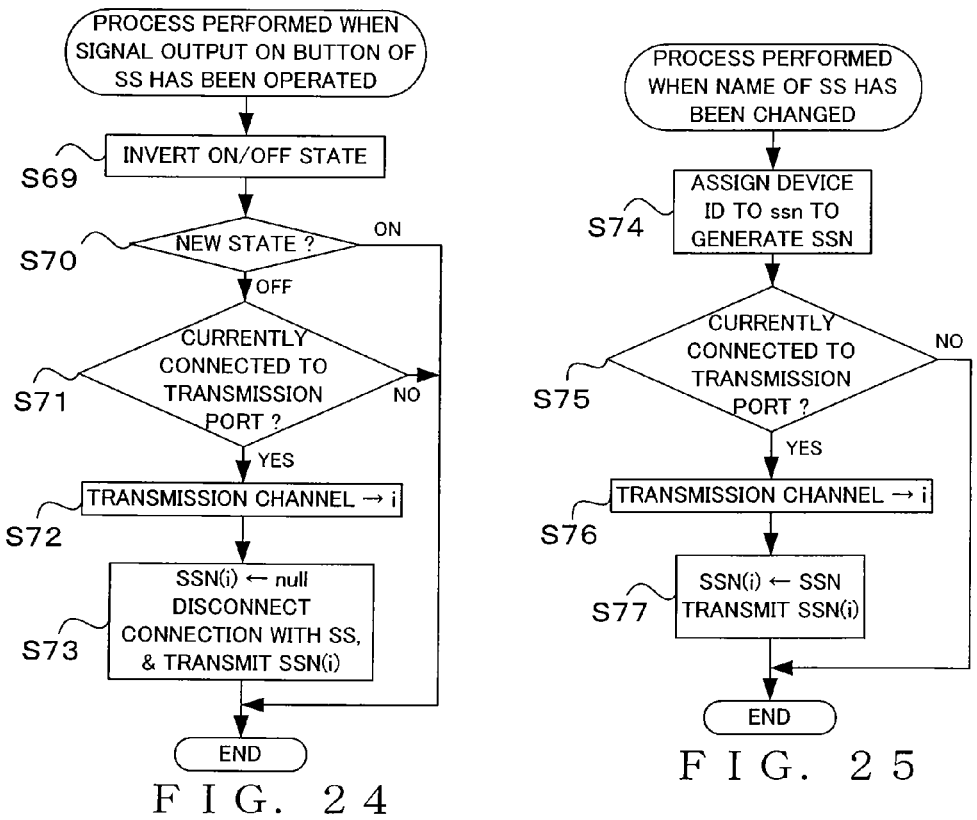
FIG. 24
FIG. 25
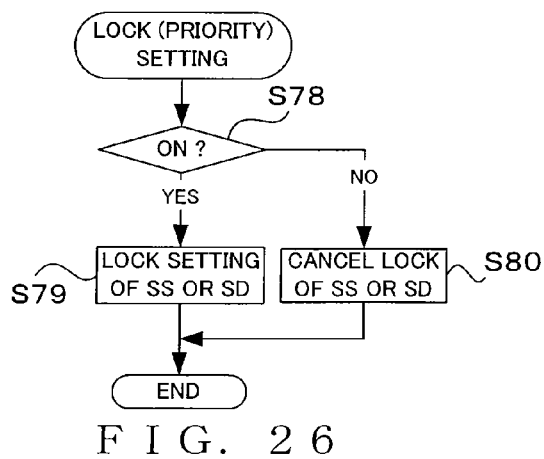
FIG. 26

|  |  | INPUT PORT | | | | | | | | | | |
|---|---|---|---|---|---|---|---|---|---|---|---|---|
|  |  | #1 I/O | | | | | | | | | | |
|  |  | SLOT2 | | | | | | | | SLOT3 | | |
|  |  | MTR 1 | MTR 2 | MTR 3 | MTR 4 | MTR 5 | MTR 6 | MTR 7 | MTR 8 | PIANO 1 | PIANO 2 |  |
| INPUT CHANNEL | TR CH61 | ○ |  |  |  |  |  |  |  |  |  |  |
|  | TR CH62 |  | ○ |  |  |  |  |  |  |  |  |  |
|  | TR CH63 |  |  | ○ |  |  |  |  |  |  |  |  |
|  | TR CH64 |  |  |  | ○ |  |  |  |  |  |  |  |
|  | TR CH65 |  |  |  |  | ○ |  |  |  |  |  |  |
|  | TR CH66 |  |  |  |  |  | ○ |  |  |  |  |  |
|  | TR CH67 |  |  |  |  |  |  |  |  | ○ |  |  |
|  | TR CH68 |  |  |  |  |  |  |  |  | ○ |  |  |
|  | TR CH69 |  |  |  |  |  |  |  |  |  | ○ |  |
|  | TR CH70 |  |  |  |  |  |  |  |  |  |  | ○ |
|  | TR CH71 |  |  |  |  |  |  |  |  |  |  |  |
|  | TR CH72 |  |  |  |  |  |  |  |  |  |  |  |

FIG. 29B

PATH SETTING METHOD AND APPARATUS FOR AUDIO SYSTEM, AND AUDIO SYSTEM

BACKGROUND

The present invention relates to a path setting method and apparatus for setting channels via which to transmit audio signals from desired signal supply sources to desired signal supply destinations in an audio system which comprises a plurality of devices and an audio network interconnecting the plurality of devices.

The present invention also relates to an audio system which comprises a control device, a plurality of devices and an audio network interconnecting the plurality of devices, and more particularly to a technique for setting connections between the devices.

The present invention also relates to an audio system which comprises a control device, a plurality of devices and an audio network interconnecting the plurality of devices, and more particularly to allocation of transmission channels provided in the network.

One of the mixing systems, which has been marketed by the assignee of the present application under the product name "PM1D", is a system implemented by separate hardware devices for performing a function of a mixing console (control device) operable by a human operator to make a desired input using various controls, a function of a signal processing section (mixing engine) for performing audio signal processing corresponding to human operator's input to the mixing console and a function of an input/output device (I/O device) for inputting and outputting audio signals. In this system, the mixing engine and the I/O device and the console are interconnected via digital-audio-signal communicating audio cables so that a plurality of digital audio signals can be communicated (transmitted and received) between the engine and the various devices. Further, the console and the engine are interconnected via a control cable for communicating control signals so that the engine can be remote-controlled by the console via the control cable.

The I/O device includes a plurality of input terminals (input ports) and a plurality of output terminals (output ports). An audio signal is input to each of the input ports, and an audio signal is output per each of the output ports. The mixing engine includes a plurality of input channels to which are connected the individual input ports of the I/O device. An audio signal input via each of the input ports is supplied to the input channel connected with the input port. The mixing engine includes a plurality of output channels to which are connected corresponding output ports of the I/O devices. An audio signal output from each of the output channels is supplied to the output port connected with the output channel. Throughout this specification, allocating one input channel as a connection destination of one signal supply source, i.e. allocating one signal supply destination as a connection destination of one signal supply source will hereinafter be referred to as "patch".

In the conventionally-known mixing systems, setting of input patches for allocating input channels to input ports of an I/O device and setting of output patches for allocating output channels to output ports is performed by an input patch function and output patch function, respectively, provided by a mixing console. More specifically, an operating screen equipped with the input patch function and output patch function is displayed on a display device of the console. A human operator is allowed to instruct connecting a desired input channel to a desired input port and connecting a desired output channel to a desired output port through simple operation on the operating screen, as disclosed in "PM1D Version_2brochure (pamphlet)", [online], made November, 2005 by Yamaha Corporation, Internet <URL:http://proaudio.yamaha.co.jp/downloads/brochures/mixers/pm1dv2_brochure/ja.pdf> (hereinafter referred to as non patent literature 1.

Further, audio network systems have heretofore been known, in which audio signals are transmitted between a plurality of nodes. In such audio network systems, the nodes are interconnected via network cables of the Ethernet (registered trademark) standard. The "nodes" are individual devices constituting the network. Japanese Patent Application Laid-open Publication NO. 2008-99264 (hereinafter referred to as "patent literature 1", for example, discloses an audio network where audio signals are transmitted among a plurality of nodes, connected to the network, by a "sound transmission frame" making a round through all of the nodes. The audio network thus arranged allows audio signals of hundreds of channels to be transmitted, in a substantially real-time manner, between all of the plurality of nodes, using a plurality of transmission channels provided in the sound transmission frame. Further, with the sound transmission frame, control data etc. of the Ethernet can be transmitted simultaneously with the audio signals, as disclosed in for example in patent literature 1.

In a case where the audio network disclosed in patent literature 1 is applied to a mixing system, i.e. where the I/O device, the engine and the console are interconnected via the audio network cables, the audio network intervenes among these devices. Thus, settings of input and output patches between two of the devices connected via the network must be made together with settings of the sound transmission frame (i.e., allocation of transmission channels), which would inconveniently involve cumbersome operations. In order to set a patch between an input port of the I/O device and an input channel of the engine, for example, it is necessary to make a setting for supplying a signal of the input port of the I/O device to a transmission channel and a setting for causing the engine to receive the signal of the transmission channel and allocating the input channel of the engine to the received signal, in addition to allocating the input channel to the input port.

Namely, in the case where the audio network disclosed in patent literature 1 is applied to the mixing system, the conventional input patch function and the conventional output patch function alone are not sufficient. Thus, it is presently desired to set, in a straightforward and simplified manner, a patch between an input port and an input channel of the two devices interconnected via the audio network and a patch between an output port and an output channel of the two devices.

Further, for audio signal routing (transmission channel setting) using a network, it is common to employ a routing scheme which sets a connection from a supply source of an audio signal to a supply destination of the audio signal and then reserves a transmission band (transmission channel) to be used for transmission of the audio signal through the connection. In such a routing scheme, negotiation is performed between the supply source and the supply destination after the supply source and destination confirming each other's presence on the network, so that a connection is set between the supply source and the supply destination and one transmission band (transmission channel) is allocated to the thus-set connection. Then, the connection is implemented by an audio signal being transmitted between the supply source and the supply destination using the allocated transmission band.

The aforementioned routing scheme, however, presents the inconvenience that it would take a long time until the connection is actually implemented after a human operator (user of the system in question) performs operation for setting the connection. Further, because the allocation of the transmission bands is made to the connections between the supply sources and the supply destinations, the aforementioned routing scheme also presents the inconvenience that complicated mechanisms would be required if the human operator wants to limit the transmission bands to be used by the device possessing the supply sources and by the device possessing the supply destinations.

Furthermore, in a mixing system where a mixing engine functions as a center of audio signal transmission paths of the system as in the mixing system disclosed in non-patent literature 1, all transmission paths of audio signals are set via the mixing engine. Thus, when the power supply to the engine has been turned off or the engine is disconnected, there would arise the inconvenience that signal processing, including transmission of audio signals, can no longer be performed in the system as a whole. Therefore, there is a demand for a mixing system in which, even when any one of devices in the system, including a device functioning as a center of audio signal transmission such as an engine, has been disconnected, can continue transmission of audio signals between the remaining devices.

Further, in the mixing system disclosed in non-patent literature 1, routing (i.e., transmission path setting) of audio signals is performed by a control device (console or personal computer) that controls the entire system. Namely, a human operator makes, via the control device, a patch setting for connecting a desired supply source and a desired supply destination, and transmission paths of audio signals are controlled in accordance with the patch setting. In such a construction, there would arise the inconvenience that the transmission paths of audio signals can no longer be controlled when the control device has been disconnected from the mixing system in operation. Thus, there is a demand for a mixing system which, even when the control device (e.g., console) for controlling the entire system has been disconnected, can continue controlling the transmission paths of audio signals.

Furthermore, if the mixing system is constructed in such a manner that the transmission paths of audio signals can be controlled even with no control device being present in the mixing system, and when a control device has been newly connected to the mixing system in operation, there is a possibility of discrepancy occurring between transmission paths of audio signals set previously with no control device present in the mixing system and transmission paths set with the newly connected control device. Such discrepancy can be eliminated by synchronizing between data of the control device and data of the individual other devices (i.e., overwriting the data of one of the control device and other devices with the data of the other). At that time, it is desirable that synchronizing directions for connections to particular supply sources and connections between particular devices can be controlled in accordance with a user's (or human operator's) desire.

Furthermore, if the transmission bands (transmission channels) have run short, part of the connections set by the human operator can no longer work. In such a case, it is difficult for the conventionally-known technique to allow, through simple control, a human operator's desire to be reflected in which of the connected connections should be caused to work preferentially.

Furthermore, when the transmission bands (transmission channels) have run short and any of the transmission channels currently in use has to be released, it is difficult for the conventionally-known technique to allow a human operator's desire to be reflected in which of the transmission channels currently in use for connections should be released.

It is desirable that each transmission path to be reserved as a permanent audio signal transmission path should not be made an object of the release or should be less likely to be made an object of the release.

SUMMARY OF THE INVENTION

In view of the foregoing, it is an of the present invention to provide an improved path setting method and apparatus which can set, in a straightforward and simplified manner, allocation between an input port and an input channel and between an output port and an output channel in a mixing system using an audio network.

It is another object of the present invention to provide an improved audio system which, even when any one of devices in the system has been disconnected, can continue transmission of an audio signal between the remaining devices.

It is still another object of the present invention to provide an improved audio system which can control a transmission path of an audio signal even with no control device present in the system. It is still another object of the present invention to provide an improved audio system which, even after a control device is newly connected to the system, can leave or maintain effective settings of an audio signal transmission path made with no control device present in the system.

It is still another of the present invention to provide an improved audio system which can allocate a transmission channel preferentially to a connection setting desired by a human operator so that the connection setting is implemented preferentially through a simple operation.

In order to accomplish the above-mentioned objects, the present invention provides a path setting method for setting a path for transmitting an audio signal from a desired signal supply source to a desired signal supply destination in an audio system including a control device, a plurality of devices and an audio network connecting the control device and the plurality of devices, each of the plurality of devices having at least one of a plurality of signal supply sources and a plurality of signal supply destinations, the audio network having a plurality of transmission channels for transmitting audio signals of a plurality of channels between the plurality of devices. The path setting method comprises: a first allocation step of allocating the transmission channels of the network to individual ones of the plurality of devices so that each of the devices can reserve a predetermined number of the transmission channels; an instruction reception step of the control device receiving a connection instruction instructing a connection between one signal supply source and one signal supply destination; a second allocation step of, in response to the connection instruction, allocating to the connection instruction a transmission channel, currently unused for transmission of an audio signal, from among the predetermined number of the transmission channels having been reserved, by the first allocation step, for the device possessing the one signal supply source; a supply source setting step of causing the device possessing the one signal supply source, for which the connection instruction has been given, to transmit an audio signal, supplied from the signal supply source, by use of the transmission channel allocated to the connection instruction by the second allocation step; a supply destination setting step of causing the device possessing the one signal supply destination, for which the connection instruction has been given, to receive the audio signal of the transmission channel set by the supply source setting step and to supply the received audio signal to the one signal supply destination; and a warning step of, when the second allocation step can not allocate any transmission channel to the connection instruction even though the connection instruction has been given, warning a user that a connection based on the connection instruction is not implemented by the supply source setting step and the supply destination setting step being not performed.

In response to the connection instruction received by the control device, the device possessing (having) the signal supply source allocates one of the transmission channels, allocated to (i.e., reserved for) the device, to the connection instruction and transmits an audio signal of the signal supply source, for which the connection instruction has been given, to the network. On the other hand, the device possessing (having) the signal supply destination, for which the connection instruction has been given, receives the audio signal transmitted via the transmission channel and supplies the received audio signal to the signal supply destination. When any transmission channel can not be allocated to the connection instruction even though the connection instruction has been given, a connection based on the connection instruction is not implemented, and a user (or human operator of the audio system) is warned to that effect (i.e. the connection based on the connection instruction is not be implemented).

According to the present invention constructed in the aforementioned manner, merely giving a connection instruction that instructs a connection from a signal supply source to a signal supply destination can select one of the plurality of transmission channels allocated to the device possessing the signal supply source for which the connection instruction has been given. Namely, in an audio system, such as a mixing system, employing an audio network, the present invention can achieve the superior advantageous benefit that a connection between a signal supply source and a signal supply destination with the network intervening therebetween can be set in a straightforward and simple manner. Further, because the transmission channel allocation responsive to the connection instruction is performed within the limits of the transmission channels allocated to the individual devices, the present invention can limit transmission bands (the number of the transmission channels) to be used from the device, possessing the signal supply source, to the network.

According to another aspect of the present invention, there is provided a path setting apparatus for setting a path for transmitting an audio signal from a desired signal supply source to a desired signal supply destination in an audio system including a plurality of devices and an audio network connecting the plurality of devices, each of the plurality of devices having at least one of a plurality of signal supply sources and a plurality of signal supply destinations, the audio network having a plurality of transmission channels for transmitting audio signals of a plurality of channels between the plurality of devices, each of the plurality of devices transmitting audio signals of a plurality of channels between the device and another of the devices by use of a predetermined number of the transmission channels allocated thereto. The path setting apparatus comprises: an instruction reception section which receives a connection instruction instructing a connection between one signal supply source and one signal supply destination; a transmission channel allocation section which, in response to the connection instruction received by the instruction reception section, allocates to the connection instruction a transmission channel, currently unused for transmission of an audio signal, from among the predetermined number of the transmission channels having been allocated to the device possessing the one signal supply source; a supply source setting section which causes the device possessing the one signal supply source, for which the connection instruction has been given, to transmit an audio signal of the one signal supply source by use of the transmission channel allocated to the connection instruction by the transmission channel allocation section; a supply destination setting section which causes the device possessing the one signal supply destination, for which the connection instruction has been given, to receive the audio signal of the transmission channel set by the supply source setting section and to supply the received audio signal to the one signal supply destination for which the connection instruction has been given; and a warning section which, when the transmission channel allocation section cannot allocate any transmission channel to the connection instruction even though the connection instruction has been given, warns a user that a connection based on the connection instruction is not implemented by operations of the supply source setting section and the supply destination setting section being not performed.

According to still another aspect of the present invention, there is provided an audio system including a control device, a plurality of devices and an audio network connecting the plurality of devices, each of the plurality of devices having at least one of a plurality of signal supply sources and a plurality of signal supply destinations, the audio network having a plurality of transmission channels for transmitting audio signals of a plurality of channels between the plurality of devices, the control device comprising: a band management section which, in response to band managing operation by a user, controls numbers of the transmission channels to be reserved by individual ones of the devices; and a connection setting section which, in response to connection setting operation for instructing a connection between a signal supply source possessed by one of the plurality of devices and a signal supply destination possessed by another of the plurality of devices, changes signal supply destination information stored in the device possessing the signal supply source and signal supply source information stored in the device possessing the signal supply destination, the signal supply destination information being information indicative of a signal supply destination possessed by another of the devices to which the signal supply source is to be connected, the signal supply source information being information indicative of a signal supply source possessed by another of the devices to which the signal supply destination is to be connected. Each of the plurality of devices comprises: a reservation section which reserves a plurality of the transmission channels under control of the band management section; a storage section which has stored therein signal supply destination information pertaining to each signal supply source possessed by the device and signal supply source information pertaining to each signal supply destination possessed by the device, stored content of the storage section being changed by the connection setting section; a transmission setting section which, on the basis of each of the signal supply destination information stored in the storage section, allocates one of the transmission channels, reserved for the device by the reservation section, to each signal supply source possessed by the device and makes a setting for outputting an audio signal, supplied from the signal supply source, via the transmission channel allocated to the signal supply source; an output notification section which notifies all of other devices on the network of signal output information indicative of respective signal supply sources of audio signals being outputted by the device via the plurality of the transmission channels reserved for the device by the reservation section; and a reception setting section which, on the basis of each of the signal supply source information stored in the storage section and signal output information notified by the output notification section of another of the devices and for each signal supply destination possessed by the device, determines a transmission channel via which an audio signal is to be received and makes a setting for receiving the audio signal from the determined transmission channel. Regardless of whether or not a device indicated by the signal supply destination information stored in the storage section of each of the devices is currently connected to the audio network, the reservation section of each of the devices reserves a plurality of the transmission channels, and the transmission setting section of the device makes a setting, on the basis of the signal supply destination information, for outputting an audio signal, supplied from the signal supply source, via one of the reserved transmission channels.

Once the user performs connection setting operation, signal supply destination information stored in the device possessing the signal supply source and signal supply source information stored in the device possessing the signal supply destination is changed. In the device possessing the signal supply source, the transmission setting section makes a setting, on the basis of the changed signal supply destination information, for outputting an audio signal, supplied from the signal supply source, via one of the reserved transmission channels and transmits the audio signal, supplied from the signal supply source, to the audio network. At that time, content (signal output information indicative of the transmission channel and the signal supply source) of the transmission setting made by the transmission setting section is notified to all of the other devices on the network. In the device possessing the signal supply destination, the reception setting section determines, on the basis of signal output information notified by another of the devices and the changed signal supply source information, a transmission channel via which an audio signal is to be received and makes a setting for supplying the audio signal, received via the determined transmission channel, to the signal supply destination, and receives the audio signal, supplied from the signal supply source of another device, via the network and outputs the received signal via the signal supply destination.

According to the present invention, the device possessing the signal supply source makes a setting for transmitting the audio signal of the supply source to the network, while the device possessing the signal supply destination makes a setting for receiving the audio signal from the network and supplying the received audio signal to the signal supply destination. Thus, even when some of the devices in the system is not connected to the network, transmission of the audio signal between the device possessing the signal supply source and the device possessing the signal supply destination can be performed. Namely, even when some of the devices in the system is not connected to the network, the transmission of the audio signal can be continued between the remaining devices. Further, the device possessing the signal supply source only need to always perform the same operation by the transmission setting section, regardless of whether or not the device possessing the signal supply destination, to which the signal supply source is to be connected, is currently connected to the audio network, the present invention can simplify control operation of the transmission setting section to be performed in each of the devices (i.e. simplify a program for causing a control section to perform the control operation in each of the devices).

An embodiment of the present invention may be constructed in such a manner that, when the transmission setting section cannot allocate any transmission channel to the signal supply source on the basis of the signal supply destination information, a signal supply source of a silent signal in the other device indicated by the signal supply destination information is connected to a signal supply destination indicated by the signal supply destination information.

As another embodiment of the present invention, the transmission setting section of the device in question may be constructed in such a manner that, even where signal supply destination information pertaining to a signal supply source that is not possessed by the device is stored in the storage section, the transmission setting section does not allocate any transmission channel to the signal supply source on the basis of the signal supply destination information. Namely, by the transmission setting section in each of the devices being constructed to not allocate any transmission channel to a signal supply source not present in the network, the present invention can prevent the limited number of the transmission channels, reserved for each of the devices, from undesirably running short.

According to still another embodiment of the present invention, there is provided an audio system including a control device, a plurality of devices and an audio network connecting the plurality of devices, each of the plurality of devices having at least one of a plurality of signal supply sources and a plurality of signal supply destinations, the audio network having a plurality of transmission channels for transmitting audio signals of a plurality of channels between the plurality of devices, the control device comprising: a band management section which, in response to band managing operation by a user, controls numbers of the transmission channels to be reserved by individual ones of the devices; and a connection setting section which, in response to connection setting operation for instructing a connection between a signal supply source possessed by one of the plurality of devices and a signal supply destination possessed by another of the plurality of devices, changes signal supply destination information stored in the device possessing the signal supply source and signal supply source information stored in the device possessing the signal supply destination, the signal supply destination information being information indicative of a signal supply destination possessed by another of the devices to which the signal supply source is to be connected, the signal supply source information being information indicative of a signal supply source possessed by another of the devices to which the signal supply destination is to be connected. Each of the plurality of devices comprises: a reservation section which reserves a plurality of the transmission channels under control of the band management section; a storage section which has stored therein signal supply destination information pertaining to each signal supply source possessed by the device and signal supply source information pertaining to each signal supply destination possessed by the device, stored content of the storage section being changed by the connection setting section; a transmission setting section which, on the basis of each of the signal supply destination information stored in the storage section, allocates one of the transmission channels, reserved by the reservation section, to each signal supply source possessed by the device and makes a setting for outputting an audio signal, supplied from the signal supply source, via the transmission channel allocated to the signal supply source; an output notification section which notifies all of other devices on the network of signal output information indicative of respective signal supply sources of audio signals being outputted by the device via the plurality of the transmission channels reserved for the device by the reservation section; a reception setting section which, on the basis of each of the signal supply source information stored in the storage section and signal output information notified by the output notification section of another of the devices and for each signal supply destination possessed by the device, determines a transmission channel via which an audio signal is to be received and makes a setting for receiving the audio signal from the determined transmission channel; and a connection updating section which sets, in response to connection setting operation by the user, a connection between a signal supply source possessed by the device and a signal supply destination possessed by another of the devices or between a connection between a signal supply destination possessed by the device and a signal supply source possessed by another of the devices and updates, in accordance with content of the set connection, the signal supply destination information and the signal supply source information stored in the storage section of the device.

According to the present invention, a transmission path of an audio signal is controlled by the control device not only controlling the reservation of the transmission channels in each of the devices within the audio system but also setting, in response to user's connection setting operation, a connection between a device possessing a signal supply source and a device possessing a signal supply destination and making a setting for receiving the audio signal and supplying the receiving audio signal to the signal supply destination. On the basis of the connection set by the control device, each of the devices makes a setting for transmitting the signal from a signal supply source, possessed thereby, via one of the transmission channels (implementation of a transmission connection), determines a transmission channel via which an audio signal is to be received and makes a setting for supplying the audio signal of the determined transmission channel to the signal supply destination (implementation of a reception connection). In addition, each of the devices includes the connection updating section. Thus, the user can perform connection setting operation for each of the devices, so that a connection between a signal supply source possessed by one of the devices and a signal supply destination possessed by another of the devices or between a signal supply destination possessed by one of the devices and a signal supply source possessed by another of the devices can be set and the thus-set connection can be implemented within limits of the number of the transmission channels reserved for that device.

According to the basic principle of the present invention, the control device not only controls the reservation of the transmission channels in each of the devices within the audio system but also sets a connection between a signal supply source possessed by each of the device and a signal supply destination, to thereby control a transmission path of an audio signal. Further, according to the present invention, when the control device has come to be no longer present in the audio system in operation due to, for example, disconnection from the audio system, the user can perform connection setting operation for each of the devices, so that a transmission path of an audio signal can be controlled appropriately within limits of the transmission channels reserved for that device.

In an embodiment of the audio system of the present invention, the control device further comprises: a storage section which stores connection information indicative of the connection set by the connection setting section; an identification section which identifies a predetermined signal supply source in a predetermined one of the plurality of devices; and a synchronization section which, when the control device has been newly connected to the audio system in operation, 1) updates, on the basis of the connection information stored in the storage section, all of the signal supply destination information and the signal supply source information, stored in respective ones of the storage sections of the plurality of devices, except for the signal supply destination information and the signal supply source information pertaining to the signal supply source identified by the identification section and 2) updates the connection information, stored in the storage section of the control device, on the basis of the signal supply destination information and the signal supply source information pertaining to the signal supply source identified by the identification section.

In another embodiment of the audio system of the present invention, the control device further comprises: a storage section which stores connection information indicative of the connection set by the connection setting section; an identification section which identifies predetermined two devices, from among the plurality of devices, possessing a signal supply source and a signal supply destination, respectively, for which a connection has been set by the connection setting section; and a synchronization section which, when the control device has been newly connected to the audio system in operation, 1) updates, on the basis of the connection information stored in the storage section, all of the signal supply destination information and the signal supply source information, stored in respective ones of the storage sections of the plurality of devices, except for the signal supply destination information and the signal supply source information pertaining to the connection between the two devices identified by the identification section and 2) updates the connection information, stored in the storage section of the control device, on the basis of the signal supply destination information and the signal supply source information pertaining to the connection between the two devices identified by the identification section.

In still another embodiment of the audio system of the present invention, the control device further comprises: a storage section which stores connection information indicative of the connection set by the connection setting section; an identification section which identifies predetermined two devices, from among the plurality of devices, possessing a signal supply source and a signal supply destination, respectively, for which a connection has been set by the connection setting section; and a synchronization section which, when the control device has been newly connected to the audio system in operation, 1) updates, on the basis of the connection information stored in the storage section, all of the signal supply destination information and the signal supply source information, stored in respective ones of the storage sections of the plurality of devices, except for the signal supply destination information and the signal supply source information pertaining to the connection between the two devices identified by the identification section and 2) updates the connection information, stored in the storage section of the control device, on the basis of all information except for the signal supply destination information and the signal supply source information pertaining to the connection between the two devices identified by the identification section.

Thus, of data about a transmission path set for each of the devices, i.e. signal supply destination information and signal supply source information stored in the storage section of each of the devices, with the control device not present in the audio system, the signal supply destination information and signal supply source information pertaining to a signal supply source identified by the identification section or the signal supply destination information and signal supply source information pertaining to two mutually-connected devices, can be maintained as before even when the control device has been newly connected to the audio system. Namely, when the control device has been newly connected to the audio system, the present invention can maintain previous settings, made prior to the new connection of the control device, of the signal supply destination information and signal supply source information pertaining to a signal supply source identified by the identification section or the signal supply destination information and signal supply source information pertaining to two mutually-connected devices. Conversely, the present invention may maintain all of the other previous settings than those of the signal supply destination information and signal supply source information pertaining to a signal supply source identified by the identification section or the signal supply destination information and signal supply source information pertaining to two mutually-connected devices. In this way, the present invention can advantageously maintain settings of any desired transmission path of the mixing system.

According to still another aspect of the present invention, there is provided an audio system including a control device, a plurality of devices and an audio network connecting the plurality of devices, each of the plurality of devices having at least one of a plurality of signal supply sources and a plurality of signal supply destinations, the audio network having a plurality of transmission channels for transmitting audio signals of a plurality of channels between the plurality of devices, the control device comprising: a band management section which, in response to band managing operation by a user, increases or decreases numbers of the transmission channels to be reserved by individual ones of the devices; a priority setting section which sets a given one of the plurality of signal supply sources of each of the devices at a higher priority than any other signal supply source of the device; and a connection updating section which, in response to connection setting operation instructing a connection between a signal supply source possessed by one of the plurality of devices and a signal supply destination possessed by another of the plurality of devices, changes signal supply destination information stored in the device possessing the signal supply source and signal supply source information stored in the device possessing the signal supply destination, the signal supply destination information being information indicative of a signal supply destination possessed by another of the devices to which the signal supply source is to be connected, the signal supply source information being information indicative of a signal supply source possessed by another of the devices to which the signal supply destination is to be connected. Each of the plurality of devices comprises: a reservation section which reserves a plurality of the transmission channels under control of the band management section; a storage section which has stored therein signal supply destination information pertaining to each signal supply source possessed by the device and signal supply source information pertaining to each signal supply destination possessed by the device, stored content of the storage section being changed by the connection setting section; a transmission setting section which, on the basis of each of the signal supply destination information stored in the storage section, allocates one of the transmission channels, reserved for the device by the reservation section, to each signal supply source possessed by the device and makes a setting for outputting an audio signal, supplied from the signal supply source, via the transmission channel allocated to the signal supply source, the transmission setting section allocating one of the transmission channels to the signal supply source, set at the higher priority by the priority setting section, with a priority over the other signal supply source; an output notification section which notifies all of other devices on the network of signal output information indicative of respective signal supply sources of audio signals being outputted by the device via the plurality of the transmission channels reserved for the device by the reservation section; and a reception setting section which, on the basis of each of the signal supply source information stored in the storage section and signal output information notified by the output notification section of another of the devices and for each signal supply destination possessed by the device, determines a transmission channel via which an audio signal is to be received and makes a setting for receiving the audio signal from the determined transmission channel.

Further, because the control device includes the priority setting section, the present invention allows the human operator (user) to set a priority (level) for each of a plurality of signal supply sources of each of the devices. The control device not only controls the reservation of the transmission channels in each of the devices within the audio system but also, in response to user's connection setting operation, sets a connection between a device possessing a signal supply source and another device possessing a signal supply destination and makes a setting for receiving an audio signal and supplying the receiving audio signal to the signal supply destination. On the basis of the connection set by the control device, each of the devices makes a setting for transmitting a signal from a signal supply source, possessed thereby, via one of the transmission channels (implementation of a transmission connection), and determines a transmission channel via which an audio signal is to be received and makes a setting for supplying the audio signal of the determined transmission channel to a signal supply destination (implementation of a reception connection). At that time, the transmission setting section of each of the devices allocates one of the transmission channels to the signal supply source, set at a higher priority by the priority setting section, with a priority over the other signal supply sources. In this way, the transmission connection pertaining to the signal supply source of the higher priority can be implemented with a priority. Because a priority (level) is set for each of a plurality of signal supply sources of each of the devices as noted above, the present invention advantageously allows a particular connection setting, desired by the human operator, to be implemented preferentially, by allocating the transmission channels to signal supply sources on a priority basis, i.e. in a decreasing order of priorities. This priority control can be implemented as closed control in the transmission connection section within a device possessing signal supply sources, i.e. without taking into consideration relationship with another device having signal supply destinations to which the signal supply sources are to be connected. Thus, the priority control of the invention can achieve a superior advantageous benefit unique to the present invention where transmission channels are allocated to signal supply sources.

In an embodiment of the audio system of the present invention, the transmission setting section of each of the devices further comprises a cancellation section which, when control has been performed by the band management section of the control device for decreasing the number of the transmission channels reserved for the device and if the number of the transmission channels decreased by the control is smaller than a number of the transmission channels already allocated to signal supply sources in the device, cancels allocation of the already allocated transmission channels except for the transmission channel allocated to the signal supply source set at the higher priority. Further, the reservation section of each of the devices is arranged in such a manner that, when the allocation of the already allocated transmission channels has been canceled by the transmission setting section of the device, the reservation section releases the transmission channels, for which the allocation has been canceled, from the reservation for the device.

Also, when the number of the transmission channels reserved for the device is decreased, and if the decreased number of the transmission channels is smaller than the number of the transmission channels already allocated to signal supply sources in the device, the present invention cancels the allocation of the already allocated transmission channels except for the transmission channel allocated to a particular signal supply source having been set at the higher priority, and also releases the transmission channels, for which the allocation has been canceled, from the transmission channel reservation for the device. Therefore, each connection of a higher priority is not made, or less likely to be made, an object of the release. In this way, the present invention can perform control such that, even when the number of the transmission channels reserved for the device is decreased, each transmission channel allocated to a signal supply source of a higher priority is not made, or less likely to be made, an object of the release.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 24 is a flow chart showing a process performed by any one of the devices in response to human operator's operation of a signal output ON/OFF setting portion displayed on the signal supply sour (SS) patch setting screen of the device of FIG. 21;

FIG. 25 is a flow chart showing a process performed by any one of the devices when the name of the signal supply source has been changed on the SS patch setting screen of FIG. 21;

FIG. 26 is a flow chart showing a process performed by the control device when a lock ON/OFF setting has been changed;

FIG. 29B is a patch setting screen for setting a connection between an input port and a transmission channel.

DETAILED DESCRIPTION

The following describe a mixing system that employs a path setting method or apparatus of the present invention.
—Outline of the Mixing System—

Figure 1:
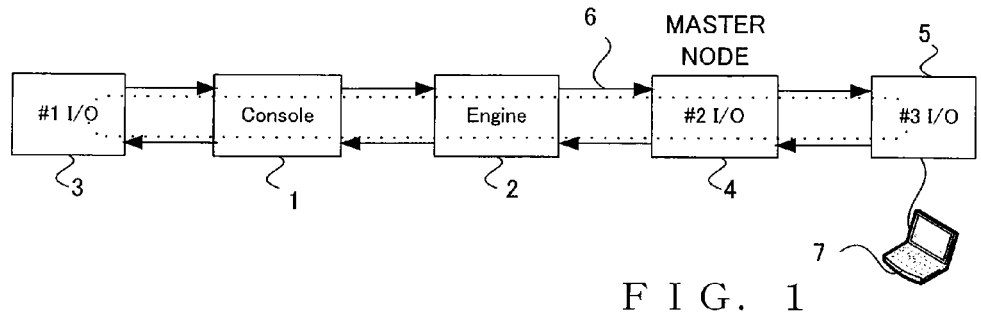
FIG. 1 is a block diagram showing an example general setup of a mixing system constructed as an embodiment of an audio system of the present invention.

FIG. 1 is a block diagram outlining the mixing system that uses the path setting method or apparatus according to an embodiment of the present invention.

The mixing system of FIG. 1 includes a mixing console 1, a mixing engine 2 and a plurality of input/output devices (I/O devices) 3-5. These devices are interconnected via an audio network 6. The audio network 6 is a network that transmits various data, including audio signals in transmission frames among the plurality of devices by use of the transmission scheme disclosed patent literature 1 (Japanese Patent Application Laid-open Publication NO. 2008-99264) discussed above. The audio network 6 includes a plurality of transmission channels and is capable of transmitting, substantially in real time, audio signals of a plurality of channels among the devices using the plurality of transmission channels. The "transmission frame" is capable of transmitting not only audio signals but also various control data including remote-controlling data.

The mixing console 1 is an "audio control console" that includes a multiplicity of controls including channel strips corresponding to the plurality of channels and that receives operation performed by a human operator. The human operator (user of an audio system) performs control of various operations of the mixing system, including adjustments (such as level adjustments), data entry, etc. using the controls of the console 1. Various control data corresponding to various operation performed by the human operator (or user) on the console 1 are transmitted to the other devices (engine 2 and I/O devices 3-5), so that the engine 2 and I/O devices 3-5 operate on the basis of the transmitted control data. Namely, the console 1 is a control device that remote-controls operation of the other devices via the audio network 6.

The I/O devices 3-5 has a function of transmitting, to the audio network 6, audio signals supplied from signal supply sources SS of a plurality of channels (not shown), and a function of supplying, to signal supply destinations SD of a plurality of channels (not shown), audio signals of a plurality of channels received from the audio network 6. For example, three devices, i.e. the first I/O device (#1 I/O) 3, second I/O device (#2 I/O) and third I/O device (#3 I/O) 5, are connected to the mixing system of FIG. 1.

The mixing engine 2 is in the form of a DSP (Digital Signal Processor) that performs signal processing on digital audio signals. On the basis of operation performed by the human operator via the console (control device) 1, the mixing engine 2 can receive audio signals of one or more channels transmitted from the I/O devices 3-5, perform signal processing on the received audio signals of one or more channels and transmit the resultant processed audio signals of one or more channels to the audio network 6.

Further, a personal computer (PC) 7 is connectable to each of the console 1, engine 2 and I/O devices 3-5. In FIG. 1, the PC 7 is shown as connected to the third I/O device 5. The PC 7 connected to any one of the devices can be used as a control device for remote-controlling operation of each of the devices on (or connected to) the audio network 6. In the case where the PC 7 is used as a control device, control data output from the PC 7 are transmitted from the third I/O device 5 to the other devices by way of the audio network 6.

The construction of the mixing system shown in FIG. 1 is a mere illustrative example, and the number and types of the devices constituting the mixing system are not limited to the aforementioned.

In FIG. 1, each of the devices 1-5 connected to the audio network 6 includes two sets of reception and transmission interfaces each for unidirectional communication. Two of the devices are interconnected by interconnecting one of the sets of reception and transmission interfaces of one of the devices and one of the sets of reception and transmission interfaces of the other device using a network cable of the Ethernet (registered trademark) standard. Because each of the devices includes two sets of reception and transmission interfaces as noted above, it is connectable to two devices. For example, the engine 2 is connected to the console 1 by means of one of the sets of reception and transmission interfaces and connected to the second I/O device 4 by means of the other set of reception and transmission interfaces.

The individual devices (console 1, engine 2 and I/O devices 3-5) are connected together in series to have two ends as a whole, by each of the devices being connected with one or two adjoining ones of the devices. In the illustrated example of FIG. 1, the first I/O device 3 and the third I/O device 5 are the above-mentioned two ends. Because of the provision of the two sets of reception and transmission interfaces, each of the devices can perform a transfer process for, while receiving a transmission frame from an upstream device on a transmission path, transmitting a transmission frame to a downstream device on the transmission path, in two directions, i.e. outward and return direction. In this way, there can be formed a ring-shaped data transmission path which circulates a transmission frame among the five devices (console 1, engine 2 and I/O devices 3-5).
—Master Node—

Any one of five devices (console 1, engine 2 and I/O devices 3-5) on the audio network 6 is set as a "master node" or "master node device". In the illustrated example of FIG. 1, the second I/O device 4 is set as the master node.

Per sampling period (or cycle) of a predetermined sampling frequency, the master node creates a transmission frame and sends the thus-created transmission frame to the audio network 6. All of the other devices than the master node are set as slave nodes (or slave node devices), each of which performs the transfer process for, while receiving a transmission frame from an upstream device on the transmission path, transmitting the transmission frame to a downstream device on the transmission path. Because the device located at each of the two ends of the transmission path functions as a turn (loop-back end) of the transmission path, it returns a transmission frame, transferred from an adjoining device, to the same adjoining device. This transfer process is not performed in such a manner that each of the devices first receives an entire transmission frame and then transfers the entire transmission frame to a downstream device on the transmission path, but performed in such a manner that each of the devices sequentially transfers signals of a transmission frame, beginning with the frame's leading end, to a downstream device on the transmission path while receiving the transmission frame from an upstream device on the transmission path. By each transmission frame being set at an appropriate size on the basis of conditions, such as the sampling period and communication speed (transmission band width), the transmission frame can be caused to make a round through all of the devices on the audio network 6 within one sampling period.

The master node is also a word clock master of word clocks intended to synchronize, among the devices on the audio network 6, timing of the sampling period for processing waveform data. Each of the slave node devices generates, in synchronism with a time point at which it has started reception of a transmission frame, a word clock pulse that is a signal for defining a waveform data processing sampling period, to thereby synchronize its processing timing of waveform data with timing of a sampling period (word clock pulse) in the master node.

Further, in the instant embodiment, the master node performs, in a centralized manner, management of states of later-described transmission channel allocation to the individual devices, more specifically control of the numbers of transmission channels to be reserved by the individual devices. Namely, in the instant mixing system, the master node functions as a band management section that controls the numbers of transmission channels to be reserved by the individual devices. Note that a process for reserving the number of transmission channels is itself performed separately by each individual one of the devices, as will be later described.

—Construction of the Transmission Frame—

Figure 3A:
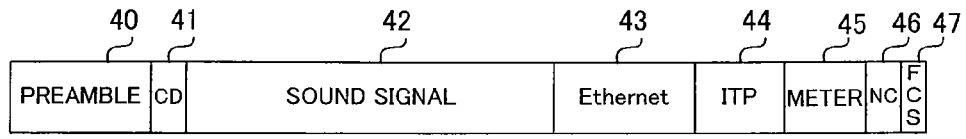
FIG. 3A is a block diagram showing an example construction of a transmission frame transmitted via an audio network of the mixing system of FIG. 1.

FIG. 3A is a block diagram showing a construction of a transmission frame transmitted on the above-mentioned audio network 6. Leftward direction in FIG. 3A is a frame transmitting direction; namely, the leading end of the transmission frame is located at the left end in the figure. As shown in FIG. 3A, the transmission frame includes, in a direction from the leading end to the trailing end thereof, a preamble region 40, a management data (CD) storage region 41, a sound signal storage region 42 capable storing audio signals of a plurality of channels, an Ethernet data region 43, an ITP region 44, a meter region 45 for storing level indicating meter data, an NC region 46 for storing a network configuration of the audio network 6, and a frame check sequence (FCS) region 47 for storing an error check code of the transmission frame.

In the preamble region 40 are stored a preamble defined by an IEEE (Institute of Electrical and Electronic Engineers) 802.3, an SFD (Start Frame Delimiter), a transmission destination address, a transmission source address, a length (data size) of the transmission frame, and so on. Further, in the CD storage region 41 are stored data (such as a frame number assigned to the transmission frame and a sample delay value) to be used by each of the devices connected to the audio network 6 for managing data contained in the transmission frame.

The sound signal storage region 42 has a predetermined plurality of (e.g., 256) transmission channels. The transmission channels are each a transmission band that is used for transmission of an audio signal, and these transmission channels are capable of storing digital audio signals (waveform data sampled at a predetermined sampling frequency). One sample of waveform data of one channel is stored in each one of the transmission channels.

Because the sound signal storage region 42 has a plurality of transmission channels as noted above, audio signals of a plurality of channels can be transmitted via the audio network 6 using the plurality of transmission channels.

The transmission frame having such a sound signal storage region 42 is circulated among the individual devices on the audio network 6, once per sampling period (cycle), so that waveform data of the plurality of (e.g., 256) transmission channels can be transmitted, in a substantially real-time manner, among the individual devices connected to the audio network 6.

In the Ethernet data region 43 are stored remote-controlling data sent from the control device, information indicative of connection states and operating states of the individual devices, etc. When a data packet greater in size than the Ethernet data region 43 is to be transmitted, it is transmitted using a well-known technique. Namely, a transmitting-end device divides the data packet into a plurality of data and transmits the resultant divided data in a plurality of transmission frames, and a receiving-end device takes out the plurality of data from the plurality of transmission frames and connects together the taken-out data in a predetermined order, so that the data packet before the division at the transmitting-end device can be restored at the receiving-end device. Further, the (FCS) region 47 is a region storing data, defined by the IEEE 802.3, for detecting an error of the frame. The reason why the transmission frame includes the meter region 45 for storing level indicating meter data and the NC region 46 for storing a network configuration of the audio network 6 is to steadily transmit these data.

Figure 3B:
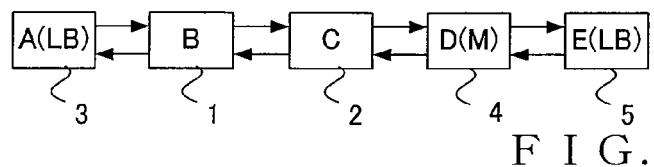
FIG. 3B is a diagram explanatory of transmission paths of the transmission frame.

FIG. 3B is a diagram explanatory of how the transmission frame shown in FIG. 3A is transmitted. In FIG. 3B, various devices depicted by alphabetical letters A, B, C, D and E correspond to the console 1, engine 2 and I/O devices 3-5 of FIG. 1, of which the device D is a master node (device) and hence indicated by a reference character D(M). Further, the devices A and E are loop-back ends (i.e., loop-back devices), i.e. turns of the transmission path, and hence indicated by reference characters A(LB) and E(LB). The master node device D creates a transmission frame per sampling period, and the thus-created transmission frame circulates among the devices A-E, in the order of D→E→D→C→B→A→B→C→D, per sampling period. Directions of arrows connecting between the devices A-E indicate transmission directions of the transmission frame.

During the time when the transmission frame makes a round among the devices A-E on the audio network 6, each of the devices reads out, from the transmission frame transmitted on the audio network 6, waveform data, control data, etc. to be received from another one of the devices and also writes, into the transmission frame, waveform data, control data, etc. to be transmitted to another one of the devices. Once the sound signal storage region 42 and subsequent regions, on which data are to be read and written, start arriving, each of the slave node devices A-C and E starts reading out and writing waveform data etc. for the transmission frame. Then, the slave node device sequentially transfers the data of the transmission frame from its leading end onward, in parallel with reading and writing of the waveform data. Thus, each of the slave node devices A-C and E can read and write waveform data etc. on the transmission frame while passing the transmission frame therethrough. Further, it is preferable that the master node device D start creating and transmitting a next transmission frame after having received up to the training end of the transmission frame having made a round through the audio network 6.

Further, although each of the other devices than the loopback devices A and E passes a transmission frame therethrough twice, i.e. in outward and return directions, it may perform reading and writing of waveform data etc. only once, such as when passing the transmission frame therethrough for the first time.

Note that even data written into the transmission frame by any one of the devices on the audio network 6 pass through all of the devices on the network before the transmission frame returns to the one device. Therefore, data written into the transmission frame by any one of the devices on the audio network 6 can be transmitted to all of the devices on the audio network 6.

—Allocation of the Transmission Channels to the Individual Devices—

Each of the devices on the audio network 6 writes samples of waveform data into the transmission channels of the sound signal storage region 42 of a transmission frame and reads out, from the transmission channels, samples of waveform data necessary for that device. To each of the devices (devices A-E in the illustrated example of FIG. 3B) are allocated in advance a given number of transmission channels necessary for that device, so that each of the devices can reserve the necessary number of transmission channels and write samples of waveform data to the reserved transmission channels.

Figure 3C:
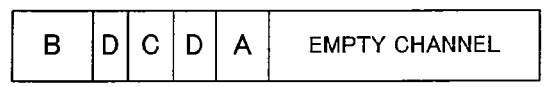
FIG. 3C is a diagram explanatory of an example manner in which transmission channels are allocated to the individual devices in a sound signal storage region of the transmission frame.

FIG. 3C is a diagram explanatory of an example manner in which the transmission channels of a transmission frame are allocated to the individual devices A-E. In FIG. 3C, blocks with alphabetical letters A-E written therein represent regions (each comprising one or more transmission channels) allocated to the corresponding devices indicated by A-E in FIG. 3B. A size or horizontal length of each of the blocks A-E represents the number of the transmission channels allocated to the corresponding device A-E.

Each of the devices connected to the audio network 6 reserves the necessary number of transmission channels therefor by performing a later-described transmission channel reserving process of FIGS. 5 and 6 when it has joined the audio network 6. In this manner, the plurality of transmission channels of the sound signal storage region 42 are allocated to the individual devices (see FIG. 3C). Each transmission channels not allocated to any one of the devices is "empty channel". When one or more transmission channels are to be allocated to any one of the devices, the necessary transmission channels are allocated to that device from among the empty channels under the management of the master node.

Each of the devices on the audio network 6 can write waveform data into the one or more transmission channels reserved thereby (or therefor), while receiving and transferring a transmission frame. The waveform data writing to the individual transmission channels can be performed exclusively only by the device having reserved the transmission channels. For example, the device B can write samples of waveform data to the transmission channels of the block B in the sound signal storage region 42; the other devices cannot write samples of write waveform data to the transmission channels of the block B.

Further, when waveform data are to be received from another one of the devices on the audio network 6, each of the devices on the audio network 6 reads out samples of the waveform data to be received from the transmission channels having the waveform data written therein, while receiving and transferring the transmission frame. For example, when waveform data transmitted from the device B are to be received by the device C, the device C reads out samples of the waveform data from the transmission channels of the block B in the sound signal storage region 42.

Note that the number of the transmission channels in the sound signal storage region 42 is a finite number determined depending on the size of the sound signal storage region 42 and the number of bits of waveform data. If the number of bits of waveform data is reduced with the sound signal storage region 42 maintained at the same size, then the number of the transmission channels can be increased although precision of audio signals decreases.

Note that transmission of the transmission frame via the audio network 6 in the mixing system of FIG. 1 can be performed by the technique disclosed in patent literature 1 (Japanese Patent Application Laid-open Publication NO. 2008-99264) discussed above. Let it be assumed here that the various technical conditions, such as the size of the transmission frame and specifications of the network, disclosed in patent literature 1 are also applicable to the instant embodiment.

—Constructions of the Individual Devices—

Figure 2A:
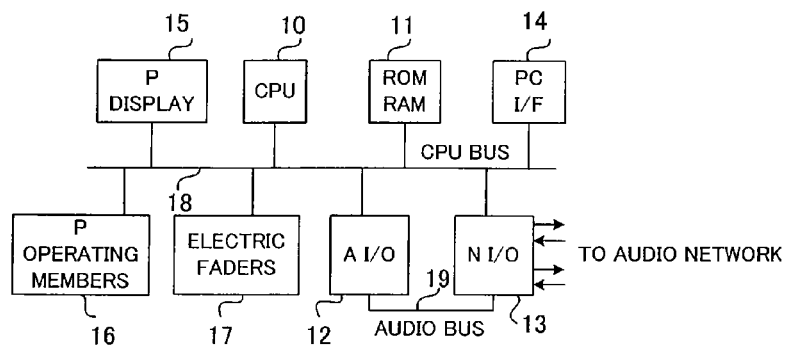
FIGS. 2A-2C are block diagrams showing example hardware setups of a console, an I/O device and a mixing engine, respectively, constituting the mixing system of FIG. 1.
Figure 2B:
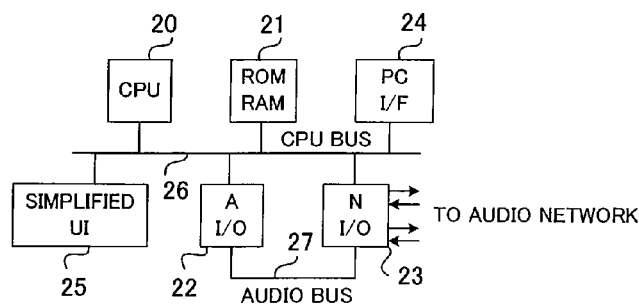
Figure 2C:
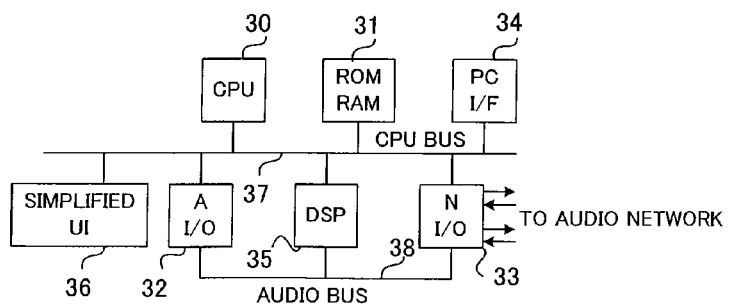

FIGS. 2A-2C show respective hardware setups of the control 1, engine 2 and I/O devices 3-5 that constitute the mixing system of FIG. 1.

—Construction of the Console—

As shown in FIG. 2A, the console 1 includes a CPU 10, a memory 11 having a ROM and a RAM, an audio input/output section ("A I/O") 12 that will hereinafter be referred to as "audio I/O" to the console 1, a network interface ("N I/O") 13 that will hereinafter be referred to as "network I/O", an interface (PC I/F) 14 for connecting a personal computer (PC), and a display section ("P display") 15, control unit ("P controls") 16 and sound volume level adjusting controls ("Electric F") 17 provided on an operation panel. These components 11, 12, 13, 14, 15, 16 and 17 are interconnected via a CPU bus 18. Further, the audio I/O 12 and the network I/O 13 are interconnected via an audio bus 19.

The CPU 10 controls overall behavior of the console 1 by executing control programs stored in the memory (ROM and RAM) 11. Further, in the memory 11 of the console 1 are stored various data necessary for communication via the network 6, such as information about a construction of the console 1, as well as control programs necessary for the console 1 to operate as the control device of the mixing system. Also, the memory 11 includes a current memory storing current configurations and operating states of the mixing system. Data stored in the current memory include information of all of the devices connected to the audio network 6 (such as a type, name and construction of each of the devices and control data necessary for operation of each of the devices), connection information of all ports (input terminals and output terminals) of all of the devices (such as signal supply destination information and signal supply source information of each of the ports), etc.

During operation of the mixing system of FIG. 1, stored content of the current memory of the control device (i.e., console) 1 is made to coincide with information about operation, connection states etc. of the individual devices connected to the audio network 6. Such synchronization (coincidence) between the control device (i.e., remote control master) and the other devices (i.e., to-be-controlled devices) can be realized by a conventionally-known technique.

The display section 15 is in the form of a liquid crystal display and/or the like and displays various information on the basis of display control signals given from the CPU 10 via the CPU bus 18. The human operator can make various settings, such as later-described "patch setting", via a screen displayed on the display section 15. The control unit 16 includes a multiplicity of controls disposed on the operation panel, and a detection mechanism for detecting operation of the controls. A detection signal corresponding to human operator's operation on the control unit 16 is supplied to the CPU 10 via the CPU 18. The CPU 10 generates various data based on the supplied detection signal. Further, the sound volume level adjusting controls 17 are operable to adjust sound volumes of audio signals and comprise so-called electric faders of which operating positions of knobs are electrically controlled on the basis of drive signals given from the CPU 10.

The network I/O 13 is an interface that connects the console 1 to the audio network 6 and comprises two sets of transmission and reception interfaces as noted above. The network I/O 13 includes mechanisms for transmitting and receiving a transmission frame via the audio network 6, reading out, from the transmission frame, of various data including necessary audio signals (waveform data) and control data, writing, into the transmission frame, various data including waveform data and control data, transmitting and receiving waveform data via the audio bus 19, transmitting and receiving control data etc. via the CPU bus 18, and performing other operations. The interface of the network I/O 13 may be one that communicates data using any desired communication scheme, as long as the network I/O 13 is capable of circulating a transmission frame among the devices on the audio network 6 within one sampling period.

The audio bus 19 is a local bus for time-divisionally transmitting, between the audio I/O 12 and the network I/O 13, digital audio signals (waveform data) of a plurality of channels, one sample per sampling period. Waveform data processing timing is synchronized between the audio I/O 12 and the network I/O 13 by means of a well-known technique using a word clock. Namely, any one of the audio I/O 12 and the network I/O 13 is set as a word clock master, and the other of the audio I/O 12 and the network I/O 13 is set as a slave. The slave generates word clock pulses at timing synchronized with word clock pulses generated by the master and processes waveform data at sampling period timing based on the word clock pulses.

The audio I/O 12 includes an analog input section for inputting an analog audio signal and an analog output section for outputting an analog audio signal, or a digital input/output section for inputting and outputting a digital audio signal (waveform data). The audio I/O 12 will be described in greater detail in connection with a construction of the I/O device.

Further, the PC interface 14 is an interface that connects the PC to the console 1. As noted above, the PC connected to the PC interface 14 can be used as the control device for remote-controlling operation of the individual devices (console 1, engine 2 and I/O devices 3-5) of the mixing system.

—Construction of the I/O Device—

As shown in FIG. 2B, each of the I/O devices includes a CPU 20, a memory (ROM and TRAM) 21, an audio I/O 22, a network I/O 23, a PC interface 24 and a simplified operator (user) interface ("simplified UI") 25, and these components 20, 21, 22, 23, 24 and 25 are interconnected via a CPU bus 26. Further, the audio I/O 22 and the network I/O 23 are interconnected via an audio bus 27. The CPU 20 and the memory (ROM and RAM) 21 control overall operation of the I/O device. In the memory 21 are stored various data necessary for communication via the audio network 6 and for being subjected to remote control, such as information about a construction of the I/O device and information about connection states of the I/O device (including signal supply destination information about signal supply sources SS of the I/O device and signal supply source information about signal supply destinations of the I/O device). The signal supply destination information is information indicative of a signal supply destination possessed by the device to which a signal supply source is to be connected, while the signal supply source information being information indicative of a signal supply source possessed by another of the devices to which a signal supply destination is to be connected. The audio bus 27, audio I/O 22, network I/O 23 and PC interface 24 are constructed in a similar manner to the audio bus 19, audio I/O 12, network I/O 13 and PC interface 14 described above in relation to FIG. 2A.

The audio I/O 22 includes an analog input section for inputting an analog audio signal and an analog output section for outputting an analog audio signal, or a digital input/output section for inputting and outputting a digital audio signal (waveform data).

The analog input section includes a plurality of analog input terminals, such as an XLR terminal and a microphone input terminal, and an A/D conversion circuit, and it converts an analog audio signal, input from an external analog audio signal supply source SS, into a digital signal (waveform data) per sampling period and outputs the converted digital audio signal (waveform data) to the audio bus 27. The analog output section includes a plurality of analog output terminals, such as an XLR terminal and a headphone terminal, and a D/A conversion circuit, and it converts a digital signal (waveform data), input from the audio bus 27, into an analog audio signal per sampling period and outputs the converted analog audio signal to an external analog audio signal supply destination SD. The digital input/output section includes a plurality of digital audio terminals, such as an AES/EBU terminal and an ADAT (registered trademark) terminal, and it inputs or outputs waveform data from or to a digital audio signal supply source SS or supply destination SD.

The audio I/O 22 comprises card devices detachably inserted in or attached to I/O cards attaching slots provided in the console 1. In this case, the construction (number of terminals) of the audio I/O 22 can be changed by changing the number of I/O cards attached. Note that the audio signal supply sources SS are acoustic equipment functioning as audio signal supply sources, such as a microphone, musical instrument and music reproduction device (CD player), connected to the respective input terminals. Further, the audio signal supply destinations are acoustic equipment functioning as audio signal supply destinations, such as an amplifier and headphones, connected to audio I/O output terminals.

The simplified UI 25 includes a relatively simplified display section and controls, which display various information on the display section on the basis of display control signals given from the CPU 20 via the CPU bus 26. A detection signal responsive to operation of any of the controls is supplied to the CPU 20 via the CPU bus 26. The CPU 20 generates various data based on the supplied detection signal. More specifically, the human operator can use the simplified UI 25 of each of the I/O devices to set a "patch" where the I/O device is set as a supply destination or source.

—Construction of the Engine—

In FIG. 2C, the engine 2 includes a CPU 30, a memory (ROM and RAM) 31, an audio I/O 32, a network I/O 33, a PC interface 34, a signal processing section (DSP) 35 and a simplified operator (user) interface ("simplified UI") 36, and these components 30, 31, 32, 33, 24, 34. 35 and 36 are interconnected via a CPU bus 37. Further, the audio I/O 32, the network I/O 33 and the DSP 35 are interconnected via an audio bus 38.

The CPU 30 controls overall operation of the engine 2 by executing control programs stored in the memory (ROM and RAM) 31. Further, in the memory 31 of the engine 2 are stored microprograms necessary for signal processing by the DSP 35, and various data necessary for communication via the audio network 6 and for being subjected to remote control, such as information about a construction of the engine 2 and information about connection states of the engine 2. The audio bus 38, audio I/O 32, network I/O 33 and PC interface 34 are constructed in a similar manner to the audio bus 19, audio I/O 12, network I/O 13 and PC interface 14 described above in relation to FIG. 2A. The simplified UI 136 includes a power switch, an operation checking LED indicator, etc.

The DSP 35 of the engine 2 executes microprograms on the basis of control data given from the console 1 and performs, per sampling period, signal processing, such as mixing processing, on audio signals of a plurality of channels received from the audio bus 38 so that it can output the resultant processed waveform data to the network I/O 33 and audio I/O 32 via the audio bus 38. Because the DSP 35 is connected to the network I/O 33 and audio I/O 32 via the audio bus 38, waveform data received from the network I/O 33 and waveform data input from the audio I/O 23 can both be supplied to the DSP 35. Further, waveform data output from the DSP 35 can be supplied to both the network I/O 33 and the audio I/O 32.

As shown in the figure, the engine 2 has no operator interface for controlling the signal processing performed by the DSP 35. Because, in the instant mixing system, the signal processing performed by the DSP 35 of the engine 2 is remote-controlled via the audio network 6 on the basis of human operator's operation on the console 1 or remote-controlling PC.

—Operational Flow of Signal Processing in the Mixing System—

Figure 4:
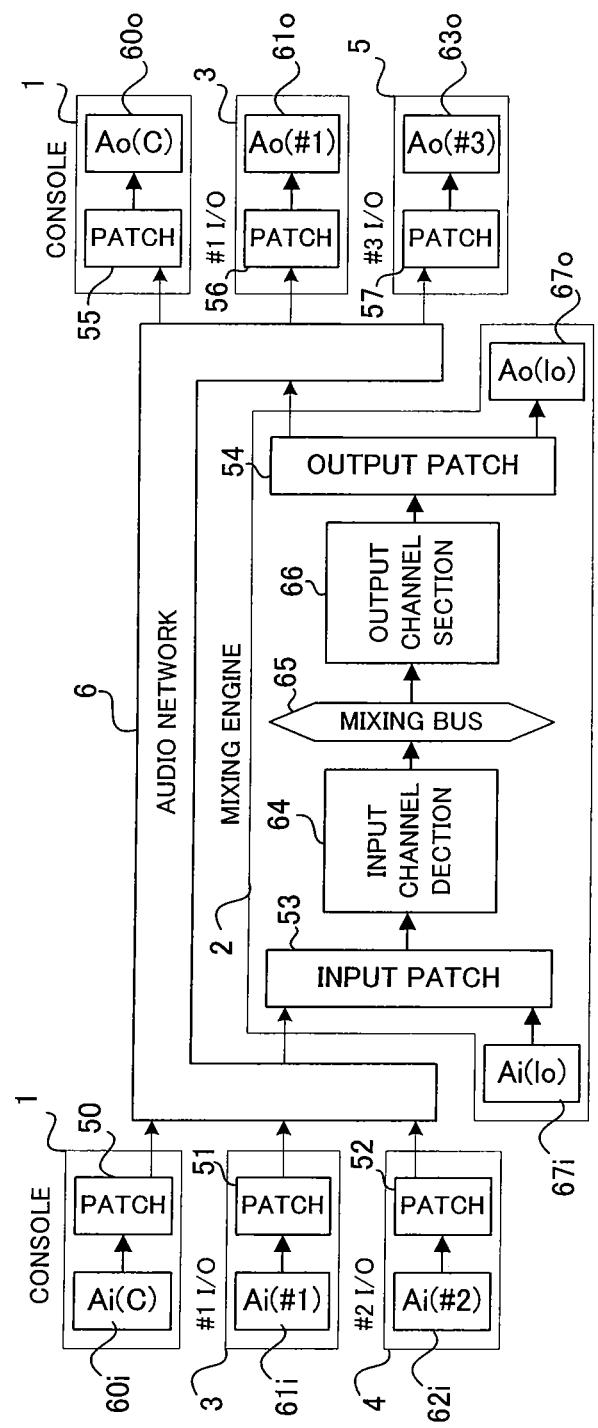
FIG. 4 is a block diagram explanatory of an operational flow of signal processing in the mixing system of FIG. 1.

FIG. 4 is a block diagram explanatory of an operational flow of signal processing in the mixing system of FIG. 1. In the illustrated example of FIG. 4, an audio I/O function and the first I/O device 3 are used for input/output of audio signals from/to the audio network 6, the second I/O device 4 is used only for input of audio signals from the audio network 6, and the third I/O device 5 is used only for output of audio signals to the audio network 6. In FIG. 4, the I/O function of each of the devices is shown divided into an audio input section and an audio output section, and a suffix letter "i" is attached to the input section while a suffix letter "o" is attached to the output section. Further, in FIG. 4, flows of audio signals via the audio network 6 are indicated by broken-line arrows, and while flows, within the individual devices, of audio signals via the audio buses 19, 27 and 38 are indicated by solid-line arrows.

As noted above, the audio network 6 includes a predetermined plurality of transmission channels (e.g., 256 channels), and each of the devices connected to the audio network 6 has reserved in advance a particular number of transmission channels necessary for that device (see FIG. 3C). Regardless of whether or not the reserved transmission channels are being actually used, i.e. whether or not actual audio signals are being transmitted using the reserved transmission channels, each of the devices connected to the audio network 6 performs an operation for transmitting signals using the reserved transmission channels. Namely, when no actual audio signal has been supplied from any signal supply source, silent signals of a zero sound volume level (zero level signals) are supplied to the reserved transmission channels. Thus, although not shown in FIG. 4, supply sources of zero level signals are included in patch sections 50-57.

In the instant mixing system, the console 1, first I/O device 3 and second I/O device 4 are connected to an audio signal input side of the audio network 6. Each of the console 1, first I/O device 3 and second I/O device 4 takes in, via the respective audio I/Os (Ai(c)) 60$i$, Ai(#1) 61$i$ or Ai(#2) 62$i$), analog audio signals input from signal supply sources (not shown) connected to the input terminals, after converting the audio signals into digital signals (waveform data) every sampling period.

The patch sections 50, 51 and 52 allocate the transmission channels, reserved by the corresponding devices, to the individual supply sources, on a one-to-one basis on the basis of later-described "transmission connections". Further, each of the network I/Os 13 and 23 (see FIGS. 2A and 2B) in the input-side devices 1, 3 and 4 write waveform data, input from the corresponding supply source, into the allocated transmission channel per sampling channel. Thus, each of the waveform data is sent to the audio network 6 via the allocated transmission channel.

The engine 2 receives, via the network I/O 33, the waveform data from transmission channels, necessary for the engine 2, from among the plurality of transmission channels of the audio network 6. The necessary transmission channels are transmission channels connected to input channels via an input patch section 53, and they are identified by later-described reception connections. The input patch section 53 allocates one of the input channels of an input channel section 64, as an output destination of the signal received via a desired one of the transmission channels on the basis of the later-described "reception connection". The input channel section 64 includes a plurality of the input channels to each of which is allocated a different one of the transmission channels. In this way, the waveform data received from the transmission channels allocated by the input patch section 53, per sampling period.

The input channel section 64, mixing bus 65 and output channel section 66 are implemented by the microprograms executed by the DSP 35 (see FIG. 2C) of the engine 2, and these components behave in a similar manner to the conventionally-known counterparts. The input channel section 64 performs, for each of the input channels, signal processing, such as level adjustment, equalizing and effect impartment, on the input waveform data, and then it outputs the resultant processed waveform data to the mixing bas 65. The mixing bus 65 comprises a plurality of bus lines, each of which mixes together the waveform data supplied via one or more of the input channels of the input channel section 64 and outputs the resultant mixed waveform (or mixed result) to the output channel section 66. The output channel section 66 includes a plurality of output channels corresponding to the individual bus lines, and it performs, for each of the output channels, signal processing, such as level adjustment, equalizing and effect impartment, on the waveform data output from the mixing bus 65.

The output patch section 54 allocates the transmission channels, reserved by the engine 2, to the output channels of the output channel section 66 on a one-to-one basis on the basis of later-described "transmission connections". Then, per sampling period, the network I/O 33 writes the waveform of each of the output channels, having been subjected to the signal processing by the engine 2, to the transmission channel allocated thereto. In this way, the audio signal of each of the output channels, having been subjected to the signal processing by the engine 2, is sent to the audio network 6 via the allocated transmission channel.

To an audio signal output side of the audio network 6 are connected the console 1, first I/O device 3 and second I/O device 4. Per sampling period, the network I/Os 13 and 23 (see FIGS. 2A and 2B) of the devices 1, 3 and 5 receive waveform data of transmission channels, necessary for the devices in question, of the plurality of transmission channels. The necessary transmission channels are transmission channels connected to supply destinations via patch sections 55, 56 and 57 and identified by later-described reception connections.

Each of the patch sections 55, 56 and 57 allocates one signal supply destination SD as an output destination of a signal received via a desired transmission channel, on the basis of a later-described "reception connection". Further, the devices 1, 3 and 5 convert waveform data of the corresponding transmission channels, received via the audio network 6, into analog audio signals per sampling period by means of their respective audio I/Os ("Ai(c)", "Ai(#1)" and "Ai(#2)") 60o, 61o and 63o and then supply the converted analog audio signals to the signal supply destinations allocated by the patch sections 55, 56 and 57.

The engine 2 also includes its own (local) audio I/Os ("Ai (Lo)" and "Ao(Lo)") 67i and 67o. Thus, the input patch section 53 can also allocate input channels of an input channel section 64 to signal supply sources SS connected to individual input terminals of the audio I/Os ("Ai(Lo)". Further, the output patch section 54 can allocate the signal supply sources connected to individual output channels of the input channel section 64 to the audio I/O ("Ao(Lo)") 67o of the input channel section 64. Note that a patch function for connecting the local audio I/Os and the input channel section 64 is the same as a conventionally-known counterpart.

Each of the patch sections provided in the devices may be implemented by constructing the audio bus of the device (see FIGS. 2A-2C) to operate as a patch section, or by providing, in the network I/O of the device (see FIGS. 2A-2C), hardware dedicated to a patching operation. As shown in FIG. 4, the patch sections are provided not only in the engine 2 but also in the console 1 and the I/O devices 3-5, and these patch sections are disposed between the audio network 6 and the devices connected to the audio network 6.

In the mixing system constructed in the aforementioned manner, each of the devices 1-5 of the audio network 6 can transmit audio signals (waveform data) of one or more channels input thereto to the audio network 6 using transmission channels reserved by (or for) that device. Then, the mixing engine 2 performs mixing processing on the audio signals (waveform data) of the individual transmission channels received via the audio network 6, and transmits the resultant mixed audio signals or mixed results via the audio network 6. The mixed audio signals transmitted from the engine 2 can be output via the devices 1-5 on the audio network 6.

—Reservation of the Transmission Channel—

As a precondition for operation of the mixing bus, each of the devices connected to the audio network 6 has to reserve in advance a respective necessary number of the transmission channels. FIG. 5 is a flow chart showing an example operational sequence of a process performed when any device has joined the audio network 6. In this process, the device performs operations for reserving a particular number of the transmission channels necessary for that device. "when any device has joined the audio network 6" is when the device has been connected to the audio network 6, when the device connected to the audio network 6 has been powered on, or the like.

At step S1, the CPU of the device having the network sets a parameter DCN, stored in the memory of the device, as the number x of the transmission channels to be reserved for a current process in the device. The parameter DCN is a parameter indicative of the number of the transmission channels to be reserved by the device and stored in the memory of the device in a non-volatile manner. Basically, the number indicated by the parameter DCN corresponds to the number of input ports (input terminals) provided in the device.

At next step S2, the CPU of the device having joined the audio network 6 acquires information about the mixing system from a transmission frame being transmitted over the audio network 6, stores the information about the mixing system into its memory and transmits or notifies the other devices on the audio network 6 of information about the device. The information about the mixing system, which includes information of the master node of the audio network 6 and information necessary for creation of a later-described R signal, is stored in the NC region 46 of the transmission frame. Further, the "information about the device" includes information indicative of the name of the device, the number of the audio I/O card attaching slots in the device, the numbers of input and output terminals provided on the cards attached to the slots, etc. In the following description, "notifying" some data means imparting the data with a broadcast address and transmitting the data to all of the devices connected to the audio network 6.

Further, at step S2, the CPU of the device not only creates an "R signal list" and a "T signal list" on the basis of the information about the mixing system but also stores the thus-created R signal list and T signal list into the memory of the device. Details of the R signal list and T signal list will be discussed later.

At next step S3, the CPU of the device having joined the audio network 6 performs a transmission channel reserving process for reserving the number x of the transmission channels set at step S1 above. FIG. 6 is a flow chart showing an example operational sequence of the transmission channel reserving process for reserving the number x of the transmission channels. At step S4, the CPU of the device transmits to the master node a request for reserving the x transmission channels and receives a reply from the master node.

In the instant embodiment, the master node of the audio network 6 functions as a band management section that controls the numbers of the transmission channels to be reserved by the individual devices. In response to the request transmitted at step S4 above, the master node checks the sound signal storage region 42 of the transmission frame for empty channels and determines whether the sound signal storage region 42 currently has empty transmission channels that can be allocated to the device having made the request. If the request is to be accepted, a reply indicating unique channel numbers (i) of one or more transmission channels to be allocated to the device having made the request (i.e, requesting device) is returned from the master node to the requesting device. The numbers (i) are unique channel numbers assigned to individual ones of the predetermined plurality of transmission channels (e.g., 256 transmission channels) provided in the sound signal storage region 42.

Namely, if all of the requested x transmission channels are allocatable to the requesting device, the master node enters into the reply the unique channel numbers (i) of all of the x empty transmission channels. If, on the other hand, all of the requested x transmission channels are not allocatable to the requesting device, the master node enters into the reply the unique channel numbers (i) of only the transmission channels allocatable to the requesting device. Further, if the sound signal storage region 42 has no empty transmission channel at all or the master node cannot accept the request (i.e., does not allocate any transmission channel to the requesting device), then the master node returns a reply indicating that it cannot accept the request or returns no reply (NO determination at step S5), after which the transmission channel reserving process is brought to an end.

If a reply indicating that the request has been accepted is returned from the master node (YES determination at step S5), the CPU of the device reserves the transmission channel of each of the channel numbers entered in the reply, starts transmitting signals using these transmission channels and then sets the number of the reserved transmission channels as a parameter KN, at step S6. Namely, the parameter KN is indicative of the number of the transmission channels having been reserved by the device, and it is stored into the memory of the device in a non-volatile manner. At that time, no later-described "transmission connection" has been established yet; namely, the transmission channels (i) have not yet been allocated to the supply sources (i.e., no actual audio signal has been supplied). Therefore, at that time, the device starts transmitting a zero-level signal (silent audio signal) using each of the reserved transmission channels (i).

At step S7, the CPU of the device sets "null" as SSN(i) corresponding to all of the transmission channels (i) reserved at step S6 above, and transmits the information SSN(i) to the other devices on the audio network 6.

The information SSN(i) is information comprising a set of names SSN identifying audio signal supply sources SS and the transmission channels (i); namely, the information SSN(i) is signal output information indicative of audio signal supply sources SSN that are outputting audio signals to the reserved transmission channels (i). With the signal output information SSN(i), each of the devices can associate the audio signal supply sources SS, identified by the names SSN, with the channel numbers (i) of the transmission channels being used for transmission of the audio signals. The reason why "null" is set into the information SSN(i) corresponding to all of the transmission channels (i) is that the audio signal supply sources SS have not yet been allocated to the transmission channels (i). Note that a process performed by the other devices having received the signal output information SSN(i) will be described later.

Figures 5, 6, 7:
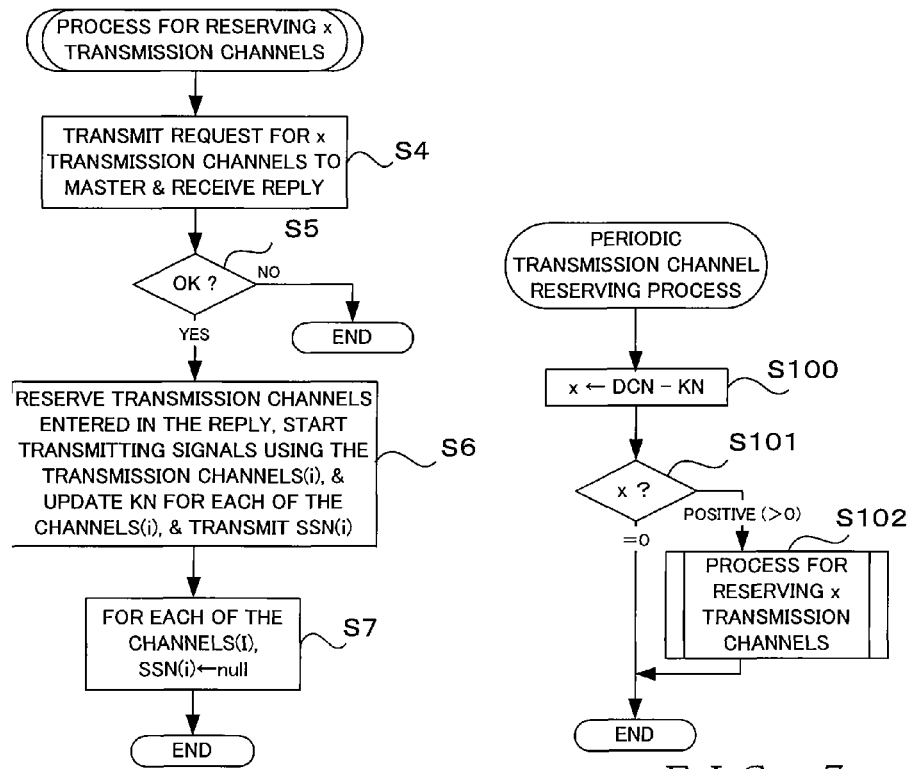
FIG. 5 is a flow chart showing a process performed when any one device has joined the audio network.
FIG. 6 is a flow chart of a transmission channel reserving process performed by each of the devices on the audio network.
FIG. 7 is a flow chart showing a transmission channel reserving process that is performed periodically by each of the devices on the audio network.

With the processes of FIGS. 5 and 6, each of the devices on the audio network 6 can reserve in advance the necessary number of the transmission channels. As seen from steps S4 and S5 of FIG. 6, each of the devices can not necessarily reserve in advance the necessary number of the transmission channels indicated by the parameter DCN.

FIG. 7 is a flow chart showing an example operational sequence of a transmission channel reserving process that is performed periodically by the CPU of each of the devices on the audio network 6. At step S100, the CPU of the device in question sets as "x" a difference between the value of the parameter DCN stored in the memory of the device and the number KN of the transmission channels currently reserved by the device. If the value of "x" is a positive value (x>0) (i.e, "Positive" at step S101), it means that the number DCN of the transmission channels to be reserved have not yet been reserved by (for) the device, and thus, the CPU of the device goes to step S102, where the CPU performs a process for reserving the x transmission channels shown in FIG. 6 and updates the number KN in accordance with the transmission channels having been reserved at step S102. If the number DCN of the transmission channels to be reserved is equal to the number KN (i.e., "x=0" at step S101), it means that the number DCN of the transmission channels have already been reserved, and thus, the periodic transmission channel reserving process is brought to an end. Each of the devices connected to the audio network 6 periodically performs such a process of FIG. 7 so as to try to reserve the number DCN of the transmission channels.

—R Signal List and T Signal List—

The following describe the R signal and T signal created by each of the devices at step S2 of FIG. 5. The "T signal list" is a list of information SSN(i) corresponding to all audio signals SSN being transmitted from the device to the audio network 6. By reference to the T signal list, each of the devices can associate the audio signals SSN of the supply sources SS, connected to the input terminals of the device, and the transmission channels (i) being used for transmission of the audio signals SSN. Note that, at the time point of step S2, the device has not yet transmitted audio signals and thus creates an empty T signal list.

The "R signal list" is a list of information SSN(i) corresponding to all audio signals SSN included in a transmission frame which the device is receiving from the network 6. Namely, the R signal list possessed by each of the devices is a list associating audio signals SSN of supply sources SS possessed by the other devices on the network 6 and transmission channels (i) being used for transmission of the audio signals SSN. Thus, in the R signal list possessed by each of the devices are registered the information SSN(i) registered in the T signal lists of all of the other devices connected to (or on) the audio network 6. Thus, combining the T signal list and R signal list possessed by any one of the devices will create a list associating all of the signals stored in the sound signal storage region 42 and the transmission channels having these signals put thereon (i.e., used for transmission of the signals).

By reference to the R signal list, each of the devices can associate the audio signals SSN of the supply sources SS possessed by the other devices on the network 6 and the transmission channels (i) being used for transmission of the audio signals SSN. The information about the mixing system acquired by each of the devices at step S2 above includes information necessary for creation of the "R signal list", such as the information SSN(i) associating the names SSN of the audio signals which the other devices are transmitting to the network 6 and the transmission channels (i) being used for transmission of the audio signals SSN.

Each of the devices connected to the network 6 creates such an R signal list and a T signal list on its own and stores the R and T signal lists into its memory. Thus, the R signal list and T signal list differ in content among the devices. As will be later detailed, the R signal list of each of the devices is updated once information SSN(i) is newly received from another device, and the T signal list of each of the devices is updated once audio signals of the supply sources SS are allocated to the transmission channels (i) in the device.

Further, the name SSN is a name uniquely set for each of the signal supply sources SS. Each of the devices on the audio network 6 can identify, from the name SSN, the signal supply source SS, an audio signal supplied from the audio signal supply source SS and an input port to which is connected the supply source SS. Namely, the name SSN, which is the name of the supply source SS, can be also said to be the name of the audio signal supplied from the supply source SS.

The human operator can set a desired name SSN of each of the audio signal supply source SS via the control device (console 1 or PC 7) or the device to which is connected the audio signal supply source SS. The name "ssn" set by the human operator may be a generic name indicative of a type of the audio signal (such as "BGM" or "Mic"), a name of the port to which is connected the audio signal supply source SS, or the like. Note that the name "ssn" set by the human operator must be a unique name at least within the device connected with the supply source SS for which the name SSN is to be set.

Also, the control device or each of the devices on the network 6 can generate a name SSN unique within the mixing system by automatically imparting the name SSN with a device ID possessed by an audio signal supply source ssn, set by the human operator, (i.e., ID unique to the device).

—Patch Setting Screen—

FIGS. 8A-8C and FIGS. 9A and 9B are diagrams showing examples of patch setting screens displayed on the display section of the control device (i.e., console 1 or PC 7). More specifically, these patch setting screens are displayed on the panel display section 15 (see FIG. 2A) of the console 1 or on a monitor of the PC 7. The human operator can make a patch setting in the mixing system of FIG. 1 via these patch setting screens.

In this specification, "patch" means allocating one input channel, for example, as a connection destination of one input port, i.e. allocating one signal supply destination as a connection destination of one audio signal supply source. With the "patch" setting, an audio signal supply source is connected with one supply destination, and a signal transmitting path is set between the signal supply source and the signal supply destination. Further, setting such a "patch" will hereinafter be referred to as "patching". Furthermore, allocating a supply destination to an audio signal supply source will hereinafter be referred to as "input patch", while allocating a signal supply source to a signal supply destination will hereinafter be referred to as "output patch".

For displaying the following patch setting screen, the control device acquires information about all of the ports possessed by all of the devices connected to the audio network 6 and stores the acquired information about all of the ports into the memory in advance. The "all of the ports possessed by all of the devices" includes information about the individual devices, information indicative of connection states of the input terminals and the output terminals, operating states of the individual devices, etc. On the basis of the "information all of the ports possessed by all of the devices" stored in the memory, the CPU of the control device displays various information on the patch setting screen as set forth below. As noted above, each of the devices transmits information about that device when it joins the audio network 6 (see step S2 of FIG. 5). Further, when any change has occurred in the connection states or operating states of the devices, for example, at the time of execution of a later-described connection update process, each of the devices transmits information indicative of changed or updated connection states or operating states.

—Input Patch Setting Screen—

Figure 8A:
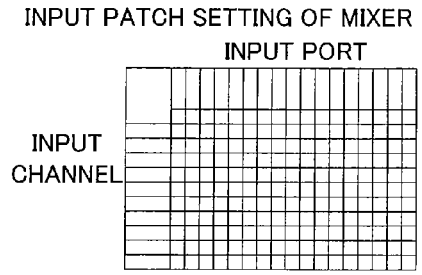
FIG. 8A is a diagram showing an input patch setting screen displayed on a control device for patch setting in an input patch section of the engine.

FIG. 8A is a diagram showing an input patch setting screen for patch setting in the input patch section 53 of the engine 2. The input patch setting screen is in the form of a grid or matrix diagram that includes a left-end vertical region indicating a group of the input channels of the input channel section 64 of the engine 2 and an upper-end horizontal region indicating a group of all of the selectable input ports (input terminals). Thus, the input patch setting screen indicates combinations of the input ports and the input channels by intersecting points (i.e., cells) between the individual vertical columns representing the input ports and the individual horizontal rows representing the input channels.

Figure 8B:
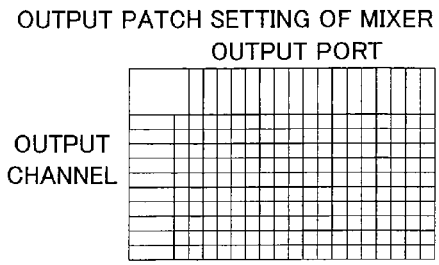
FIG. 8B is a diagram showing an output patch setting screen displayed on the control device for patch setting in an output patch section of the engine.
Figure 8C:
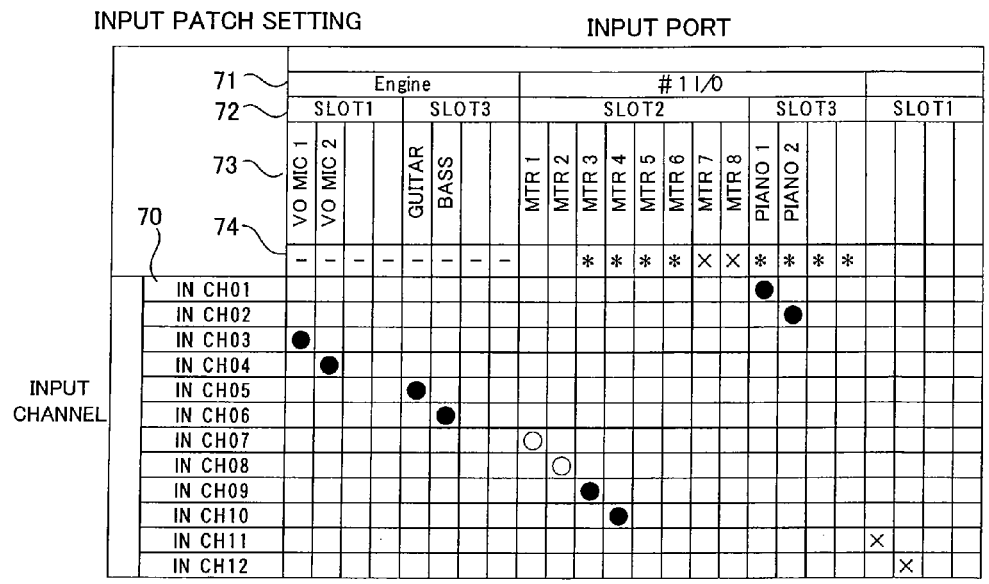
FIG. 8C is an enlarged diagram of the input patch setting screen.

FIG. 8C is an enlarged diagram of the input patch setting screen. As shown in FIG. 8C, channel name display portions 70 are provided in the left-end vertical region of the screen for indicating, in individual horizontal rows thereof, the names (such as "IN CH01", . . . ) of all of the input channels of the engine 2.

Further, in individual vertical rows of the upper-end horizontal region of the screen are displayed all of the selectable input ports, i.e. the input ports of the engine 2 (i.e., local ports) and the input ports of all of the other devices 1 and 3-5 connected to the audio network 6 (i.e., remote ports). In the figure, only the input ports of the engine 2 ("Engine") and the input ports of the first I/O device 3 ("#1 I/O") are shown for convenience and simplicity of illustration.

For each of the input ports indicated in the upper-end horizontal region, there are displayed, sequentially in an up-to-down direction, a device name display portion 71, slot number display portion 72 and input port name display portion 73. In the device name display portion 71 are displayed the names of the individual devices, like "Engine", "#1 I/O". In the slot number display portion 72 are indicated the names (numbers) of the I/O card attaching slots possessed by the individual devices. Further, in the input port name display portion 73 are indicated the names of the supply sources SS connected to the corresponding input ports (input terminals). All of the input ports possessed by all of the devices connected to the audio network 6, including the input ports (input terminals) to which no signal supply sources SS are connected, are displayed in the horizontal input port display region; the input port name display portions 73 of the input ports (input terminals) to which no audio signal supply sources SS are connected are each left blank.

Further, in each of transmission channel allocation state display portions 74, located immediately under the input port name display portions 73, is displayed a mark indicating whether any transmission channel is currently allocated to the corresponding input port. In the transmission channel allocation state display portions 74, a mark "—" indicates that no transmission channel is required because the corresponding input port is one of the input ports (local ports) of the engine 2, a mark "×" indicates that an output ON/OFF state of an audio signal from the input port (signal supply source SS) to the audio network 6 is currently set at OFF, and a mark "*" indicates that a transmission channel is currently allocated to the input port (signal supply source SS). Each transmission channel allocation state display portion 74 with no mark (i.e., no mark blank) indicates that no transmission channel is currently allocated to the input port (signal supply source SS).

Because each of the input ports (input terminals) possessed by the engine 2 is a local input port, none of the transmission channels of the audio network 6 need be allocated to the input port. Thus, the mark "—" is displayed in the transmission channel allocation state display portions 74 of these input ports of the engine 2.

By contrast, the input ports (input terminals) of the other devices than the engine 2, such as the first I/O device 3, are remote ports. Thus, these remote input ports and the input channels of the engine 2 are interconnected via settings of the transmission channels that become connection destinations of the individual input ports (i.e., via settings of "transmission connections"). Therefore, in each of the transmission channel allocation state display portions 74 for the input ports possessed by the other devices, a state of transmission channel allocation to the corresponding input port is indicated by the mark "×" or "*" or by no mark blank.

In each of the cells of the input patch setting screen is displayed a connection mark representing a connection state of the cell. Each cell with no connection mark is in a state where no patch setting is currently made. Further, a mark "●" indicates a connection within the same device or between different ones of the devices on the network 6, and it indicates that any one of the transmission channels is currently allocated to the corresponding input port (audio signal supply source SS) (i.e. that the mark "*" is currently displayed in the transmission channel allocation state display portion 74 of that input port). Further, a mark "◯" indicates a patching state between different ones of the devices on the network 6 and indicates that none of the transmission channels is currently allocated to the corresponding input port (signal supply source SS) (i.e. that the mark "×" is currently displayed in the transmission channel allocation state display portion 74 of that input port). Further, in the cells of the input patch setting screen, a mark "×" indicates that no device possessing a signal supply source SS or no device possessing a signal supply destination SD is currently on the audio network 6, that no actual hardware of a signal supply source SS is present in a device possessing the corresponding input port, or that no actual hardware of a signal supply destination SD is present in a device possessing the corresponding output port. "no actual hardware . . . is present" means that no signal supply source SS is currently connected to the input port (input terminal), or that no signal supply destination SD is currently connected to the output port (output terminal).

On the input patch setting screen shown in FIGS. 8A and 8C, the human operator can perform operation for designating a desired cell to give a connection instruction for the designated cell, so that the human operator can set or cancel an input patch for allocating the input port (signal supply source), displayed in the corresponding vertical column, to the input channel (signal supply destination) displayed in the corresponding horizontal row. Note that such operation for designating a desired cell (i.e., connection instructing operation) is performed, for example, by clicking operation using a mouse pointer; such connection instructing operation will hereinafter be referred to as "clicking".

—Output Patch Setting Screen—

FIG. 8B is a diagram showing an output patch setting screen for patch setting in the output patch section 54 of the engine 2. The output patch setting screen is generally similar in displayed content to the input patch setting screen shown in FIGS. 8A and 8C, except that signal supply sources and signal supply destinations displayed in the horizontal rows and vertical columns on the output patch setting screen differ from those displayed in the horizontal rows and vertical columns on the input patch setting screen.

On the output patch setting screen of FIG. 8B, channel name display portions are provided in a left-end vertical region of the screen for indicating the names of all of the output channels of the engine 2. Next to the right of each of the channel name display portions are displayed a mark (i.e., mark "×" or "*", or no-mark blank) indicating whether the output channel is currently allocated to any one of the transmission channels. This is because an audio signal is transmitted from the output channel via the audio network 6, namely, one transmission channel is set as a connection destination of each of the output channels. Further, in an upper-end horizontal region of the output patch setting screen are displayed the device names, slot names and output port names of the individual devices. In each of the grids between the individual horizontal rows representing the output channels and the vertical columns representing the output ports is displayed a connection mark that indicates a connection state of the cell.

By designating or clicking on a desired cell on the output patch setting screen, the human operator can set or cancel an output patch for allocating the output port (signal supply destination), displayed in the corresponding vertical column, to the output channel (signal supply source) displayed in the corresponding horizontal row.

—Network Input Patch Setting Screen—

Further, the control device can display a network patch setting screen for all of the devices connected to the audio network 6.

Figure 9A:
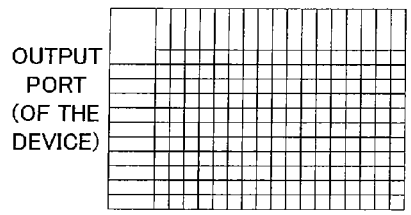
FIG. 9A is a diagram showing a network input patch setting screen displayed on the control device for the I/O devices.

FIG. 9A is a diagram showing the network input patch setting screen for patch setting for any one of the I/O devices 3-5. In individual horizontal rows of a left-end vertical region of the network input patch setting screen, as shown in FIG. 9A, are displayed port names of local output ports (output terminals) possessed by the I/O device in question; port numbers of the output ports or names of signal supply destinations SD connected with the output ports may be displayed in place of the port names.

In individual vertical columns of an upper-end horizontal region of the network input patch setting screen are displayed local input ports (input terminals) possessed by the I/O device in question, and remote input ports (input terminals) possessed by all of the other devices 1-5 connected to the audio network 6. In the column of each of the input ports are also displayed the respective names of the device, slot and input port (or signal supply source SS connected to the input port) and a mark indicating whether the input port is currently allocated to any one of the transmission channels. Further, in each of the cells is displayed a connection mark indicating a state of connection between the corresponding output and input ports.

By clicking on a desired cell on the network input patch setting screen, the human operator can set or cancel an input patch for allocating the input port (signal supply source), displayed in the corresponding vertical column, to the output port (signal supply destination) displayed in the corresponding horizontal row. As viewed from the I/O device in question, this input patch setting is a network input patch setting for allocating an audio signal input from the audio network 6 (i.e., signal supplied from the supply source SS connected to the input port displayed in the vertical column) as a signal supply source of the output port displayed in the horizontal row.

—Network Output Patch Setting Screen—

Figure 9B:
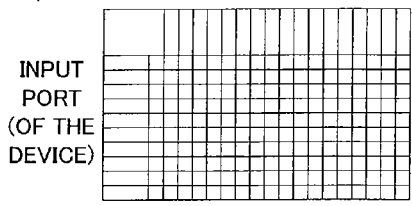
FIG. 9B is a diagram showing a network output patch setting screen displayed on the control device for the I/O devices.

FIG. 9B is a diagram showing a network output patch setting screen for patch setting for any one of the I/O devices 3-5. In individual horizontal rows of a left-end vertical region of the network output patch setting screen, as shown in FIG. 9B, are displayed port names of local input ports (input terminals) possessed by the I/O device in question; port numbers of the input ports or names of signal supply sources SS connected with the input ports may be displayed in place of the port names. Further, in the horizontal row of each of the input ports is displayed a mark indicating whether the input port is currently allocated to any one of the transmission channels.

In individual vertical columns of an upper-end horizontal region of the network output patch setting screen are displayed local output ports (output terminals) possessed by the I/O device in question, and remote output ports possessed by all of the other devices 1-5 connected to the audio network 6. In the column of each of the output ports are also displayed the respective names of the device, slot and output port (or signal supply destination SD connected to the output port). Further, in each of the cells is displayed a connection mark indicating a state of connection between the corresponding input and output ports.

By clicking on a desired cell on the network output patch setting screen, the human operator can set or cancel a patch for allocating the output port (signal supply destination), displayed in the corresponding vertical column, to the input port (signal supply source) displayed in the corresponding horizontal row. As viewed from the I/O device in question, this output patch setting is a network output patch setting for allocating an output to the audio network 6 as a signal supply destination of the input port displayed in the horizontal row.

—Process Responsive to Clicking on a Cell (Connection Instruction)—

Figure 10:
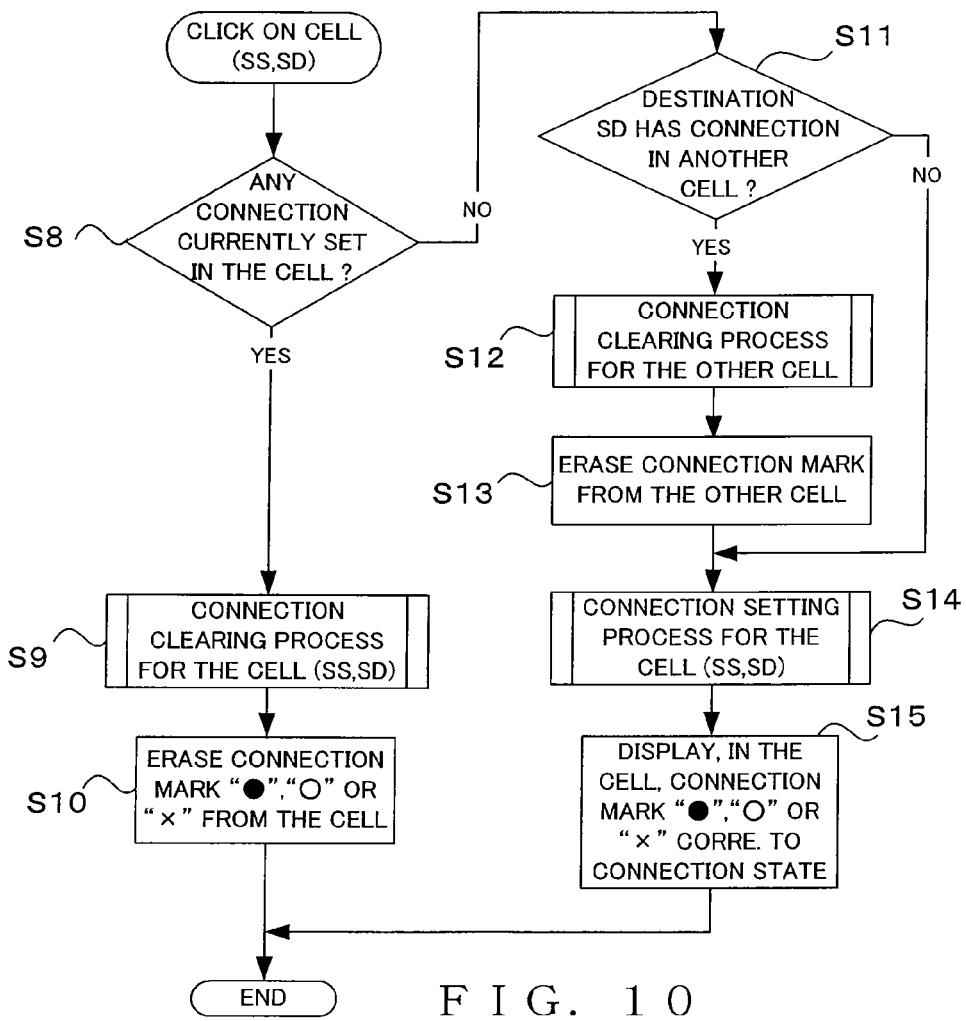
FIG. 10 is a flow chart showing a process performed by the control device when a cell has been clicked on the patch setting screen.

FIG. 10 is a flow chart showing an example operational sequence of a process performed by the CPU of the control device when a cell has been clicked on the patch setting screen. Let it be assumed here that an intersecting point between a signal supply source SS (input port) and a signal supply destination SD (output port) has been clicked on on the network input patch setting screen or on the network output patch setting screen. In the following description, "device possessing a signal supply source SS" and "device possessing a signal supply destination SD" each means a device possessing a terminal to which is currently connected the signal supply source SS or the signal supply destination SD.

In response to the human operator's clicking on the cell of the intersecting point between the signal supply source SS (input port) and the signal supply destination SD (output port), the CPU of the control device at step S8 determines, on the basis of information stored in the memory of the control device, whether any connection is currently set in the clicked-on cell. If no connection mark is currently displayed in the cell, then the CPU determines at step S8 that no connection is in the currently set clicked-on cell (NO determination at step S8). If, on the other hand, the mark "●", "○" or "×" is currently displayed in the cell, the CPU determines at step S8 that a connection is currently set in the clicked-on cell (YES determination at step S8).

Figure 12:
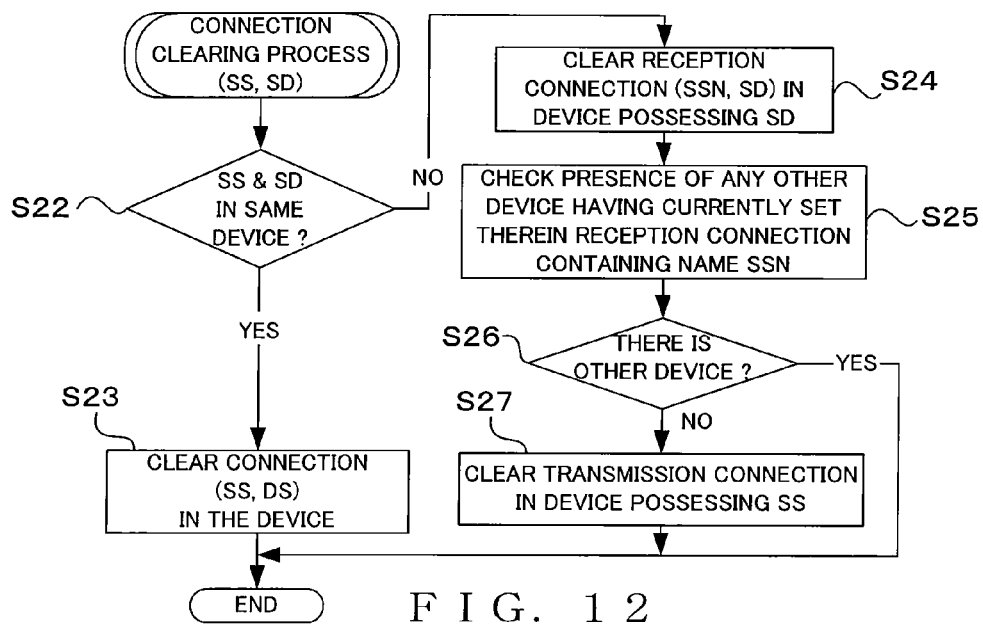
FIG. 12 is a flow chart showing a connection clearing process performed by the control device.

If a connection is currently set in the clicked-on cell (YES determination at step S8), the CPU of the control device proceeds to step S9, where a connection clearing process of FIG. 12 is performed to cancel the currently existing connection between the signal supply source SS and the signal supply destination SD. Then, the CPU of the control device goes to step S10 in order to erase the connection mark "●", "○" or "×", so that the cell is updated to a no-mark blank cell.

If, on the other hand, there is currently no connection in the clicked-on cell (NO determination at step S8), the CPU of the control device branches to step S11 in order to determine whether the signal supply destination SD corresponding to the clicked-on cell has a connection in another cell, i.e. whether the signal supply destination SD corresponding to the clicked-on cell is currently connected with another signal supply source SS. If the signal supply destination SD corresponding to the clicked-on cell is currently connected with another signal supply source SS (YES determination at step S11), the CPU of the control device goes to step S12, where the connection clearing process of FIG. 12 is performed for the other cell to cancel the currently existing connection between the signal supply destination SD and the other signal supply source SS. At next step S13, the CPU of the control device erases the connection mark from the other cell for which the connection has been canceled, so that the other cell is updated to a no-mark blank cell.

At next step S14, the CPU of the control device performs a later-described connection setting process of FIG. 11 to connect the signal supply source SS and signal supply destination SD corresponding to the clicked-on cell. Then, at step S15, the CPU of the control device displays the connection mark "●", "○" or "×" in the clicked-on cell, so that the display of the cell is updated to the connection mark corresponding to the current connection state.

Figure 11:
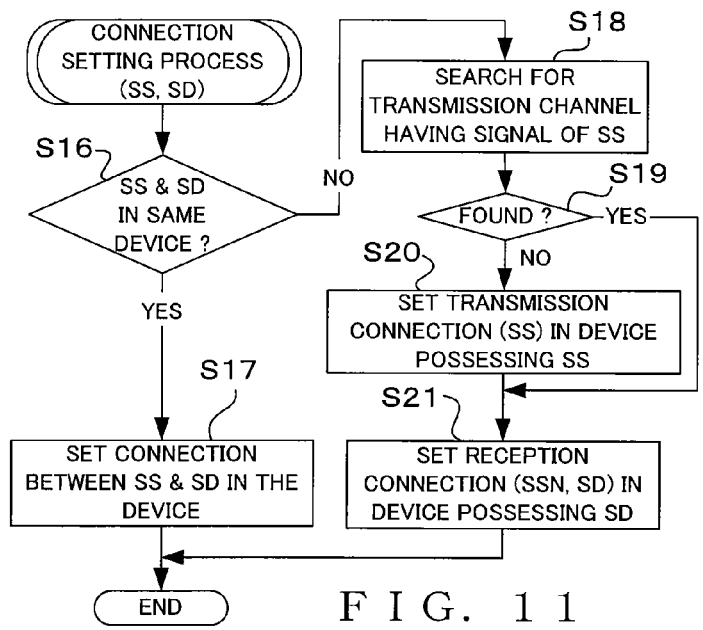
FIG. 11 is a flow chart showing a connection setting process performed by the control device.

If the signal supply destination SD corresponding to the clicked-on cell has no connection in another cell, i.e. if the signal supply destination SD corresponding to the clicked-on cell is not currently connected with another signal supply source SS (NO determination at step S11), the CPU of the control device performs the operations of steps S14 and S15 in order to connect the signal supply destination SD and signal supply source SS, corresponding to the clicked-on cell, through the connection setting process of FIG. 11, and it then displays a connection mark, corresponding to the connection state set through the connection setting process, in the clicked-on cell.

—Connection Setting Process Performed by the Control Device—

FIG. 11 is a flow chart showing an example operational sequence of the connection setting process performed at step S14. First, at step S16, the CPU of the control device determines whether the signal supply source SS and the signal supply destination SD corresponding to the clicked-on cell (that is an object of the connection setting process) are both currently connected to ports of a same device, i.e. whether the signal supply source SS and the signal supply destination SD are to be connected with each other via the audio network 6 or not via the via the audio network 6.

If the signal supply source SS and the signal supply destination SD are both currently connected to ports of the same device (YES determination at step S16), the CPU of the control device proceeds to at step S17, where a connection between the signal supply source SS and the signal supply destination SD is set in the device possessing the signal supply source SS and the signal supply destination SD. In response to the setting of the connection between the signal supply source SS and the signal supply destination SD, the device possessing the signal supply source SS and the signal supply destination SD performs an event process of FIG. 13 in order to set a patch between the signal supply source SS and the signal supply destination SD within that device.

If the signal supply source SS and the signal supply destination SD are to be connected with each other via the audio network 6 (NO determination at step S16), then the CPU of the control device goes to step S18 to search for a transmission channel having an audio signal, supplied from the signal supply source SS, put thereon (i.e., a transmission channel allocated to the signal supply source SS), and if such a transmission channel has been found, it sets the channel number of the found transmission channel as "i".

If there has been found such a transmission channel having the audio signal of the signal supply source SS, put thereon (YES determination at step S19), it means that a "transmission connection" pertaining to the signal supply source SS has already been established in the device possessing the signal supply source SS, i.e. that the signal of the signal supply source SS has already been transmitted to the audio network 6, the CPU of the control device jumps to step S21 without performing an operation of step S20.

If there has not been found such a transmission channel having the audio signal of the signal supply source SS put thereon (NO determination at step S19), it means that no transmission channel has been allocated yet to the signal supply source SS in the device possessing the signal supply source SS (i.e., no-mark blank cell is being displayed for the corresponding input port on the patch setting screen). In this case, the CPU of the control device goes to step S20 to set a "transmission connection" in the device possessing the signal supply source SS. The "transmission connection" to be set here is a setting for transmitting the audio signal, supplied from the signal supply source SS, to the audio network 6 (i.e., a setting for allocating the signal supply source SS to one of the transmission channels of the audio network 6). The CPU of the control device rewrites, on the basis of the "transmission connection", information of the input port, connected with the signal supply source SS, stored in the memory of the device possessing the signal supply source SS. Then, the CPU of the control device transmits the content of the "transmission connection" to the device possessing the signal supply source SS and performs remote control for rewriting signal supply destination information stored in the memory of the device possessing the signal supply source SS. The signal supply destination information is indicative of a signal supply destination SD (i.e., one of the signal supply destinations possessed by the other devices) to which the signal supply source SS is to be connected.

At step S21, the CPU of the control device sets a "reception connection" in the device possessing the signal supply destination SD. The "reception connection" to be set here is a setting for receiving the audio signal, corresponding to the name SSN of the signal supply source SS, from the audio network 6 (i.e., a setting for allocating the transmission channel, having the name SSN put thereon, to the output port connected with the signal supply destination SD). The CPU of the control device rewrites, on the basis of the "reception connection", information of the output port, connected with the supply destination SD, stored in the memory of the control device. Then, the CPU of the control device transmits the content of the "reception connection" to the device possessing the supply destination SD and performs remote control for rewriting "signal supply source information" stored in the memory of the device possessing the supply destination SD. The "signal supply source information" is indicative of a signal supply source SS (i.e., one of the signal supply sources possessed by the other devices) to which the signal supply destination SD is to be connected.

The operations performed by the control device and other related devices at steps S20 and S21 may be summarized as follows. The CPU of the control device at steps S20 and S21 functions as a connection setting section that, in response to a connection instruction given by the human operator, makes a setting for connecting a desired signal supply destination SD to a desired signal supply source SS (i.e., sets a "transmission connection" in the device possessing the supply source SS and a "reception connection" in the device possessing the supply destination SD), to thereby rewrite signal supply destination information and signal supply source information stored in the memory of the device possessing the supply source SS and in the memory of the device possessing the supply destination SD through remote control, performed by the control device, on the devices having the supply destination SD and supply source SS.

The control device stores, into the current memory, connection information indicative of the connection (i.e., "transmission connection" setting of the supply source SS and "reception connection" setting of the supply destination SD) having been set through the behavior of the above-mentioned connection setting section. Each of the devices has stored in its memory signal supply destination information for each signal supply source possessed by the device and signal supply source information for each signal supply destination possessed by the device. Such signal supply destination information and signal supply source information stored in the memory of each of the devices is rewritten through the aforementioned remote control.

—Connection Clearing Process Performed by the Control Device—

FIG. 12 is a flow chart showing an example operational sequence of the connection clearing process performed at step S9 or S12 of FIG. 10. First, at step S22, the CPU of the control device determines whether the signal supply source SS and the signal supply destination SD corresponding to the cell that is an object of the connection clearing process (i.e., the clicked-on cell or "other cell" at step S12) are both in a same device.

If the signal supply source SS and the signal supply destination SD are both in a same device (YES determination at step S22), the CPU of the control device proceeds to step S23 in order to clear the connection between the signal supply source SS and the signal supply destination SD in the device possessing the source SS and destination SD. Namely, the control device not only clears the connection information, indicative of the connection between the signal supply source SS and the signal supply destination SD, stored in the current memory, but also performs remote control for clearing the signal supply source information and signal supply destination information for the supply destination SD and the signal supply source SS, respectively, stored in the memory of the device possessing the supply source SS and the signal supply destination SD.

If the signal supply source SS and the signal supply destination SD are connected with each other via the audio network 6 (NO determination at step S22), then the CPU of the control device branches to step S24 in order to clear or cancel the reception connection of the supply destination SD set in the device possessing the supply destination SD. Namely, the control device not only clears the signal supply source information of (i.e., pertaining to) the supply destination SD stored in its memory but also performs remote control for clearing the corresponding signal supply source information stored in the memory of the device possessing the supply destination SD.

At step S25, the CPU of the control device checks presence of any device, other than the device for which the reception connection has been cleared, has currently set therein a reception connection containing the name SSN. If there is no other device which has currently set therein the reception connection containing the name SSN (NO determination at step S26), the CPU of the control device goes to step S27 in order to clear the transmission connection of the supply source SS set in the device possessing the supply source SS. Namely, the CPU of the control device not only clears the signal supply destination information for the supply source SS stored in the memory of the control device, but also performs remote control for clearing the signal supply destination information of (i.e., pertaining to) the supply source SS stored in the memory of the device possessing the supply source SS.

If there is any other device which has currently set therein the reception connection containing the name SSN (YES determination at step S26), the CPU of the control device ends the process of FIG. 12 without performing the transmission connection clearing operation of step S27, because the audio signal supplied from the supply source SS is being received by the other device than the device for which the reception connection has been cleared.

—Connection Setting within a Same Device, and Cancellation of the Connection Setting—

Figure 13:
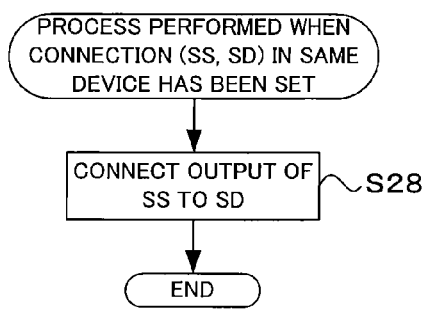
FIG. 13 is a flow chart showing an event process performed by any one of the devices when a connection has been set between a signal supply source and a signal supply destination in the same device.

FIG. 13 is a flow chart showing an example operational sequence of the event process performed by any one of the devices on the network 6 when a connection has been set between a signal supply source SS and a signal supply destination SD in (i.e., possessed by) the same device at step S17 above. Namely, once a connection between a signal supply source SS and a signal supply destination SD in the same device has been set in the control device, that device makes a patch setting for allocating the supply destination SD as an output destination of the supply source SS (see step S28 of FIG. 13). In this way, the output of the supply source SS is connected to the supply destination SD. Such a patch setting within the same device can be performed using a conventionally-known technique.

Figure 14:
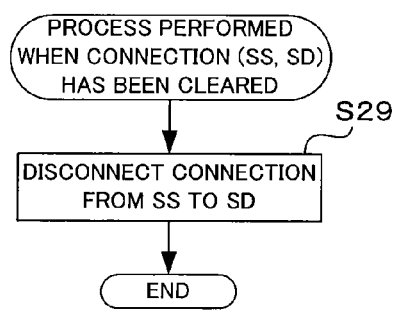
FIG. 14 is a flow chart showing an event process performed by any one of the devices when a connection between a signal supply source and a signal supply destination in the same device has been cleared or canceled.

FIG. 14 is a flow chart showing an example operational sequence of an event process performed by any one of the devices when a connection between a signal supply source SS and a signal supply destination SD in (i.e., possessed by) the same device has been cleared at step S23 above. Namely, once a connection between a signal supply source SS and a signal supply destination SD in the same device has been cleared in the control device, that device cancels the patch setting by which the signal supply destination SD is currently allocated as the output destination of the supply source SS (step S29 of FIG. 14). In this way, the supply destination SD is disconnected from the supply source SS. Such patch setting cancellation within the same device can be performed using a conventionally-known technique.

—Implementation of Transmission Connection in Each of the Devices—

Figure 15:
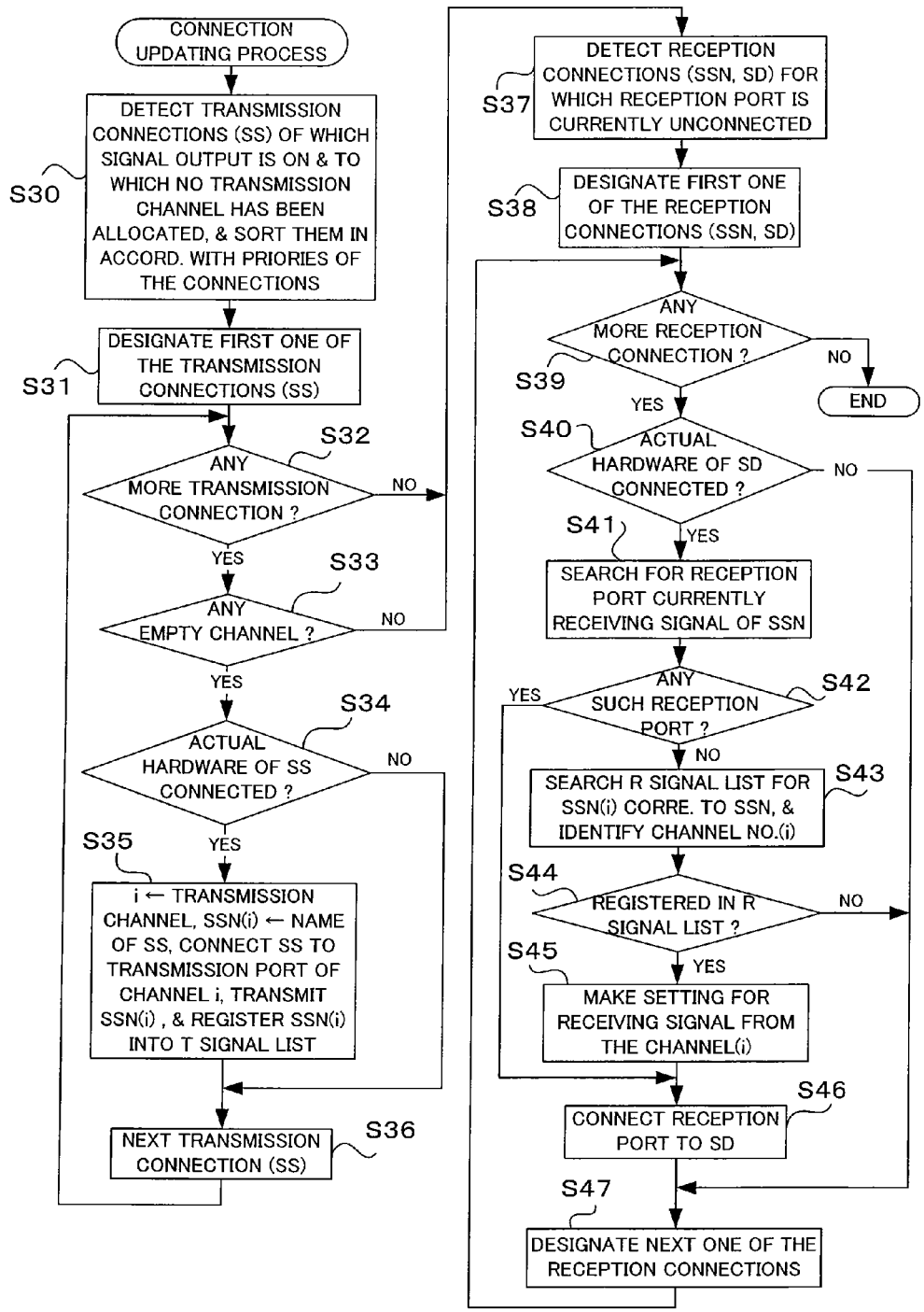
FIG. 15 is a flow chart showing a connection updating process performed periodically by each of the devices connected to the audio network.

FIG. 15 is a flow chart showing an example operational sequence of a connection updating process performed periodically by each of the devices connected to the audio network 6. The device in which a transmission connection has been set by the operation of step S20 stores, into its memory, signal supply destination information indicative of the transmission connection, and the device in which a reception connection has been set by the operation of step S21 stores, into its memory, signal supply source information indicative of the reception connection. Then, through the connection updating process performed periodically by each of the devices, a network input patch setting (actualization or implementation of the transmission connection) is executed on the basis of the stored signal supply destination information, and a network output patch setting (actualization or implementation of the reception connection) is executed on the basis of the stored signal supply source information.

At step S30 of FIG. 15, the CPU of the device in question detects, from among transmission connections having been set by the control device, each transmission connection of which the signal output is ON and to which no transmission channel has been allocated yet, and the CPU also sorts the detected transmission connections in accordance with priorities of the detected transmission connections.

Further, in the instant embodiment, the audio signal output to the audio network 6 can be set ON or OFF for each signal supply source SS. ON/OFF of the audio signal output can be set as desired for each signal supply source SS by the human operator operating the control device or any one of the I/O devices to which the signal supply source SS is currently connected. Each signal supply source SS of which the audio signal output is OFF is not subjected to implementation of a corresponding transmission connection. For each signal supply source SS (input port) of which the audio signal output is OFF, the mark "×" is displayed in the corresponding transmission channel allocation state display portion 74 of the patch setting screen (see FIG. 8C).

Further, in the instant embodiment, the human operator can set a priority (level) for each signal supply source SS via the control device. Details of the priority setting will be discussed later. By the detected transmission connections being sorted in a decreasing order of the priorities at step S30, control can be performed such that a transmission connection of a higher priority is actualized or implemented preferentially. The operation of step S30 is performed by a background process of the device.

At next step S31, the CPU of the device designates a first one of the transmission connections detected and sorted at step S30 above. Then, through the following operations, the CPU of the device implements the transmission connection that connects the signal supply source SS to a transmission channel of the audio network 6. At step S32, a confirmation operation is performed for a later-described loop process. At next step S33, the CPU of the device determines whether the transmission channels reserved by the device include a transmission channel which is not currently being used for transmission of an audio signal (i.e. which is not currently allocated to any signal supply source SS (input port)). If the transmission channels reserved by the device do not include any currently unallocated transmission channel (NO determination at step S33), then the CPU of the device jumps to step S37 without implementing the first transmission connection through the current execution of the connection updating process.

If the transmission channels reserved by the device include any transmission channel that is not currently being used for transmission of an audio signal (YES determination at step S33), the CPU of the device proceeds to step S34 in order to determine whether actual hardware of the supply source SS, for which the transmission connection is to be implemented, is currently connected to any input terminal of the device. If the actual hardware of the supply source SS is not currently connected to any input terminal of the device (i.e., if the actual hardware of the supply source SS is not currently preset within the device) (NO determination at step S34), the CPU of the device jumps to step S36 without implementing the transmission connection at step S35. Namely, each of the devices is constructed in such a manner that, even when a transmission connection has been set for a signal supply source SS, the device leaves the transmission connection unimplemented by not allocating a transmission channel to the supply source SS if the supply source SS is not currently connected to any input terminal of the device (i.e., the supply source SS is not present within the device); in this way, wasting of the transmission channels can be avoided. If the actual hardware of the supply source SS is not currently connected to any input terminal of the device as noted above, the mark "×" is displayed in the cell of the patch setting screen which pertains to the supply source SS in question (see FIG. 8C).

At step S35, the CPU of the device allocates one currently-unallocated transmission channel (i), included among the transmission channels reserved thereby through the aforementioned transmission channel reserving process, as a transmission channel to be used for transmission of the audio signal of the supply source SS. Namely, the CPU of the device sets, as "i", the channel number of the currently-unallocated transmission channel and sets that transmission channel (i) as a transmission channel to be used for transmission of the audio signal of the supply source SS. The CPU of the device also sets, as information SSN(i), a pair of the name SSN of the supply source SS, for which the transmission connection is to be implemented, and the channel number (i). In the aforementioned manner, one of the transmission channels reserved by the device through the aforementioned transmission channel reserving process is allocated to the supply source SS designated by the human operator clicking on the patch setting screen.

Then, the CPU of the device generates a transmission port of the transmission channel (i) and makes a patch setting for connecting the supply source SS (i.e., input terminal connected with the supply source SS) to the transmission port of the transmission channel (i) by means of the patch section (40, 51 or 52 of FIG. 4). The "transmission port" is a port set in the network I/O (13 of FIG. 2A or 23 of FIG. 2B) for the device to transmit an audio signal to the audio network 6. In this manner, the CPU of the device can make a setting such that the audio signal supplied from the supply source SS is output to the network 6 via the allocated transmission channel (i). Namely, the CPU of each of the devices at step S35 functions as a transmission setting section which makes a setting for allocating one transmission channel to the supply source SS on the basis of a set transmission connection (signal supply destination information) and outputting an audio signal from the supply source SS via the allocated transmission channel, and implements the transmission connection pertaining to a patch setting for a cell clicked by the human operator. Further, the CPU of the device stores, into its memory, information indicative of connection states pertaining to the implemented transmission connection (such as information indicative of the name SSN of the supply source SS, input terminal connected with the supply source SS and transmission channel (i)).

According to the above-described operation for implementing the transmission connection, the device possessing the supply source SS only has to set, on the basis of one piece of signal supply destination information stored in its memory, via which transmission channel (i) the audio signal supplied from the supply source SS is to be transmitted. Thus, the device possessing the supply source SS can perform the operation for implementing the transmission connection without checking presence or absence of a device possessing the signal supply destination SD and checking presence or absence of the actual hardware of the supply destination SD in the device that should possess the supply destination SD.

Thus, the device possessing the supply source SS can constantly perform the same transmission operation regardless of presence or absence of the device possessing the signal supply destination SD and the like. Therefore, even when some of the other devices in the system has come to be no longer present in the mixing system, the audio signal transmitting operation of each of the other devices can continue as before. For example, even when the engine 2 functioning as a main component of the mixing system has come to be no longer present in the mixing system due to powering-off or disconnection from the network, the audio signal transmitting operation of each of the other devices can continue as before. Namely, even when some of the devices in the system has come to be no longer present in the mixing system, the audio signal transmitting operation can continue in the system as a whole.

Further, because there is no need to perform negotiation between the device possessing the supply source SS and the device possessing the signal supply destination SD via the audio network 6 and because the same operation can be constantly performed regardless of presence or absence of the device possessing the signal supply destination SD and the like, the instant embodiment can extremely simplify the control for implementing each transmission connection to be performed by each of the devices. Thus, even a device possessing only a relatively simple control means can perform the aforementioned operation without involving an excessive load.

Further, at step S35, the CPU of the device not only informs all of the other devices on the network 6 of the set information SSN(i), but also registers the information SSN(i) into its own T signal list. Also, each of the other devices having received the information SSN(i) registers the signal output information SSN(i) into its R signal list through a later-described process. Because the information SSN(i) is informed to each of the other devices as noted above, all of the devices on the network 6 can know the name SSN of the supply source SS written in the transmission channel (i). Namely, the CPU of each of the devices functions as an output informing or notifying section that transmits, to all of the devices connected to the audio network 6, the information SSN(i) indicative of the name SSN of the supply source SS of the audio signal, which is being output to the transmission channel (i), through the operation of step S35.

After having implemented the first transmission connection designated at step S31 above, the CPU of the device performs a loop process of steps S32 to S36 so as to sequentially implement all of the transmission connections, detected at step S30, on a one-by-one basis. The detected transmission connections are also sorted, at step S30, in accordance with their priorities as set forth above. Thus, even where the number of the transmission channels reserved by the device is less than the number of the detected transmission connections, a transmission channel is allocated to the supply source SS relatively reliably for each of the transmission connections which has a high priority. When all of the transmission connections have been implemented and there is no more transmission connection to be implemented (NO determination at step S32), or when all of the transmission channels reserved by the device have been allocated and there is no more unallocated (empty) transmission channel (NO determination at step S33), the CPU of the device proceeds to step S37.

The priority control performed in implementing the transmission connections at steps S32 to S36 is closed control within the device which comprises only sorting the transmission connections in accordance with the priorities of the transmission connections. Because the priority control does not take into consideration relationships with other devices having signal supply destinations of the transmission connections and operates in the same manner irrespective of which of the devices on the network are the other devices having the signal supply destinations of the transmission connections, it can be implemented through an extremely simple process. A conventionally-known process for allocating a transmission channel of a network of the Ethernet (registered trademark) standard or the like is arranged to allocate a transmission channel to a connection setting between nodes (signal supply source and destination), but not arranged to allocate a transmission channel to a transmitting node (signal supply source) of a connection setting as in the above-described embodiment of the present invention; namely, the conventionally-known process does not employ closed control performed in the transmitting node. Therefore, in a case where priority control is performed for a connection setting between nodes in an ordinary network in the conventionally-known manner, which of the nodes is a signal supply source of the connection setting would influence the priority control; as a consequence, the process for performing the priority control in the conventionally-known manner would be complicated. By contrast, the above-described embodiment of the present invention allows the priority control to be performed through an extremely simple process.

—Implementation of Reception Connection in Each of the Devices—

At step S37 of FIG. 15, the CPU of the device in question detects, from among reception connections having been set by the control device, each reception connection for which a reception port is currently unconnected. The "reception port" is a port set in the network I/O (13 of FIG. 2A or 23 of FIG. 2B) for the device to receive an audio signal from a transmission channel of the audio network 6. Further, "reception connection for which a reception port is currently unconnected" is a reception connection where no transmission channel has been allocated to a signal supply destination SD, i.e. a reception connection which has not yet been implemented. The operation of step S37 is performed by a background process of the device.

At next step S38, the CPU of the device designates a first one of the reception connections detected at step S37 above. Then, through the following operations, the CPU of the device implements the reception connection that connects the signal supply source SS to a signal supply destination SD. At step S39, a confirmation operation is performed for a later-described loop process. At next step S40, the CPU of the device determines whether actual hardware of the supply destination SD for which the reception connection is to be implemented is currently connected to any output terminal of the device. If the actual hardware of the supply destination SD is not currently connected to any output terminal of the device (i.e., if the actual hardware of the supply destination SD is not currently present within the device), the CPU of the device jumps to step S47 without implementing the reception connection, and the mark "×" is displayed in the cell of the patch setting screen which corresponds to the supply destination SD (see FIG. 8C).

At step S41, the CPU of the device searches for a reception port that is currently receiving an audio signal transmitted from the supply source SS of the name SSN indicated in the reception connection setting. Note that, in association with the individual reception ports of the device, the memory of the device has stored therein the names SSN of supply sources SS of audio signals being received by the reception ports. By reference to such stored content of the memory, the CPU of the device can determine whether any one of the reception ports is currently receiving the audio signal of the supply source SS of the name SSN. If any one of the reception ports is currently receiving the audio signal of the supply source SS of the name SSN (YES determination at step S42), the CPU of the device proceeds to step S46 because that one reception port can be used for the reception connection to be implemented at this time.

If none of the reception ports is currently receiving the audio signal of the supply source SS of the name SSN (NO determination at step S42), the CPU of the device goes to step S43, where the CPU searches for information SSN(i) corresponding to the supply source name SSN by reference to the R signal list possessed by that CPU. In this way, the CPU identifies the channel number (i) of the transmission channel having the signal of the supply source SS put thereon. If the information SSN(i) corresponding to the supply source name SSN indicated in the reception connection setting is not registered in the R signal list (NO determination at step S44), the CPU determines that no audio signal is currently being transmitted from the supply source SS of the name SSN (i.e. that a transmission connection therefor has not been implemented), so that it jumps to step S47 without implementing the reception connection in question through operations of steps S45 and S46.

If the information SSN(i) corresponding to the supply source name SSN indicated in the reception connection setting is registered in the R signal list and the channel number (i) of the transmission channel having the signal of the supply source SS put thereon has been successfully identified (YES determination at step S44), the CPU of the device generates a reception port for receiving the audio signal from the identified transmission channel (i) and makes a setting for receiving the audio signal from the transmission channel (i), at step S45.

At next step S46, the CPU of the device connects the generated reception port to the supply destination SD (i.e., output terminal connected with the supply destination SD) by means of the patch section (55, 56 or 57 of FIG. 4). In this way, the device possessing the supply destination SD can receive, via the reception port, the audio signal, corresponding to the name SSN, put on the transmission channel (i) and supply the received signal, corresponding to the name SSN, to the supply destination SD. Namely, at steps S45 and S46, the CPU of each of the devices on the network 6 functions as a reception setting section that determines, for each supply destination SD possessed by the device, determines a transmission channel (i), via which to receive an audio signal, on the basis of a set reception connection (signal supply source information) and information SSN(i) received from the other devices and receives the audio signal from the transmission channel (i), and thereby implements the reception connection pertaining to a patch setting for a cell clicked on by the human operator. Further, the CPU of the device stores, into its memory, information indicative of connection states pertaining to the implemented reception connection (such as information of the supply destination SD, output terminal connected with the supply destination SD, name SSN of the supply source SS of the audio signal being received via the reception port and transmission channel (i)).

After having implemented the first reception connection, designated at step S38 above, through the above-described process, the CPU of the device performs a loop process of steps S39 to S47 so as to sequentially implement all of the reception connections, detected at step S37, on a one-by-one basis.

According to the above-described process for implementing the reception connection, the device in question can determine a transmission channel (i), via which to receive an audio signal, for each signal supply destination SD possessed by the device, and can receive the audio signal via the thus-determined transmission channel. Thus, the device possessing the supply source SS can perform the operation for implementing the reception connection to start reception of the audio signal, without performing negotiation with the device possessing the signal supply source SS.

Because the device possessing the signal supply destination SD implements the reception connection by connecting the supply destination SD to the transmission channel having the audio signal of the supply source SS put thereon, it can continue its audio signal receiving operation even when some of the other devices in the system has come to be no longer present in the mixing system due to powering-off or disconnection from the network 6. Namely, even when some of the devices in the system has come to be no longer present in the mixing system due to powering-off or disconnection from the network 6, the mixing system can continue the audio signal transmitting and receiving operations between the other devices remaining in the system.

The following summarize the operations performed by each of the devices in the connection updating process of FIG. 15 in response to one patch setting instructed by the human operator via the control device.

When the human operator has instructed, via the control device, one patch setting (i.e., connection between a signal supply source SS and a signal supply destination SD), a device for which a transmission connection has been set through the instructed patch setting, performs the connection updating process of FIG. 15, so as to function as a supply source setting section that performs the aforementioned operation of step S35 for allocating one currently-unused transmission channel, included among a plurality of transmission channels reserved by the device, to the signal supply source SS designated by the patch setting.

Further, the device for which a reception connection has been set through the instructed patch setting, performs the connection updating process of FIG. 15, so as to function as a supply destination setting section that performs the aforementioned operation of step S45 for receiving an audio signal of the transmission channel allocated to the supply source SS by the above-mentioned supply source setting section and then supplies the received audio signal to the supply destination SD.

Thus, even where the patch setting is for connecting the supply source SS and the supply destination SD via the audio network 6, one transmission channel, included among the plurality of transmission channels reserved by the device, is selected in response to a human operator's connection instruction given by the human operator merely clicking on a connection between the desired supply source SS and supply destination SD on the patch setting screen displayed on the control device. As a consequence, the connection between the supply source SS and the supply destination SD is executed using the selected transmission channel.

Further, even when a transmission connection has been set in response to a patch setting instruction by the human operator, if the transmission channels reserved by the device for which the transmission connection has been set do not include any transmission channel currently unused for audio signal transmission (i.e., if there is no available or empty transmission channel), a NO determination is made at step S33 of FIG. 15, so that no transmission channel is allocated to the supply source SS and thus the transmission connection is not actualized or implemented. Namely, by implementing the transmission connections only within the limits of the transmission channels reserved in advance by each of the devices, the instant embodiment can limit output bands of the device (i.e., transmission bands or channels to be used by the device for audio signal transmission). Thus, if the desired transmission connection can not be actualized or implemented due to lack of a currently-unused (and hence currently-available) transmission channel in the device for which the transmission connection has been set, the CPU 10 of the control device displays the connection mark "○" in the corresponding cell through the operation of step S15 of FIG. 10 and warns the human operator that the transmission channels are lacking.

If the transmission connection has not been implemented, a NO determination is made at step S44 because information SSN(i) corresponding to the supply source SS is not registered in the R signal list of the device when the device for which the reception connection corresponding to the transmission connection has been set, performs the connection updating process. Because of the NO determination at step S44, the reception connection corresponding to the transmission connection is not implemented either. Thus, the connection between the supply source SS and the supply destination based on the patch setting instruction is not implemented. In such a case, in the device possessing the supply destination SD to be connected with the supply source SS (i.e., in the device indicated by the signal supply destination information of the supply source SS), a silent signal supply source (i.e., not-shown zero-level signal supply source described above with reference to FIG. 4) within the device may be connected locally to the supply destination SD so that a silent signal is output from the supply destination SD.

When the patch setting instructed by the human operator has been implemented as a result of the connection updating process of FIG. 15 being performed by each of the device for which the transmission connection was set and the device for which the reception connection was set, the connection mark "●" is displayed, through the operation of step S15 of FIG. 10, in the cell, corresponding to the patch setting in question, on the patch setting screen displayed on the control device.

Further, when the transmission connection has not been implemented due to lack of a currently-unused transmission channel (NO determination at step S33), the connection mark "○" is displayed, through the aforementioned operation of step S15 of FIG. 10, in the corresponding cell. If there is no device for which the transmission connection has been set or there is no device for which the reception connection has been set, or if the actual hardware of the supply source SS or supply destination SD is not present (NO determination at step S34 or S40), the connection mark "×" is displayed, through the aforementioned operation of step S15 of FIG. 10, in the corresponding cell. Namely, the CPU of the control device performs control for displaying the predetermined connection mark that differs in display style between the case where the instructed patch setting has been successfully implemented and the case where the instructed patch setting has not been successfully implemented. The display of such a connection mark allows the human operator to know the result of the patch setting.

Further, consider a case where the number KN of the reserved transmission channels has increased (by one or more new transmission channels being reserved by the process of FIG. 7 or by a later-described process of FIG. 27) in a device which has a patch setting instructed by the human operator but left unimplemented (i.e. a patch setting for which the connection mark "○" has been displayed in the corresponding cell) because a transmission connection has not been successfully implemented due to lack of an unused transmission channel (NO determination at step S33). In such a case, the increase in the number KN of the reserved transmission channels allows the patch setting left unimplemented to be automatically implemented. Namely, the device, which has the unimplemented transmission connection, allocates an available or empty transmission channel, having occurred because of the increase in the number KN of the reserved transmission channels, to the supply source SS corresponding to the transmission connection during the connection updating process. Thus, a device possessing a signal supply destination SD to be connected to the supply source SS implements a reception connection corresponding to the transmission connection having so far been left unimplemented during the connection updating process. Because the connection updating process is performed periodically by each of the devices connected to the audio network 6, the patch setting having so far been left unimplemented can be automatically implemented if the number KN of the transmission channels, reserved by the device for which the transmission connection has been set, increases as noted above.

—Reception Connection Cancellation in Each of the Devices—

Figures 16, 17:
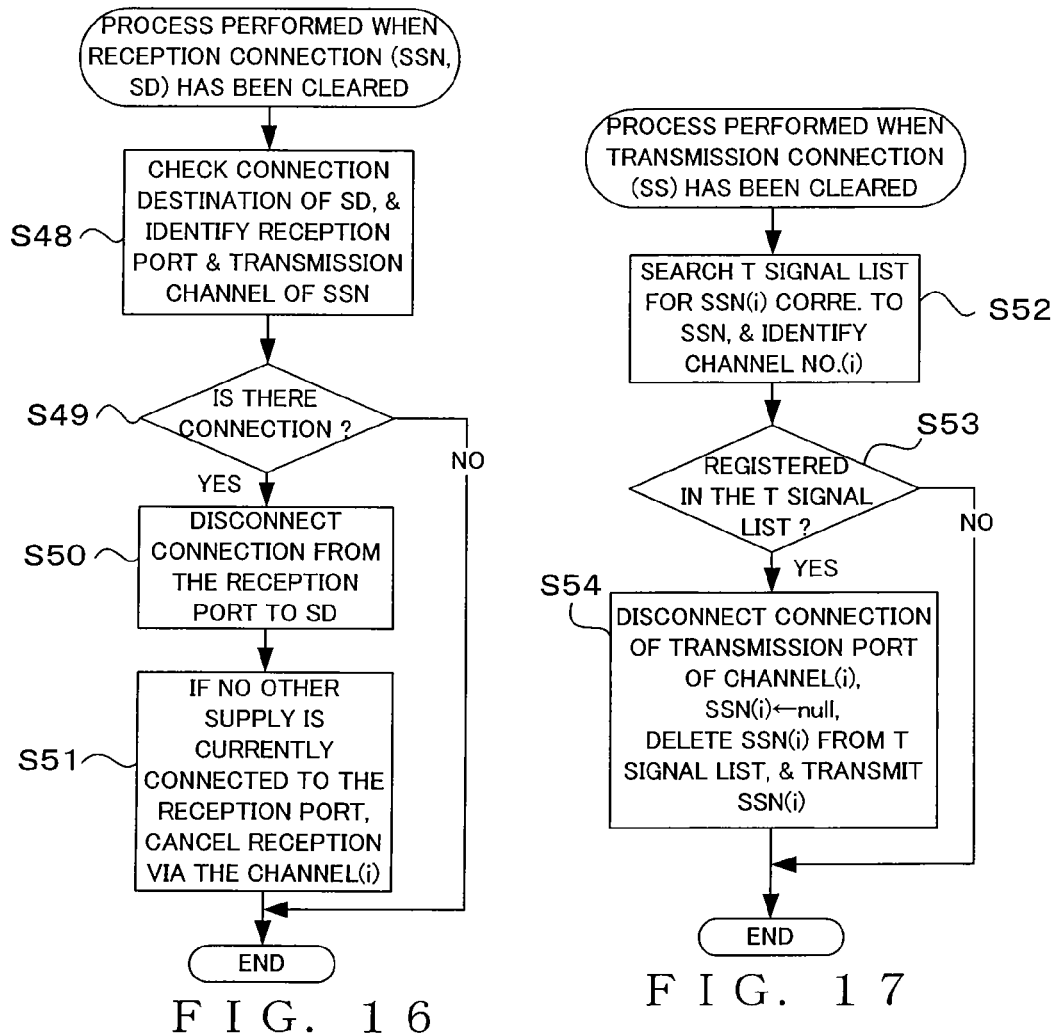
FIG. 16 is a flow chart showing an event process performed by any one of the devices when a reception connection of a signal supply destination possessed by the device has been canceled.
FIG. 17 is a flow chart showing an event process performed by any one of the devices when a transmission connection of a signal supply destination possessed by the device has been canceled.

FIG. 16 is a flow chart showing an example operational sequence of an event process performed, in response to clearing or cancellation by the control device of a reception connection at step S24 of FIG. 12, by a device for which the reception connection has been canceled (i.e., a device possessing a signal supply destination SD). At step S48, the CPU of the device possessing the signal supply destination SD identifies a signal supply source SS, connected with the supply destination SD, on the basis of signal supply source information of (i.e. pertaining to) the supply destination SD corresponding to the canceled reception connection, and it also identifies a reception port connected with the supply destination SD and a transmission channel i of the reception port. If there is no connection from the reception port to the supply destination SD (NO determination at step S49), it means that no reception connection has been made in the device, and thus, the CPU of the device ends the instant event process.

If there is a connection from the reception port to the supply destination SD (YES determination at step S49), the CPU of the device proceeds to step S50, where it disconnects the connection between the supply destination SD and the reception port. Then, at step S51, the CPU of the device cancels the signal reception by the device via the transmission channel i if no other supply destination than the disconnected supply destination SD is currently connected to the above-mentioned reception port, so as to eliminate the reception port. Further, if there is another supply destination currently connected to the reception port (NO determination at step S49), the CPU of the device maintains the reception port at step S51 without canceling the signal reception of the transmission channel i.

Because there is an upper limit on the number of reception ports to be generated for each of the devices (i.e. there is an upper limit on the number of transmission channels connectable to signal supply destinations SD in each of the devices), the instant embodiment is arranged to dynamically control setting and cancellation of reception of transmission channels (i.e., generation and elimination of reception ports) through the aforementioned operations. Namely, when there has arisen a need for reception of a given transmission channel, such signal reception of the transmission channel is set and a reception port is generated through the operations of steps S45 and S46 of FIG. 15. Further, when a need for reception of a given transmission channel has disappeared, the reception of the transmission channel is canceled and the reception port is eliminated through the operation of step S51 of FIG. 16.

In case there are no limits on the transmission bands to be used by each of the devices for receiving audio signals via the audio network 6 and any number of reception ports can be generated without limitations, the device may be constructed to always receive transmission channels not reserved by the device, or all transmission channels registered in the R signal list (i.e., transmission channels reserved by all of the devices on the network) and generate all reception ports for reception of these transmission channels. In such a case, there is no longer the need for dynamically set and cancel reception of the transmission channels, so that the reception connection setting process included in the connection updating process shown in FIG. 15 and the reception connection cancellation process shown in FIG. 16 can be simplified.

—Transmission Connection Cancellation in Each of the Devices—

FIG. 17 is a flow chart showing an example operational sequence of an event process performed, in response to clearing or cancellation by the control device of a transmission connection at step S27 of FIG. 12, by a device for which the transmission connection has been canceled (i.e., a device possessing a signal supply source SS). At step S52, the CPU of the device possessing the signal supply destination SD searches its own T signal list for information SSN(i) corresponding to the supply source SS (name SSN of the supply source SS) of the transmission connection to be cleared, and identifies the channel number (i) of a transmission channel being used for transmission of an audio signal of the supply source SS.

If the information SSN(i) corresponding to the supply source name SSN is in the T signal list (YES determination at step S53), the CPU of the device goes to step S54, where it disconnects a connection between a transmission port of the identified transmission channel (i) and the supply source SS of the name SSN and also sets "null" into the information SSN(i). Then, the CPU of the device not only deletes the record of the information SSN(i) from its own T signal list, but also transmits the information SSN(i), having "null" set therein, to the other devices on the audio network 6. In this manner, the transmission connection is canceled.

—Updating Process of the R Signal List—

Figure 18:
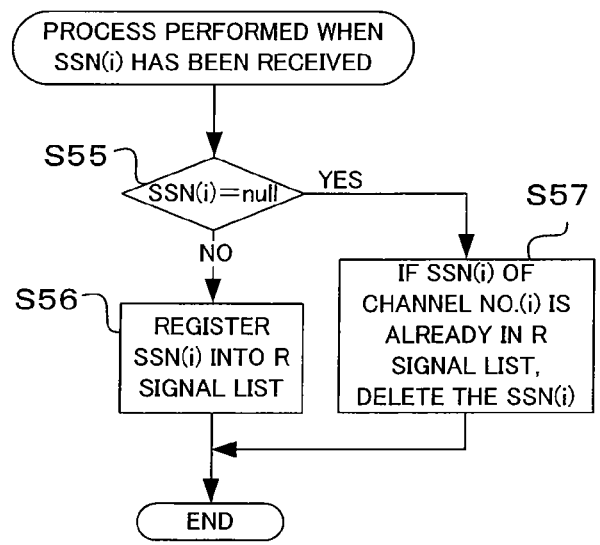
FIG. 18 is a flow chart showing a process performed by any one of the devices when information SSN(i) has been received by the device from another device on the network.

FIG. 18 is a flow chart showing an example operational sequence of a process performed by any one of the devices when information SSN(i) has been received from another of the devices on the network 6. At step S55, the CPU of the device determines whether or not the value of the received information SSN(i) is "null". If the received information SSN(i) has the name SSN of a signal supply source SS set therein (NO determination at step S55), the CPU of the device adds the received information SSN(i) to the R signal list possessed by that device (step S56). In this manner, the device stores the name SSN of the supply source SS of an audio signal being transmitted from the other device in association with a transmission channel (i) being used for the audio signal transmission.

If, on the other hand, the received information SSN(i) is "null" (YES determination at step S55) and if information SSN(i) of the number (i) is already registered in the R signal list possessed by the device in question, the CPU deletes the information SSN(i) from the R signal list at step S57. For example, when a connection between a transmission port of the transmission channel (i) and the signal supply source SS has been disconnected by another of the devices on the network 6 and signal output information SSN(i) having "null" set therein has been received (see step S54 etc.), the device having received the information SSN(i) having "null" set therein deletes the information SSN(i) from its own R signal list because the information SSN(i) is already registered in the R signal list of the device.

As set forth above, even when a device has reserved transmission channels (i) at the time of joining the network 6, the device sets "null" into information SSN(i) for each of the reserved transmission channels (i) and transmits to the other devices the information SSN(i) having "null" set therein (see step S7 of FIG. 6). However, because that information SSN(i) is not yet registered in the R signal lists of the other devices, each of the other devices having received the information SSN(i) need not perform any process.

Whereas the instant embodiment has been described above as constructed to record information SSN(i) which is not "null" into the R signal list of each of the devices on the audio network 6, it may be constructed to record information SSN(i) of all transmission channels reserved by the other devices, including information SSN(i) which is "null", into the R signal list of each of the devices. The same can be said for the T signal list as well. Namely, whereas the instant embodiment has been described above as constructed to record information SSN(i), which is not "null", into the T signal list of each of the devices on the audio network 6, it may be constructed to record information SSN(i) of all transmission channels reserved by the device, including information SSN(i) which is "null", into the T signal list of the device. Further, whereas the instant embodiment has been described above in relation to the case where the R signal list and T signal list possessed by each of the devices are constructed as separate lists, the R signal list and T signal list may be combined or united together into a single list. Namely, each of the devices may have a single list having recorded therein information SSN(i) of all transmission channels of the mixing system, in which case a portion of the single list corresponding to transmission channels reserved by the device is used as the T signal list while the remaining portion of the single list is used as the R signal list.

—Input and Output Patches of the Mixing Engine—

The description given above about the patch setting with reference to the flow charts of FIGS. 10-17 has explained a connection between a signal supply source SS (input port) and a signal supply destination SD (output port). The instant embodiment behaves substantially similarly to the aforementioned when a connection is to be made between a signal supply source SS (input port) and an input channel of the mixing engine 2, except that the "supply destination SD (output port)" in the explanation about the connection between the supply source SS and the supply destination SD should be read as "input channel".

Namely, when a connection setting is to be made between a signal supply source SS (input port) and an input channel of the engine 2, the CPU of the control device not only sets a transmission connection for a device possessing the supply source SS (step S20 of FIG. 11) but also sets a reception connection for the engine 2 having the input channel (step S21 of FIG. 11). Then, the CPU of the engine 2 sets reception of a transmission channel i having an audio signal of the supply source SS put thereon and connects a reception port of the transmission channel i to the input channel (steps S45 and S46 of FIG. 15). Once the connection setting is cleared or canceled, the CPU of the control device cancels the reception connection for the engine 2 having the input channel (step S24 of FIG. 11), but also cancels the transmission connection for the device possessing the supply source SS (step S27 of FIG. 12) as necessary. Then, the CPU of the engine 2 disconnects the connection from the reception port of the transmission channel i to the input channel, and, if there is no other input channel currently connected to that reception port, the CPU of the engine 2 cancels the reception of the transmission channel i to eliminate the reception port (steps S50 and S51 of FIG. 16).

Further, when a connection setting is to be made between an output channel of the mixing engine 2 and a signal supply destination SD (output port), operations generally similar to those described in the preceding paragraph are performed, except that the "supply source SS" in the description about the connection setting between the supply source SS and the supply destination SD should be read as "output channel". Namely, when a connection setting is to be made between an output channel of the mixing engine 2 and a signal supply destination SD (output port), the control device not only sets a transmission connection for the engine 2 having the output channel (step S20 of FIG. 11) but also sets a reception connection for a device possessing the supply destination SD (step S21 of FIG. 11). The engine 2 sets, as a transmission channel (i) one of transmission channels reserved thereby, generates a transmission port of the transmission channel (i) and connects the above-mentioned output channel to the transmission port of the transmission channel (i) (step S35 of FIG. 15). At that time, the engine 2 sets, as information SSN(i), a pair of the name SSN of an output signal of the output channel (i.e., name SSN of the supply source SS of the signal) and the transmission channel (i), and it transmits the information SSN(i) to the other devices on the network 6 but also registers the information SSN(i) into its own T signal list.

When the connection setting is to be cleared or canceled, the CPU of the control device cancels the reception connection for the device possessing the supply destination SD (step S24 of FIG. 11) but also cancels the transmission connection for the engine 2 having the output channel (step S27 of FIG. 12). Then, the CPU of the engine 2 disconnects the connection from the above-mentioned output channel to the transmission port of the transmission channel i, sets "null" into the information SSN(i), transmits the information SSN(i) to the other devices on the network 6, and deletes the information SSN(i) from the T signal list (step S54 of FIG. 17).

—Explanation about the Simplified UI—

Figure 19:
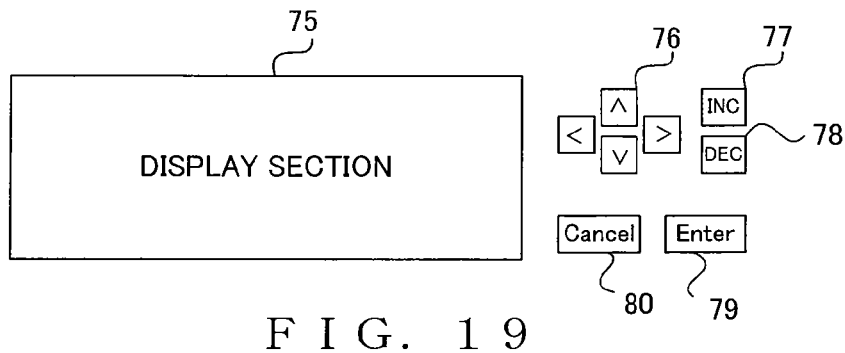
FIG. 19 is a diagram showing an example construction of a simplified UI of each of the I/O devices.

The foregoing description has explained how a patch setting is made via the patch setting screen displayed on the display section of the control device. In the mixing system of the invention, each of the I/O devices 3-5 is equipped with the simplified operator (user) interface (i.e., simplified UI) 25 including a display section and controls, so that a local patch setting within the I/O can be made using the simplified UI 25. FIG. 19 is a diagram showing an example construction of the simplified UI 25 of each of the I/O devices 3-5.

As shown in FIG. 19, the simplified UI 25 includes the display section 75 and controls. The display section 75 is, for example, in the form of an LED display and/or the like, and it can display later-described patch setting screens under the control of the CPU 20. The controls include cursor keys 76, an increment switch 77, a decrement switch 78, an enter key 79 and a cancel key 80. As shown, the simplified UI 25 is of a very simple construction.

The human operator can call up the patch setting screen for a signal supply destination SD (i.e., SD patch setting screen) or signal supply source SS (i.e., SS patch setting screen) to the display section 75 of the I/O device, and can make a patch setting for the supply destination SD or supply source SS via the patch setting screen displayed on the display section 75. The patch setting for a supply destination SD is a setting for connecting a signal supply source SS (input port), possessed by the device, or an input from the network 6 to the signal supply destination SD (output port) possessed by the device. Further, the patch setting for a supply source SS is a setting for connecting a signal supply destination SD (output port), possessed by the device, or an output of the network 6 to the signal supply source SS (input port) possessed by the device.

—SD Patch Setting Screen—

Figure 20A:
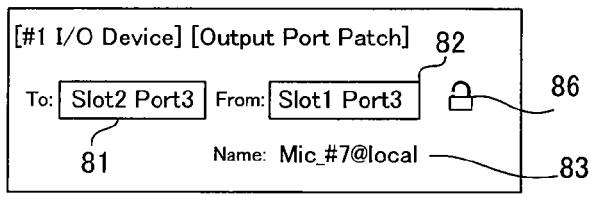
FIG. 20A is a diagram showing a patch setting screen for a signal supply destination SD displayed on a display section of the I/O device of FIG. 19 when a signal supply source SS in the same I/O device has been selected as a connection destination of the signal supply destination.
Figure 20B:
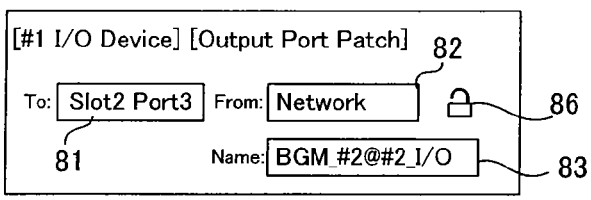
FIG. 20B is a diagram showing the patch setting screen for a signal supply destination SD displayed on the display section of the I/O device of FIG. 19 when the network has been selected as a connection destination of the signal supply destination SD.

FIGS. 20A and 20B are diagrams showing an example construction of the SD patch setting screen. In FIGS. 20A and 20B, character strings "#1 I/O Device" and "Output Port Patch", displayed in an uppermost horizontal row of the screen, indicate that the instant patch setting screen is a screen for setting a patch to an output port (i.e., signal supply destination connected to the output port) of the first I/O device.

In a "To:" portion 81 shown in each of FIGS. 20A and 20B, the human operator can select one output port from a list of all of the output ports possessed by the I/O device. The name of the selected output port is displayed in the "To:" portion 81. The output port name comprises a pair of the slot number ("Slot2" in the figures) of a slot having the output port (output terminal) attached hereto and the terminal number ("Port3" in the figures) of the output terminal. Further, in a "From:" portion 82 located to the right of the "To:" portion 81, the human operator can select, as a connection destination (signal supply source) for each output port selected via the "To:" portion 81, one input port from among all of the input ports (i.e., local input ports) possessed by the I/O device or an input from the network 6.

More specifically, FIG. 20A shows an example where a local input port has been selected by the human operator via the "From:" portion 82 so that the name of the input port (input terminal) is displayed in the "From:" portion 82. In this case, the human operator can instruct, via the patch setting screen, a local patch setting (local connection) for allocating the input port (supply source SS), selected via the "From:" portion 82, to the output port (supply destination SD) selected via the "To:" portion 81. The name of the input port too comprises a pair of the slot number ("Slot1" in the figure) and the terminal number ("Port3" in the figure). Further, the name SSN assigned to the supply source SS connected to the input port (input terminal) selected via the "From:" portion 82 is displayed in a "Name:" portion 83. Note that, because one name is determined for the input port selected via the "From:" portion 82, a rectangular frame is not depicted in the "Name:" portion 83 unlike in the other display portions 81 and 82. Namely, the "Name:" portion 83 is not arranged to allow the human operator to select a name via the "Name:" portion 83.

FIG. 20B shows an example where an input from the network 6 has been selected by the human operator via the "From:" portion 82 so that "Network" is displayed in the "From:" portion 82. In this case, the human operator can select, via the "Name:" portion 83, one supply source name SSN from among a plurality of names SSN(i), registered in the R signal list possessed by the I/O device, using the controls 76-80. By selecting the supply source name SSN via the "Name:" portion 83, the human operator can designate an audio signal to be received from the audio network 6. Namely, via the patch setting screen, the human operator can instruct a reception connection for allocating a reception port of a transmission channel, having put thereon the audio signal selected via the "Name:" portion 83, to the output port (supply destination SD) selected via the "To:" portion 81.

—SS Patch Setting Screen—

Figure 21A:
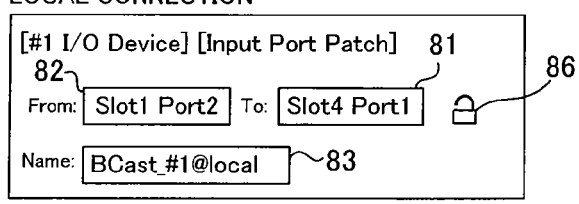
FIG. 21A is a diagram showing a patch setting screen for a signal supply source SS displayed on a display section of the I/O device of FIG. 19 when a signal supply destination SD in the same I/O device has been selected as a connection destination of the signal supply source SS.
Figure 21B:
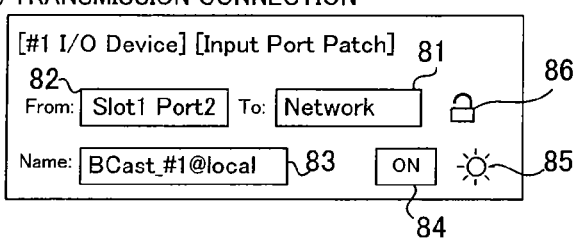
FIG. 21B is a diagram showing the patch setting screen for a signal supply source SS displayed on the display section of the I/O device of FIG. 19 when the network has been selected as a connection destination of the signal supply source SS.

FIGS. 21A and 21B are diagrams showing an example construction of the SS patch setting screen. In FIGS. 21A and 21B, character strings "#1 I/O Device" and "Input Port Patch", displayed in an uppermost horizontal row of the screen, indicate that the instant patch setting screen is a screen for setting a patch of an input port (i.e., signal supply source connected to the input port) of the first I/O device.

On the SS patch setting screen, a "From:" portion 82 is located to a left end region of the screen, and a "To:" portion 81 is located to the right of the "From:" portion 82. The human operator can select, via the "From:" portion 82, one input port from among all of the input ports possessed by the I/O device, and the selected input port is displayed in the "From:" portion 82. Further, via the "To:" portion 81, the human operator can select, as a connection destination (signal supply destination) for the input port selected via the "From:" portion 82, one output port from among all of the output ports (i.e., local output ports) possessed by the I/O device or an output from the network 6.

On the SS patch setting screen, the human operator sets, via the "Name:" portion 83, a supply source name SSN for the input port (supply source SS) selected via the "From:" portion 82. The setting of the supply source name SSN can be made by selecting one supply source name ssn from among a plurality of supply source names ssn registered in a name list possessed by each of the devices. Through a later-described process, the CPU of each of the devices assigns a device ID to the selected supply source name ssn to thereby create a supply source name SSN unique in the mixing system. As noted above, the names ssn registered in the name list are, for example, generic names indicative of types of audio signals (such as "BGM" and "Mic"), or names of the ports to which are connected the signal supply sources SS.

To allow each of the I/O devices 3-5 to make such name settings, the control device creates in advance, for each of the I/O devices 3-5, a name list having a plurality of supply source names registered therein and transfers the thus-created name list to the I/O device in question for storage in the I/O device. When an audio signal supplied from a signal supply source SS is to be received by another of the devices on the network 6, the other device determines a transmission channel (i) for receiving the audio signal, on the basis of the name SSN of the supply source SS. Thus, each of the names SSN must be unique in the mixing system. Thus, each signal supply source name SSN, having been set for any signal supply source is made invalid in the name list so that it can not be set for any other signal supply source SS.

FIG. 21A shows an example where a local output port has been selected by the human operator via the "To:" portion 81 so that the name of the output port is displayed in the "To:" portion 81. In this case, a patch setting (local connection) is made for allocating an input port (supply source SS), selected via the "From:" portion 82, to the local output port (supply destination SD) selected via the "To:" portion 81. Whereas the patch section in the instant embodiment is constructed to allow each input port (signal supply source SS) to be connected to a plurality of connection destinations (a plurality of output ports or audio network 6), the SS patch setting screen in each of the I/O devices in the instant embodiment is designed to allow each output port (signal supply destination SD) to be connected to only one output port (one signal supply destination SD).

FIG. 21B shows an example where an output to the network 6 has been selected by the human operator via the "To:" portion 81 so that "Network" is displayed in the "To:" portion 81. In this case, a transmission connection is made for allocating an input port (supply source SS), selected via the "From:" portion 82, to a transmission port of a transmission channel. Another device which receives an audio signal transmitted to the network 6 via the transmission connection determines a transmission channel for the other device to receive the audio signal, on the basis of the name SSN of a supply source SS selected via the "Name:" portion 83. For the purpose of determining the transmission channel, the memory of each of the devices stores therein, in association with reception ports possessed by the device, the names of supply sources SS of audio signals received via the reception ports, as set forth above.

When an output to the network 6 has been selected by the human operator via the "To:" portion 81 as noted above, a signal output ON/OFF setting portion 84 is displayed on the setting screen. The signal output ON/OFF setting portion 84 is a GUI which sets, in response to operation by the human operator, whether the audio signal SSN (signal name "BCast_#1@local" in the illustrated example) input via the input port is to be output to the network 6 (ON) or not (OFF). The signal output ON/OFF setting portion 84 is, for example, in the form of a button image operable to switch between an ON state and an OFF state. When the signal output ON/OFF setting portion 84 is in the ON state, a transmission channel allocation state is displayed by an indicator 85 next to the right of the signal output ON/OFF setting portion 84. Namely, the indicator 85 is illuminated when a transmission channel is currently allocated to the input port, but deilluminated when no transmission channel is allocated to the input port.

—Patch Setting between a Signal Supply Destination SD and a Connection Destination Thereof—

Figure 22:
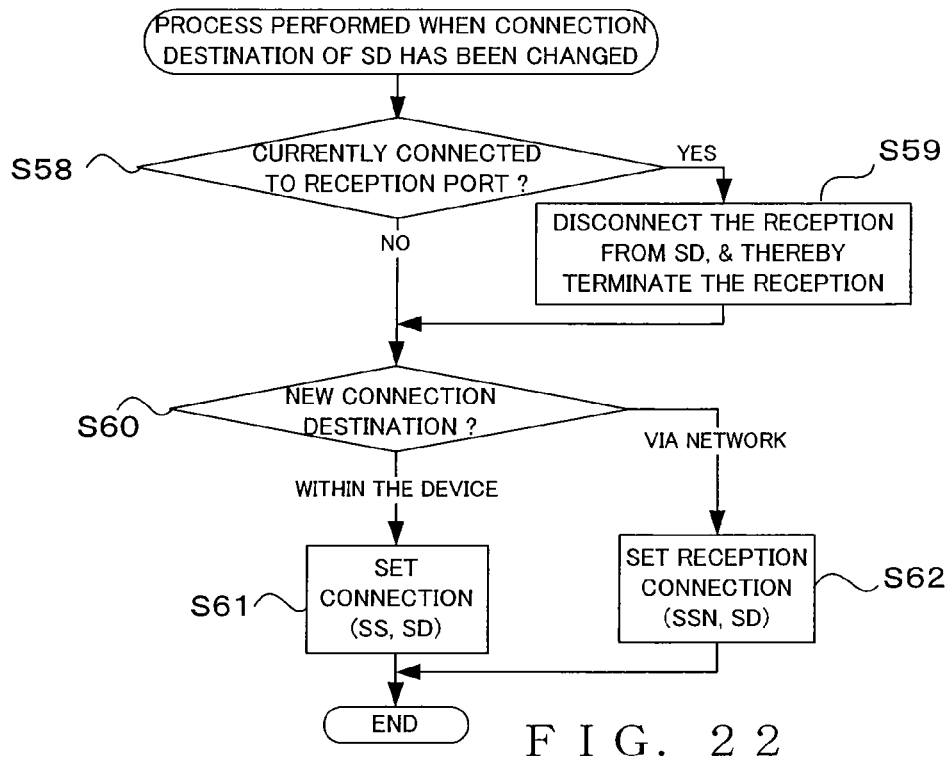
FIG. 22 is a flow chart of a process performed by any one of the devices when a connection destination of a signal supply destination SD has been changed on the patch setting screen for a signal supply destination SD of FIG. 20.

FIG. 22 is a flow chart showing an example operational sequence of a process performed by the CPU of any one of the I/O devices when a connection destination of a signal supply destination SD (output port) has been changed on the SD patch setting screen (FIG. 20A or 20B) displayed on the display section 75 of the I/O device.

At step S58, the CPU of the I/O device determines whether the signal supply destination SD (output port) whose connection destination has been changed is currently connected to a reception port of any transmission channel. If the last connection destination (i.e., connection destination before the change) is an input of the network 6 and a reception connection thereof has been implemented, it means that the output port is currently connected with a reception port. Otherwise, namely, if the last connection destination is a local input port and a reception connection thereof has not been implemented, or if no connection destination has been selected for the supply destination SD, a NO determination is made at step S58.

If the signal supply destination SD (output port) whose connection destination has been changed is currently connected with a reception port of any transmission channel (YES determination at step S58), the CPU of the I/O device goes to step S59, where it disconnects the connection between the supply destination SD (output port) and the reception port to thereby terminate reception of an audio signal from the transmission channel of the reception port. Thus, the existing reception connection of the output port is cleared or canceled.

Further, if the changed or new connection destination of the supply destination SD is an input port of the I/O device in question ("Within The Device" determination at step S60), the CPU of the I/O device proceeds to step S61, where it sets a currently selected signal supply source SS as a connection destination of the supply destination SD and changes signal supply destination information of (i.e., pertaining to) the supply source SS and signal supply source information of (i.e., pertaining to) the supply destination SD stored in its own memory. Then, the supply destination SD and the supply source SS are connected with each other on the basis of the thus-set connection. This operation is similar to the operation of step S28 shown in FIG. 13. The content of the set connection is notified to the control device, which in turn stores the information of the connection (between the supply source SS and supply destination SD of the I/O device) into its own current memory.

Further, if the new connection destination of the supply destination SD is an input of the network 6 ("Via The Network" determination at step S60), the CPU of the I/O device proceeds to step S62, where it changes the signal supply source information of the supply destination SD stored in its own memory and sets a reception connection for connecting a transmission channel (i), having put therein an audio signal of a name SSN selected via the "Name:" portion 83, to the supply destination SD. Then, the thus-set reception connection is implemented when the I/O device has performed the connection updating process of FIG. 15 (see steps S40-S46 of FIG. 15). The control device changes the connection information (signal supply source information of the supply destination SD of the I/O device and signal supply destination information of a supply source SS of another device corresponding to the signal supply source information) stored in its own current memory.

—Patch Setting between a Signal Supply Source and a Connection Destination Thereof—

Figure 23:
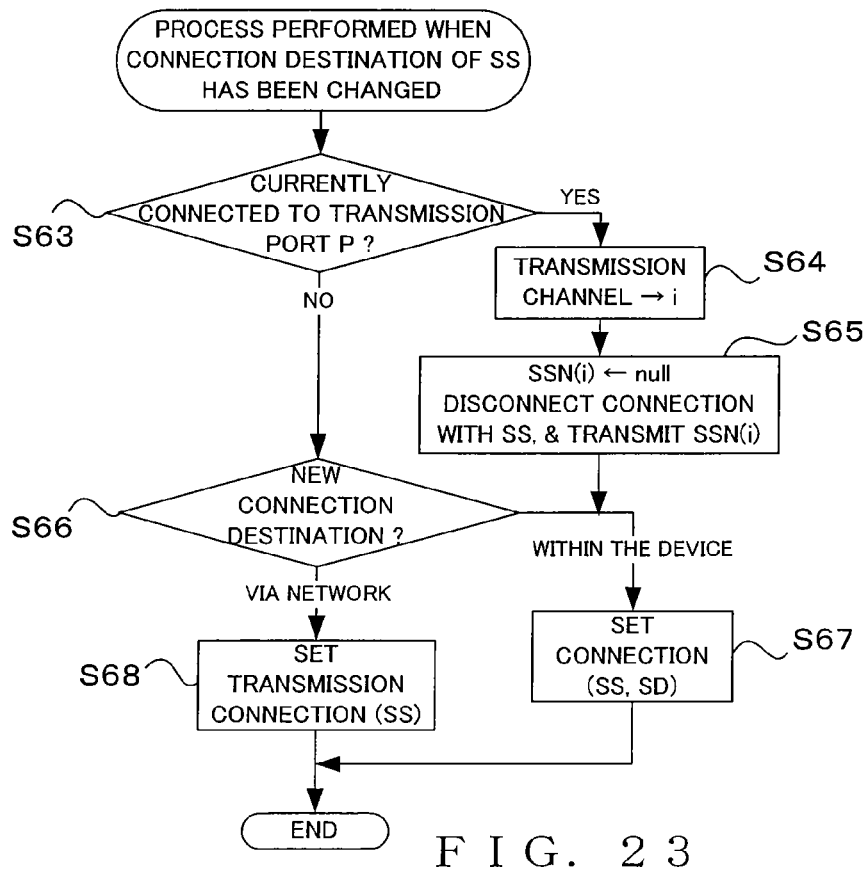
FIG. 23 is a flow chart of a process performed by any one of the devices when a connection destination of a signal supply source SS has been changed on the patch setting screen for a signal supply source SS of FIG. 21.

FIG. 23 is a flow chart showing an example operational sequence of a process performed by the CPU of any one of the I/O devices when a connection destination of a signal supply source (input port) has been changed on the SS patch setting screen (FIG. 21A or 21B) displayed on the display section 75 of the I/O device.

At step S63, the CPU of the I/O device determines whether the signal supply source SS (input port) whose connection destination has been changed is currently connected to a transmission port of any transmission channel. If the last connection destination of the input port is an "output" to the network 6 and the transmission connection thereof has been implemented, it means that the input port is currently connected to a transmission port. Otherwise, namely, if the last connection destination is a local output port, no transmission channel has not been allocated to the supply source SS (i.e., the transmission connection thereof has not been implemented), or if there has been no connection destination selected for the supply source SS till immediately before the change, a NO determination is made at step S63.

If the signal supply source SS (input port) whose connection destination has been changed is currently connected to a transmission port of any transmission channel (YES determination at step S63), the CPU of the I/O device goes to step S64, where it searches its own T signal list for information SSN(i) corresponding to the name SSN of the supply source SS, and identifies the channel number (i) of a transmission channel being used as an output destination of the supply source SS. Then, at step S65, the CPU of the I/O device sets "null" into the information SSN(i) corresponding to the identified channel number (i), disconnects the connection between the transmission port of the transmission channel of the channel number (i) and the input port (supply source SS) and thereby terminate transmission of the transmission channel (i). Also, the CPU of the I/O device transmits the information SSN(i), having "null" set therein, to the other devices on the network 6, and deletes the information SSN(i) from its own T signal list.

Because the YES determination is made at step S63 when the last connection destination of the input port is an "output" to the network 6, the changed or new connection destination is nothing but any one of the output ports of the I/O device. Thus, following step S65, the CPU of the I/O device proceeds to step S67 without making a connection destination determination of step S66.

If the input port (supply source SS) is not currently connected to any transmission port (NO determination at step S63) and the new connection destination of the supply source SS is an output port (supply destination SD) of the I/O device ("Within The Device" determination at step S60), the CPU of the I/O device proceeds to step S67, where it sets a currently selected signal supply destination SD as a connection destination of the supply source SS and changes signal supply destination information of the supply source SS and signal supply source information of the supply destination SD stored in its own memory. Then, the supply destination SD and the supply source SS are connected with each other on the basis of the thus-set connection. This operation is similar to the operation of step S28 shown in FIG. 13. The content of the set connection is notified to the control device, which in turn stores the information of the connection (between the supply source SS and supply destination SD of the I/O device) into its own current memory.

Further, if the input port (supply source SS) is not currently connected to any transmission port (NO determination at step S63) and the new connection destination of the supply source SS is an input of the network 6 ("Via The Network" determination at step S66), the CPU of the I/O device proceeds to step S68, where it changes the signal supply source information of the supply destination SD stored in its own memory and sets a transmission connection for connecting a transmission channel (i), having put thereon an audio signal of a name SSN selected via the "Name:" portion 83, to an output port (supply destination SD) displayed in the "To:" portion 81. Then, the thus-set transmission connection is implemented when the I/O device has performed the connection updating process of FIG. 15. Also, information SSN(i) having the name of the supply source SS set therein is not only transmitted to the other devices on the network 6 but also registered into the T signal list of the I/O device in question (see steps S33-S35 of FIG. 15). In accordance with the content of the transmission connection, the control device changes the connection information (signal supply destination information of the supply source SS of the I/O device and signal supply destination information of a supply source SS of another device on the network 6 receiving an audio signal of the supply source SS) stored in its own current memory.

Through the operations of steps S61 of FIG. 22 and step S68 of FIG. 23, each of the devices on the network 6 allows the human operator to set, via the simplified UI 25 of the device, a connection between a signal supply source SS of the device and another device via the network 6 (i.e. a transmission connection of the supply source SS) and a connection between a signal supply destination SD of the device and another device via the network 6 (i.e. a transmission connection of the supply destination SD). Also, these transmission and reception connections are implemented within the limits of transmission channels reserved by the transmission channel reserving process of FIG. 6 performed by that device. Namely, even when the control device controlling the entire mixing system is not present, e.g. when the control device is not currently connected to the network 6 or the power supply to the control device is OFF, each of the devices on the network 6 can control its necessary signal paths on its own.

—Process Responsive to Operation of the Signal Output ON/OFF Setting Portion 84—

FIG. 24 is a flow chart showing an example operational sequence of a process performed by the CPU of any one of the devices in response to human operator's operation of the signal output ON/OFF setting portion 84 displayed on the SS patch setting screen of the device. In response to the human operator's operation, the CPU of the device inverts the current ON/OFF setting of the portion 84, at step S69.

If the signal output OFF state has been set through the current human operator's operation ("OFF" determination at step S70), the CPU of the I/O device switches the signal output ON/OFF parameter to "OFF" and stores the switched state into the memory. Then, if a transmission port of any transmission channel (i) is currently connected to the signal supply source SS (input port) for which the signal output has been switched to OFF (YES determination at step S71), operations similar to steps S64 and S65 are performed. Namely, the CPU of the I/O device disconnects the connection between the input port and the transmission port (transmission channel (i)), sets "null" into the information SSN(i) for the supply source SS connected to the input port, transmits the information SSN(i), having "null" set therein, to the other devices on the network 6 and deletes the information SSN(i) from its own T signal list, at steps S72 and S73.

If the signal output ON has been set through the current operation ("ON" determination at step S70), the CPU of the I/O device switches the signal output ON/OFF parameter to "ON" and stores the switched signal output state into the memory, after which the CPU ends the instant process. Because the supply source SS, for which the signal output ON has been set, was in the signal output OFF state before the current operation, the supply source SS is not an object of the aforementioned detection at step S30 of FIG. 15, and the transmission connection therefor has been implemented. However, now that the signal output state has been set to "ON" through the current operation, the transmission connection for the supply source SS is placed in an implementable state through the connection updating process of FIG. 15.

—Process Performed in Response a Change of the Name SSN—

FIG. 25 is a flow chart showing an example operational sequence of a process performed by the CPU of any one of the devices when a supply source name SSN has been changed in the "Name" portion 83 of the SS patch setting screen of FIG. 21A or 21B.

At step S74, the CPU of the device assigns the device ID of the device to the name ssn, having been set by the human operator, to thereby generate a name SSN. Because of a precondition that the name ssn should not duplicate within the same device, each name SSN can be unique in the mixing system by the name ssn being assigned a device ID. If a transmission port of any transmission channel (i) is currently connected to the signal supply source SS of which the name has been changed (YES determination at step S75), the CPU of the device sets, as "i", the channel number of the channel connected to the supply source SS. Then, at step S77, the CPU of the device sets, into the information SSN(i), the new same SSN set at step S74 and the channel number (i) set at step S76, and not only transmits the information SSN(i) to the other devices, but also registers the information SSN(i) into its own T signal list.

—Lock (Priority Control) of a Signal Supply Source SS and a Signal Supply Destination SD—

On each of the patch setting screens shown in FIGS. 20A, 20B and FIGS. 21A, 21B, a lock mark 86 indicative of a lock-ON (unchangeable) or lock-OFF (changeable) state is displayed concerning a setting of a transmission connection of a signal supply destination SD or a setting of a reception connection of a signal supply source SS. In the illustrated examples, the lock mark 86 is in the form of a so-called "padlock" image. If the connection setting is in the lock-OFF (changeable) state, the padlock image is displayed with its U-shaped bar portion in an opened position, while, if the connection setting is in the lock-ON (unchangeable) state, the padlock image is displayed with its U-shaped bar portion in a closed position. When the setting of a connection of a signal supply source SS or signal supply destination SD is in the locked state, the human operator cannot change the patch setting for the supply source SS or supply destination SD on the patch setting screen (FIGS. 20A, 20B or FIGS. 21A, 21B) of the simplified UI 25 of each of the I/O device The lock ON/OFF setting of each supply source SS or supply destination SD is made in accordance with an instruction given via the control device. Namely, in the region (current memory) provided in the memory of the control device for storing current operating states of the mixing system are stored data of a lock ON/OFF setting of each of signal supply destinations SD (output ports) and signal supply sources SS (input ports) connected to the individual devices. Further, in the memory of each of the devices is stored data of a lock ON/OFF setting of each of signal supply destinations SD (output ports) and signal supply sources SS (input ports) connected to that device.

—Switching of Lock ON/OFF Setting—

FIG. 26 is a flow chart showing an example operational sequence of a process performed by the CPU of the control device when an instruction has been given, for example, through lock ON/OFF designating operation performed by the human operator via the control device, for setting a lock ON or OFF state for a signal supply destination SD or signal supply source SS.

If the lock ON/OFF setting of a supply destination SD or supply source SS has been switched to ON (YES determination at step S78), the CPU of the control device switches the lock ON/OFF setting data of the destination SD or source SS, stored in the current memory, to ON and sets the new lock setting of the supply destination SD or supply source SS in the device possessing the destination SD or source SS (step S79).

Then, the CPU of the device possessing the supply destination SD or supply source SS switches the lock ON/OFF setting data of the destination SD or source SS, stored in the memory of the device, to ON. Thus, the lock mark 86 on the patch setting screen is switched to indicate a lock ON state.

If the lock ON/OFF setting has been switched to OFF (NO determination at step S78), on the other hand, the CPU of the control device switches the lock ON/OFF setting data of the destination SD or source SS, stored in the current memory, to OFF and cancels the lock setting of the device possessing the destination SD or source SS (step S80). Then, the CPU of the device possessing the supply destination SD or supply source SS switches the lock ON/OFF setting data of the destination SD or source SS, stored in the memory of the device, to OFF.

—Lock and Priority of Signal Supply Sources SS—

By making a lock ON/OFF setting for each of signal supply sources SS (input ports) and signal supply destinations SD (output ports) connected to the individual devices as set forth above, the instant embodiment can give priorities to the signal supply sources SS (input ports) and signal supply destinations SD (output ports). Namely, either of two different, i.e. high and low, priority levels is set for a transmission connection of each of the signal supply sources SS and for a reception transmission for each of the signal supply destinations SD in accordance with the lock ON/OFF settings. Namely, each signal supply source SS or signal supply destination SD set in the lock ON state has a higher priority than each signal supply source SS or signal supply destination SD set in the lock OFF state; that is, each signal supply source SS or signal supply destination SD set in the lock OFF state has a lower priority than each signal supply source SS or signal supply destination SD set in the lock ON state.

—Preferential Allocation of Transmission Channels—

By a transmission connection of a desired signal supply source SS being locked and set at a high priority, allocation of a transmission channel to the locked signal supply source SS is implemented preferentially. This feature is reflected in the operation of step S30 in the connection updating process of FIG. 15 performed in each of the devices. Namely, at step S30, the CPU of each of the devices detects transmission connections to be implemented and also sorts the detected transmission connections in accordance with the priorities of the detected transmission connections, as set forth above. The CPU of each of the devices implements the "transmission connections" sequentially in a decreasing order of the priorities. Thus, a limited number of transmission channels reserved by the device can be more reliably allocated to the transmission connections having higher priorities. Further, if a predetermined number of transmission channels necessary for implementation of all of set transmission connections have not been reserved, then the transmission connection of a signal supply source SS having a low priority is left unimplemented more positively than the transmission connection having a high priority.

Thus, by giving such priorities in accordance with the lock ON/OFF settings of desired signal supply sources SS, the human operator himself (or herself) can control which of a plurality of transmission connections set (at step S14 of FIG. 11) should be implemented preferentially and which of the transmission connections should be left unimplemented.

—Process Performed in Response to Change of DCN and Preferential Maintenance of Some of Transmission Connections—

For any desired one of the devices connected to the audio network 6, the human operator can perform operation for setting the number DCN of transmission channels to be reserved at a desired number. Such operation for setting the number DCN of transmission channels to be reserved is performed, for example, when transmission channels are to be newly reserved or when transmission channels already reserved by the device are to be returned (i.e., transmission channels allocated to the device are to be released (from the transmission channel reservation). The human operator can perform the operation for setting the number DCN via the control device or the device for which the new number DCN is to be set.

Figure 27:
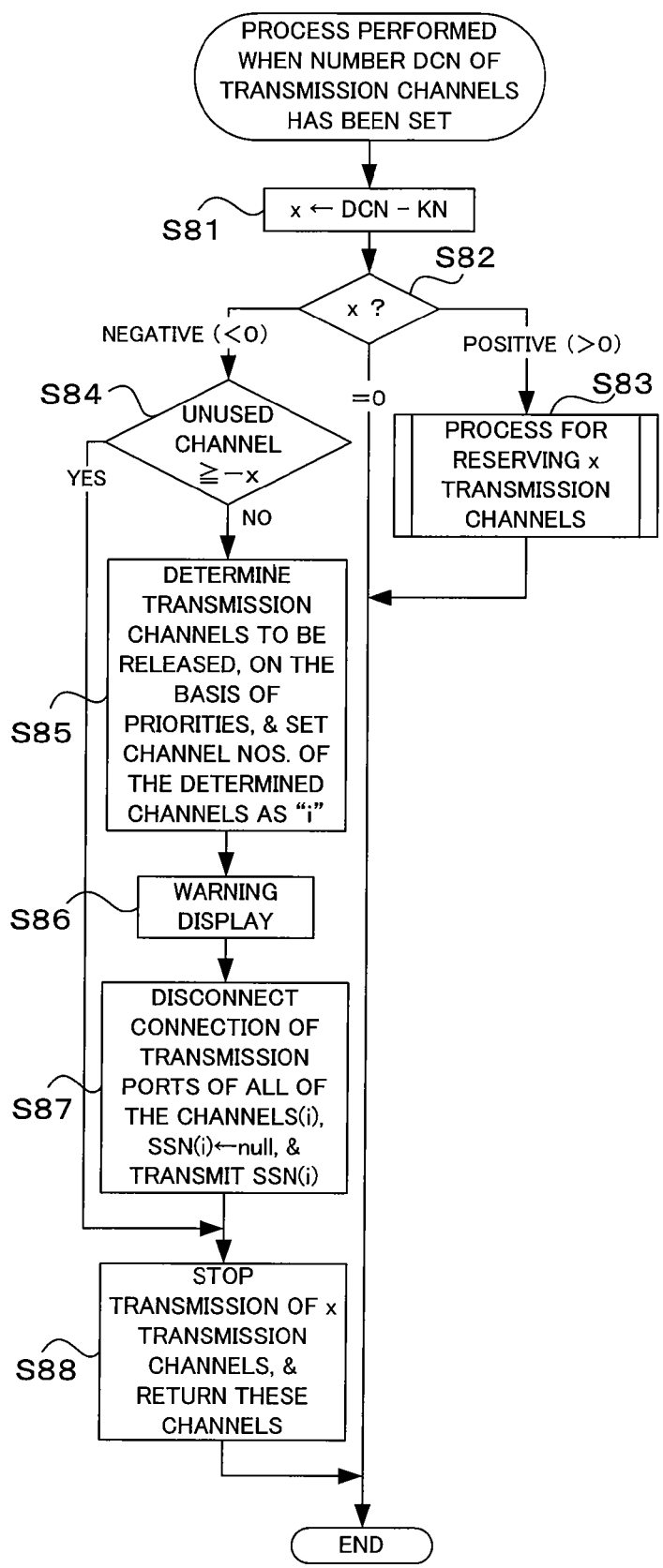
FIG. 27 is a flow chart showing a process performed by any one of the devices when the number DCN of transmission channels to be reserved for the device has been changed via the control device.

FIG. 27 is a flow chart showing an example operational sequence of a process performed by the CPU of any one of the devices when the human operator has set a desired number DCN of transmission channels for that device. At step S81, the CPU of the device in question sets, as "x", a difference between the value of the number DCN stored in the memory of the device and the number KN of transmission channels currently reserved by the device. If the value of "x" is a positive value (x>0) (i.e, "Positive" at step S82), it means that the number DCN newly set by the human operator is greater than the number KN, and thus, the CPU of the device goes to step S83, where the CPU of the device performs a process for reserving the x transmission channels as shown in FIG. 6 to thereby reserve the necessary number x of the transmission channels. If the x transmission channels could be reserved successfully, the CPU of the device updates the number KN of the already-reserved transmission channels.

If, on the other hand, the value of "x" is a negative value (x<0) (i.e, "Negative" at step S82), it means that the number DCN is smaller than the number KN, and thus, the CPU of the device returns (or releases) a predetermined number, corresponding to the absolute value of "x", of the transmission channels. Because, in this case, the value of "x" is a negative value (−x) and the predetermined number of transmission channels corresponding thereto is the absolute value of "x". At next step S84, the CPU of the device compares the number of transmission channels not currently being used for audio signal transmission (i.e., currently-unused transmission channels) among the reserved transmission channels and the number x of transmission channels to be returned.

If the number of the currently-unused transmission channels is smaller than the number x set at step S81 above (NO determination at step S84), a necessary number of the transmission channels are released from among the transmission channels currently used for audio signal transmission; the transmission channels currently used for audio signal transmission are transmission channels currently allocated to signal supply sources SS.

Namely, at step S85, the CPU of the device determines one or more transmission channels to be released (from the transmission channel reservation) on the basis of the priorities of the individual signal supply sources SS allocated to the currently-used transmission channels and sets, as "i", the channel numbers of the one or more determined transmission channels; namely, "i" here indicates one or more channel numbers that correspond to the number of deficient transmission channels (i.e., a difference between the number of the currently-unused transmission channels and the value of "x").

At step S85, the one or more transmission channels to be released (from the transmission channel reservation) are determined on the basis of the priorities of the signal supply sources SS. Thus, it is possible to perform priority control that determines the transmission channels to be released sequentially, beginning with a transmission channel connected to a transmission channel connected to a low-priority signal supply source SS (i.e., signal supply source SS set in the lock OFF state), while excluding, from objects of the release, as many transmission channels connected to high-priority signal supply sources as possible. Similarly, when the transmission channels are to be reduced, the aforementioned priority control allows connections between desired high-priority signal supply source SS and transmission channels to be relatively difficult to cancel. Note that priority order between transmission channels of a same priority level may be determined in accordance with any suitable rule, such as order of the channel numbers of the transmission channels.

At step S86, the CPU of the device controls the display section (i.e., P display 15, simplified UI 25 or monitor of the PC 7) of the device, which is being currently operated by the human operator, to make a warning display. For example, this warning display presents to the human operator that transmission channel release is going to be carried out, but also inquires the human operator whether the instant process should be continued or canceled. The display presenting to the human operator that transmission channel release is going to be carried out may include the name SSN of each signal supply source SS to be disconnected through the release of the corresponding transmission channel. Once the human operator cancels the transmission channel returning operation in response to the warning display, the CPU of the device discontinues the instant process and sets the value of the number DCN, updated through the operation of the human operator, back to the last value (i.e., value immediately before the start of the instant process).

At step S87, the CPU of the device disconnects, for each of the transmission channels (i) determined at step S85, the connection between the transmission channel and the supply source SS (i.e., cancels the allocation of the supply source SS to the transmission channel). Then, the CPU of the device sets "null" into information SSN(i) corresponding to the transmission channels (i), and transmits the information SSN(i) to the other devices on the audio network 6. In response to the transmission of the information SSN(i), each of the other devices performs the process of FIG. 8 and deletes each of the corresponding information SSN(i) from its R signal list.

Then, at step S88, the CPU of the device stops audio signal transmission using the "x" transmission channels (i) for which connections with the supply sources SS have been disconnected at step S87 above. Thus, the device returns these transmission channels (i) to the audio network 6. Now that these transmission channels (i) have been released from the allocation to the device in question, the transmission channels (i) become empty or available channels (see FIG. 2C).

Further, if the number of the currently-unused transmission channels is greater than the number x set at step S81 above (YES determination at step S84), it is only necessary that the unused transmission channels be released, and thus, the disconnection between the transmission channel and the supply source SS through the operations of steps S85-S87 is unnecessary. In this case, the CPU of the device at step S88 stops audio signal transmission using the "x" transmission channels (i) of the unused transmission channels and returns (releases) these transmission channels (i) to the network 6. Because the unused transmission channels (i.e., transmission channels not currently connected to any supply sources SS) are transmitting zero-level (or silent) signals, the CPU of the device stops such zero-level signal transmission at step S88.

If the number DCN newly set by the human operator equals the number KN of transmission channels currently reserved by the device (i.e., "x=0" determination at step S82), it means that there is no need to either reserve or return any transmission channel, so that the instant process is brought to an end.
—New Connection of the Control Device to the Mixing System in Operation, and Priority Control—

Figure 28:
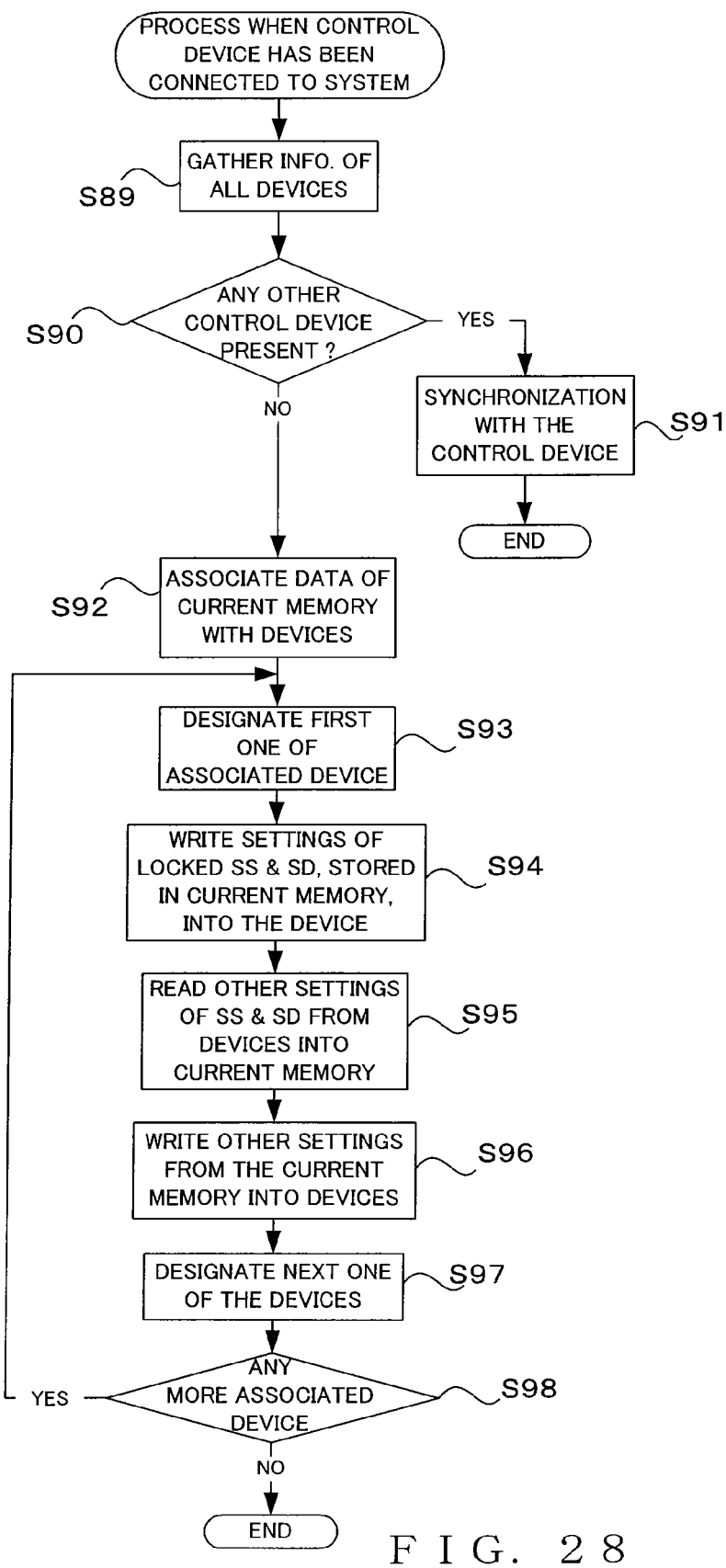
FIG. 28 is a flow chart showing a process performed by a control device when the control device has been newly connected to the network.

When a control device has been newly connected to the mixing system in operation, stored content of a current memory of the newly connected control device is synchronized with (caused to coincide with) the stored content of the memory of each of the other devices in the mixing system. FIG. 28 is a flow chart showing an example operational sequence of a process performed by a CPU of a control device when the control device has been newly connected to the mixing system in operation, e.g. when the control device has been newly physically connected to the audio network 6, when a power supply to the control device, which was being physically connected to the audio network 6 with the power supply to the control device turned off, has been turned on, or the like.

At step S89, the CPU of the newly connected control device gathers information about all of the other devices connected to the audio network 6, and then it determines, on the basis of the gathered information about all of the other devices, whether or not any other control device is currently present in the mixing system, at step S90. If any other control device is currently present in the mixing system (YES determination at step S90), the CPU of the newly connected control device goes to step S91 to perform an operation for synchronizing the stored content of the current memory with that of the other, i.e. existing, control device. Namely, the stored content of the current memory of the existing control device is overwritten into the current memory of the newly connected control. In this way, the stored content of the current memory of the newly connected control can be made to conform to the current states of the mixing system in operation.

If no other control device is currently present in the mixing system (NO determination at step S90), the CPU of the newly connected control device goes to step S92, where, on the basis of the information about all of the other devices gathered at step S89, the CPU associates the data stored in its own current memory with the devices connected to the network 6. Namely, the CPU of the newly connected control device identifies, from among information about one more devices stored in the current memory of the newly connected control device, those of the one more devices whose actual hardware is present in the mixing system and those of one more devices whose actual hardware is not present in the mixing system. Each device whose information is stored in the current memory and coincides with the actual hardware in the mixing system is referred to herein as an "associated device". For each device whose information is not stored in the current memory of the newly connected control device although its actual hardware is present in the mixing system, the CPU of the newly connected control device generates information corresponding to that device and associates the thus-generated information with the actual hardware.

At step S93, the CPU of the newly connected control device designates one of the devices associated at step S92.

If information about the designated associated device, stored in the current memory of the newly connected control device, includes a signal supply source SS and signal supply destination SD set in the lock ON state, then the CPU of the newly connected control device goes to step S94, where it overwrites connection information (signal supply source information and signal supply destination information), pertaining to the signal supply source SS and signal supply destination SD set in the lock ON state and stored in the current memory, into the memory of the designated associated device. In this manner, the signal supply destination information and signal supply source information of the supply source SS and supply destination SD set in the lock-ON state, stored in the memory of the designated associated device is rewritten with settings corresponding to the connection information stored in the current memory of the newly connected control device. Namely, when the control device has been newly connected to the mixing system, a setting of a transmission connection of the supply source SS set in the lock ON state and a setting of a reception connection of the supply destination SD set in the lock ON state, stored in the newly connected control device, are given a priority over corresponding settings stored in the designated associated device (i.e., settings of the connections actually implemented at that time).

At step S95, the CPU of the newly connected control device overwrites the connection information, stored in the current memory of the newly connected control device, with the connection information (i.e., supply destination information of each signal supply source SS other than the supply source SS set in the lock ON state and supply source information of each signal supply destination SD other than the supply destination SD set in the lock ON) stored in the memory of the designated associated device. Namely, when the control device has been newly connected to the mixing system, settings (such a setting of a transmission connection of each supply source SS set in the lock OFF (i.e., non-locked) state and a setting of a reception connection of each supply destination SD the lock OFF (i.e., non-locked) state) stored in the associated device (i.e., settings of the connections actually implemented at that time) are given a priority over those stored in the current memory of the newly connected control device.

Further, at step S96, the CPU of the newly connected control device overwrites the other data pertaining to the designated associated device, stored in the current memory of the newly connected control device, with the other data stored in the memory of the designated associated device. Namely, when the control device has been newly connected to the mixing system, information other than supply destination information of each signal supply source SS and supply source information of each signal supply destination SD (i.e., other settings actually implemented at that time) is given a priority over such information (other settings) stored in the current memory of the newly connected control device.

At step S97, the CPU of the newly connected control device designates another one of the devices associated at step S92 and performs the synchronizing process at and after steps S94 above (i.e., loop process of steps S94-S98). Then, the CPU of the newly connected control device ends the instant process after having completed the aforementioned synchronizing process on all of the associated devices (YES determination at step S98).

Essential points of the process of FIG. 28 are summarized as follows in terms of the novel arrangement that, when a control device has been newly connected to the mixing system, the process of FIG. 28 leaves or maintains settings of a transmission connection of a particular signal supply source SS and a connection between particular devices which were stored till immediately before the new connection of the control device (namely, settings of each of the other devices than the newly-connected control device are given a priority). In other words, the essential points of the process of FIG. 28 are summarized focusing on synchronization of settings of a connection (signal supply destination information and signal supply source information) of a non-locked signal supply source SS.

First, the CPU of the newly connected control device can function as an identification section that, by setting a lock ON/OFF state for each individual signal supply sources SS or signal supply destinations SD, possessed by the plurality of devices 1-5, through the process of FIG. 26, identifies a non-locked signal supply source SS of each of a plurality of devices (i.e., associated devices) in the mixing system.

When the control device has been newly connected to the mixing system, the CPU of the newly-connected control device can function as a synchronization section which updates, on the basis of connection information stored in its own current memory, all of signal supply destination information and signal supply source information stored in the respective memories of the devices on the network 6, except for signal supply destination information and signal supply source information pertaining to the identified supply source SS (i.e., signal supply destination information indicative of a signal supply destination of the identified supply source SS and signal supply source information of (pertaining to) the supply destination receiving a signal of the supply source SS) (which corresponds to the operation of step S94 for updating the content of the memory of each of the devices), and which updates, on the basis of the signal supply destination information and signal supply source information pertaining to the identified supply source SS, the connection information stored in the own current memory of the newly connected control device (which corresponds to the operation of step S95 for changing the stored content of the current memory).

According to another aspect, the CPU of the newly connected control device can function as an identification section that, by setting a lock ON/OFF state for each of the signal supply sources SS or signal supply destinations SD, possessed by the plurality of devices 1-5, through the process of FIG. 26, identifies predetermined two mutually-connected devices (i.e., a device possessing a non-locked signal supply source SS and a device possessing a non-locked signal supply destination SD as a connection destination of the supply source SS) of the plurality of devices (already-associated devices) of the mixing system.

When the control device has been newly connected to the mixing system, the CPU of the control device can function as a synchronization section which updates, on the basis of the connection information stored in its own current memory, all of signal supply destination information and signal supply source information stored in the respective memories of the devices, except for signal supply destination information and signal supply source information pertaining to a connection between the two identified devices (namely, signal supply destination information indicative of a signal supply destination of a non-locked signal supply source SS of one of the two identified devices and signal supply source information indicative of a signal supply source of a non-locked signal supply destination SD) (which corresponds to the operation of step S94 for changing the content of the memory of each of the devices), and which updates, on the basis of the signal supply destination information and signal supply source information pertaining to the connection between the two devices, the connection information stored in the own current memory of the newly connected control device (which corresponds to the operation of step S95 for changing the stored content of the current memory).

According to still another aspect, the CPU of the newly connected control device can function as an identification section that, by setting a lock ON/OFF state for each of the signal supply sources SS or signal supply destinations SD, possessed by the plurality of devices 1-5, through the process of FIG. 26, identifies predetermined two mutually-connected devices (i.e., a device possessing a locked signal supply source SS and a device possessing a locked signal supply destination SD as a connection destination of the supply source SS) of the plurality of devices (already-associated devices) of the mixing system.

When the control device has been newly connected to the mixing system, the CPU of the control device can function as a synchronization section which updates, on the basis of the connection information stored in its own current memory, signal supply destination information and signal supply source information pertaining to a connection between the two identified devices (namely, signal supply destination information indicative of a signal supply destination of a locked signal supply source SS of one of the two identified devices and signal supply source information indicative of a signal supply destination of a locked signal supply destination SD of the other identified device) included among signal supply destination information and signal supply source information stored in the respective memories of the devices (which corresponds to the operation of step S94 for changing the content of the memory of each of the devices), and which updates, on the basis of the signal supply destination information and signal supply source information pertaining to the connection between the two devices, the connection information stored in the own current memory of the newly connected control device (which corresponds to the operation of step S95 for changing the stored content of the current memory).

Namely, when a control device has been newly connected to the mixing system, the process of FIG. 28 summarized in terms of the foregoing three aspects can leave or maintain, a setting of a transmission connection of a signal supply source SS identified by the identification section and a setting of a connection between particular devices that were stored till immediately before the new connection of the control device to the mixing system. Namely, the instant embodiment can leave or maintain data of the setting of the transmission connection of a signal supply source SS and data of the setting of the connection between particular devices that were stored till immediately before the connection of the control device to the mixing system, by the control device controlling, through the process of FIG. 28, a direction of data synchronization between the control device and each of the other devices on the basis of a lock ON/OFF setting of each signal supply sources SS stored in its own memory. Thus, the instant embodiment can maintain settings of any desired transmission paths of the mixing system.

—Dual Patch Mode—

In the above-described embodiment, a transmission connection pertaining to each patch setting designated by the human operator on any one of the patch setting screens shown in FIGS. 8A-8C and FIGS. 9A and 9B is implemented automatically by the connection updating process performed by any one of the devices (step S35). Namely, whether or not any one of transmission channels reserved by the device should be allocated to a signal supply source SS (input port) pertaining to the transmission connection to be implemented is automatically determined in the above-described embodiment.

Another embodiment of the present invention may be constructed to allow the human operator to designate, via the patch setting screen, a path setting of a transmission frame (i.e., connection between a signal supply source and a transmission channel) in addition to a connection between a signal supply source and a signal supply destination. With such a construction permitting dual patch settings, the human operator can perform transmission channel (transmission band) management by himself (herself).

Figure 29A:
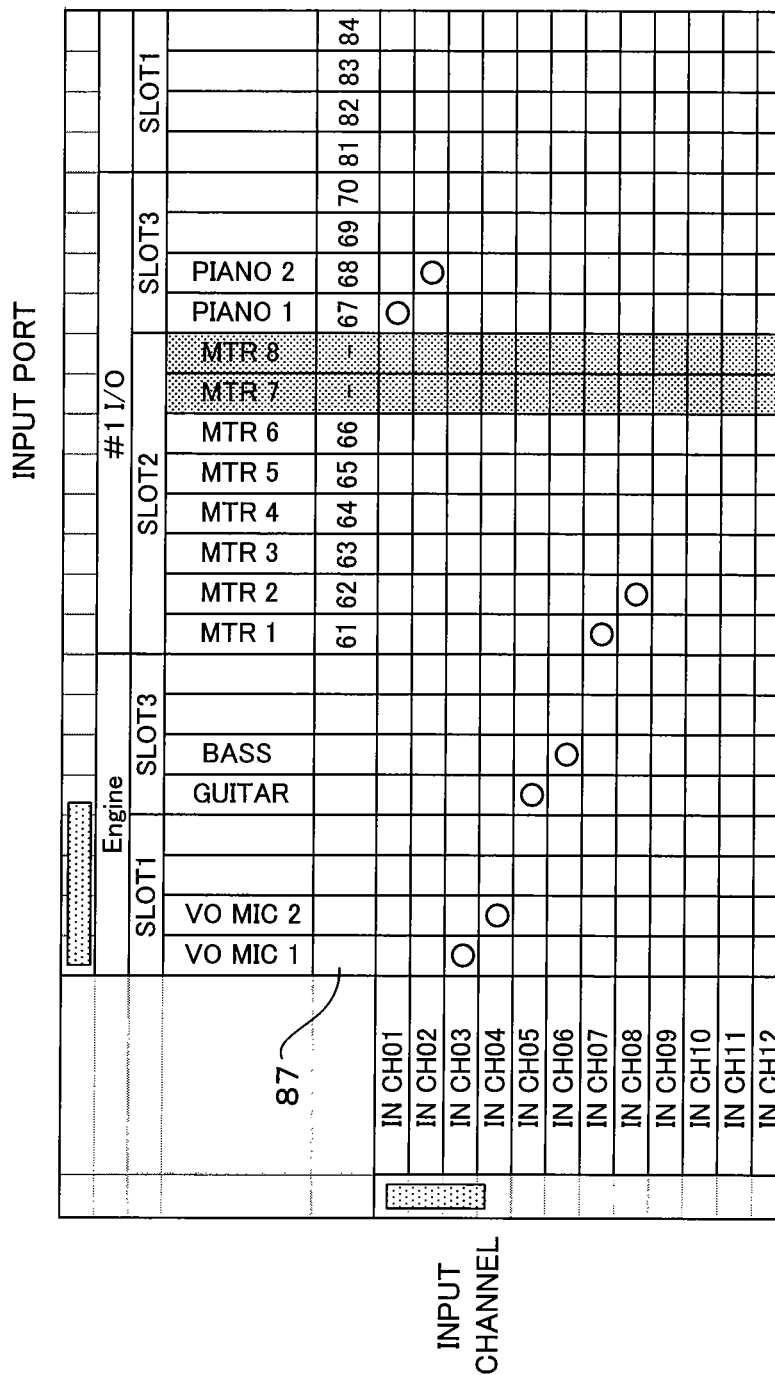
FIG. 29A is a diagram showing a modified example of the patch setting screen displayed on the control device, i.e. an input patch setting screen of the engine capable of setting dual patch settings.

FIGS. 29A and 29B are diagrams showing patch setting screens via which the human operator can set dual patch settings. FIG. 29A shows an input patch setting screen of the engine 2, which is generally similar in construction of the screen of FIG. 8C, except that channel numbers of transmission channels connected to the input ports are displayed in portions 87 of FIG. 29A that correspond in position to the transmission channel allocation state display portions 74 of FIG. 8C provided in corresponding relation to the input ports. In FIG. 29A, a connection mark "○" indicative of a patch setting/cancellation between an input port and an input channel is displayed in some cells as in FIG. 8C. Gray-out columns (representing input ports to which signals of MRT7 and MRT8 are supplied) indicate that no transmission channels are currently allocated to the input ports.

Once the human operator designates one of the portions 87, which display the channel numbers of the transmission channels allocated to the input ports, by clicking on the one portion 87, a transmission channel output setting screen is opened for the human operator to make an output setting in a device possessing the designated input port (first I/O device in the illustrated example), i.e. to set via which one of the transmission channels an audio signal should be transmitted. FIG. 29B is a diagram showing an example construction of the transmission channel output setting screen. In individual horizontal rows of a left end vertical region of the transmission channel output setting screen are displayed all transmission channels reserved by the device in question. Further, in individual vertical rows of an upper end horizontal region of the transmission channel output setting screen are displayed all input ports of the device; the input ports are classified on a slot-by-slot basis. By clicking on one of cells (intersecting points between the columns and rows) displayed on the screen, the human instructs connecting a transmission channel to the input port corresponding to the cell. Thus, the transmission channels reserved by the device can be connected to desired signal supply sources (input ports). A connection mark "○" is displayed in each cell having achieved such a connection, while a no-mark blank is displayed in each cell having not yet achieved such a connection.

—Other Example of the Lock Setting—

The foregoing have described that the lock ON/OFF settings for a transmission connection of a signal supply source SS and a reception connection of a signal supply destination SD can be instructed by the human operator separately for each signal supply source SS and each signal supply destination SD. In another embodiment, an instruction for automatically making a lock ON setting may be generated depending on types of a signal supply source SS and a signal supply destination SD.

For example, an instruction for automatically making a lock ON setting may be generated when a particular type for which paths should be reserved fixedly, such as a "monitoring channel" (input/output of a monitoring signal) or "intercommunicating channel" (e.g., local-area broadcasting input/output) has been set. When an audio signal of a particular type that requires fixedly reserving paths has been set for a signal supply source SS, input and output paths are to be reserved for that signal, and thus, an arrangement may be made such that not only a transmission connection of the supply source SS is locked but also a reception connection of a signal supply destination SD (i.e., the other party of the patch setting of the supply source SS) receiving an audio signal of the supply source SS is also be locked.

Further, for each signal supply source SS for which an audio signal of a particular type that requires fixedly reserving paths has been set, a transmission channel may be automatically allocated to the signal supply source SS, even when the human operator does not make a patch setting for the supply source SS and hence no transmission connection is not set for the supply source SS, as long as the signal output ON/OFF setting of the signal supply source SS is "ON" (i.e., as long as the transmission connection is detected at step S30) and regardless of whether the supply source SS is currently connected to an input port (i.e., without making the determination of step S34). For example, when "Intercommunicating" has been set as a supply source SS of an input port, a transmission channel for transmitting an intercommunicating signal is automatically allocated to the supply source SS. Further, for a monitoring channel, there is fixedly provided a monitoring output terminal (output port) in each of the devices, such as the console 1, and transmission channels for the monitoring channel is essential; thus, transmission channels may allocated automatically to the corresponding input port and output port so that necessary paths can be automatically reserved.

—Others—

Whereas the embodiments have been described above as constructed to set either of two, i.e. high and low, priority levels for each signal supply source SS, the present invention is not so limited, and the present invention may be constructed to allow the human operator to set any one of many priority levels for each signal supply source SS.

Further, whereas the embodiments have been described above as constructed in such a manner that lock ON/OFF settings for signal supply sources SS and signal supply destinations SD are made via the control device, the present invention is not so limited, and the present invention may be constructed in such a manner that lock ON/OFF settings for signal supply sources SS and signal supply destinations of any one of the devices are made via the simplified UI 25 of that device.

Furthermore, the embodiments have been described above in relation to the case where the patch setting screens of FIGS. 20 and 21 are displayed on the display section 75 of the simplified UI 25 of each of the I/O devices 3-5. Alternatively, any other device than the I/O devices 3-5 in the mixing system may be provided with an operator interface capable of displaying and operating similar patch setting screens, a display section and an operation section for operating the display section, and this other device may make patch settings for signal supply sources SS and signal supply destinations SD (input and output ports) of the device so that it can implement transmission connections or reception connections, pertaining to the patch settings, within the limits of the transmission channels reserved by the device.

Furthermore, whereas the embodiments have been described above as constructed in such a manner that operation for changing the number DCM of transmission channels to be reserved, which triggers the start of the process of FIG. 27, is performed via the control device, the present invention is not so limited, and operation for changing the number DCM of transmission channels to be reserved by a corresponding one of the devices can be performed via the simplified UI 25 of the one device.

Furthermore, the patch setting operation via the control device may be performed using any suitable conventionally-known construction, instead of the aforementioned construction where a patch setting is instructed using a matrix diagram (i.e., patch setting screen) indicating signal supply sources and signal supply destinations as described above in relation to the embodiments of the present invention.

Furthermore, the embodiments have been described above in relation to the case where the master node of the audio network 6 functions as a transmission band management section for managing states of allocation of transmission channels to the individual devices (e.g., the numbers of transmission channels to be reserved by the individual devices), i.e. in relation to the case where one of the devices on the network 6 performs management of transmission bands of all of the devices on the network 6. However, the present invention is not so limited, and each of the devices may include a transmission band management section for managing states of allocation of transmission channels to the individual devices. In such a case, at step S4 of the transmission channel reserving process of FIG. 6, performed by each of the devices, a request for reserving "x" transmission channels is transmitted to the transmission band management section of the device so that a reply from the transmission band management section responsive to the request is obtained.

Furthermore, the embodiments have been described above in relation to the case where the console 1 is used as the control device. The foregoing have also stated that the PC 7 connected to any one of the individual devices in the mixing system may be used as the control device. Namely, the control device may either be implemented by a device incorporated in one of the devices constituting the mixing system, or be implemented by a device provided independently of, or separately from, the devices constituting the mixing system. In the case where the control device is implemented by a device incorporated in one of the devices constituting the mixing system, it may be incorporated in any one of the devices, other than the console 1, constituting the mixing system. Further, such control devices may be incorporated in a plurality of the devices constituting the mixing system. Further, in the case where the control device is implemented by a device provided independently of the devices constituting the mixing system, the control device may be a PC connected directly to the network 6 rather than being connected to the PC I/O of any one of the devices connected to the network.

The mixing system of the present invention may be embodied as audio mixing systems (audio systems) for use in various scenes, such as PA (Public Address) systems in concert venues, large-scale events, etc., local-area broadcasting systems in facilities like department stores and schools, and recording systems in music recording studios.

This application is based on, and claims priorities to, JP PA 2009-072910 filed on 24 Mar. 2009, JP PA 2009-072911 filed on 24 Mar. 2009, JP PA 2009-072912 filed on 24 Mar. 2009, and JP PA 2009-072913 filed on 24 Mar. 2009. The disclosure of the priority applications, in its entirety, including the drawings, claims, and the specification thereof, is incorporated herein by reference.

What is claimed is:

1. A path setting method for setting a path for transmitting an audio signal from a desired signal supply source to a desired signal supply destination in an audio system including a control device, a plurality of devices and an audio network connecting the control device and the plurality of devices, each of the plurality of devices having at least one of a plurality of signal supply sources and a plurality of signal supply destinations, the audio network having a plurality of transmission channels in a transmission frame for transmitting audio signals of a plurality of channels between the plurality of devices, said path setting method comprising:

a first allocation step of allocating the transmission channels of the network to individual ones of the plurality of devices so that each of the devices reserves a predetermined number of the transmission channels;

an instruction reception step of the control device receiving a connection instruction instructing a connection between one signal supply source and one signal supply destination;

a second allocation step of, in response to the connection instruction, allocating to the connection instruction a transmission channel, currently unused for transmission of an audio signal, from among the predetermined number of the transmission channels having been reserved, by said first allocation step, for the device possessing the one signal supply source, wherein the transmission channel allocated to the connection instruction has a channel number;

a supply source setting step of causing the device possessing the one signal supply source, for which the connection instruction has been given, to transmit an audio signal, supplied from the signal supply source, by use of the transmission channel allocated to the connection instruction by said second allocation step;

a channel number identifying step of causing the device possessing the one signal supply destination, for which the connection instruction has been given, to identify the channel number of the transmission channel allocated to the connection instruction, the channel number assigned to an individual one of the plurality of transmission channels in the transmission frame; and a supply destination setting step of causing the device possessing the one signal supply destination, for which the connection instruction has been given, based on the identification of the channel number, to receive the audio signal of the transmission channel set by said supply source setting step and to supply the received audio signal to the one signal supply destination.

2. The path setting method as claimed in claim 1, which further comprises a display step of the control device displaying content of the connection instruction, and wherein said display step displays the content of the connection instruction in a style differing between a case where a connection corresponding to the connection instruction has been implemented and a case where the connection corresponding to the connection instruction has not been implemented.

3. The path setting method as claimed in claim 1, wherein, when the predetermined number of the transmission channels allocated to one of the devices by said first allocation step has increased by an increase number and when there is a connection instruction left unimplemented among connection instructions given for a signal supply source possessed by the one of the devices, a connection corresponding to the connection instruction left unimplemented is implemented by performing said supply source setting step and said supply destination setting step being performed after one of the transmission channels of the increase number is allocated to the connection instruction left unimplemented.

4. A path setting apparatus for setting a path for transmitting an audio signal from a desired signal supply source to a desired signal supply destination in an audio system including a plurality of devices and an audio network connecting the plurality of devices, each of the plurality of devices having at least one of a plurality of signal supply sources and a plurality of signal supply destinations, the audio network having a plurality of transmission channels in a transmission frame for transmitting audio signals of a plurality of channels between the plurality of devices, each of the plurality of devices transmitting audio signals to another one or more of the devices by use of a predetermined number of the transmission channels allocated thereto, said path setting apparatus comprising:

an instruction reception section which receives a connection instruction instructing a connection between one signal supply source and one signal supply destination;

a transmission channel allocation section which, in response to the connection instruction received by said instruction reception section, allocates to the connection instruction a transmission channel, currently unused for transmission of an audio signal, from among the predetermined number of the transmission channels having been allocated to the device possessing the one signal supply source, wherein the transmission channel allocated to the connection instruction has a channel number;

a supply source setting section which causes the device possessing the one signal supply source, for which the connection instruction has been given, to transmit an audio signal of the one signal supply source by use of the transmission channel allocated to the connection instruction by said transmission channel allocation section;

a channel number identifier which causes the device possessing the one signal supply destination, for which the connection instruction has been given, to identify the channel number of the transmission channel allocated to the connection instruction, the channel number assigned to an individual one of the plurality of transmission channels in the transmission frame; and a supply destination setting section which causes the device possessing the one signal supply destination, for which the connection instruction has been given, based on the identification of the channel number, to receive the audio signal of the transmission channel set by said supply source setting section and to supply the received audio signal to the one signal supply destination for which the connection instruction has been given.

5. An audio system including a control device, a plurality of devices and an audio network connecting the plurality of devices, each of the plurality of devices having at least one of a plurality of signal supply sources and a plurality of signal supply destinations, the audio network having a plurality of transmission channels for transmitting audio signals of a plurality of channels between the plurality of devices, each of said plurality of devices comprising:

a reservation section which reserves a plurality of the transmission channels;

a storage section which has stored therein signal supply destination information pertaining to a signal supply source possessed by said device and signal supply source information pertaining to a signal supply destination possessed by said device;

a transmission setting section which, on the basis of the signal supply destination information stored in said storage section, allocates one of the transmission channels, reserved for the device by said reservation section, to a signal supply source possessed by said device and makes a setting for outputting an audio signal, supplied from the signal supply source, via the transmission channel allocated to the signal supply source;

an output notification section which notifies another device on the network of signal output information indicative of the signal supply source of the audio signal being outputted by said device via the allocated one of the transmission channels reserved for the device by said reservation section; and a reception setting section which, on the basis of the signal supply source information stored in said storage section and signal output information notified by the output notification section of another of the devices and for a signal supply destination possessed by said device, determines a transmission channel via which an audio signal is to be received and makes a setting for receiving the audio signal from the determined transmission channel, wherein, regardless of whether or not a device indicated by the signal supply destination information stored in the storage section of said device is currently connected to the audio network, the reservation section of said device reserves the plurality of the transmission channels, and the transmission setting section of the device makes a setting, on the basis of the signal supply destination information, for outputting an audio signal, supplied from the signal supply source, via one of the reserved transmission channels.

6. The audio system as claimed in claim 5, wherein a signal supply source of a silent signal in the other device indicated by the signal supply destination information is connected to a signal supply destination indicated by the signal supply destination information.

7. The audio system as claimed in claim 5, wherein, even where signal supply destination information pertaining to a signal supply source that is not possessed by the device is stored in said storage section, said transmission setting section of the device does not allocate any transmission channel to the signal supply source on the basis of the signal supply destination information.

8. An audio system including a control device, a plurality of devices and an audio network connecting the plurality of devices, each of the plurality of devices having at least one of a plurality of signal supply sources and a plurality of signal supply destinations, the audio network having a plurality of transmission channels for transmitting audio signals of a plurality of channels between the plurality of devices, each of said plurality of devices comprising:

a reservation section which reserves a plurality of the transmission channels;

a storage section which has stored therein signal supply destination information pertaining to a signal supply source possessed by said device and signal supply source information pertaining to a signal supply destination possessed by said device;

a transmission setting section which, on the basis of the signal supply destination information stored in said storage section, allocates one of the transmission channels, reserved by said reservation section, to a signal supply source possessed by said device and makes a setting for outputting an audio signal, supplied from the signal supply source, via the transmission channel allocated to the signal supply source;

an output notification section which notifies another device on the network of signal output information indicative of the signal supply source of the audio signal being outputted by said device via the allocated one of the transmission channels reserved for the device by said reservation section;

a reception setting section which, on the basis of the signal supply source information stored in said storage section and signal output information notified by the output notification section of another of the devices and for a signal supply destination possessed by said device, determines a transmission channel via which an audio signal is to be received and makes a setting for receiving the audio signal from the determined transmission channel; and a connection updating section which sets, in response to connection setting operation by the user, a connection between a signal supply source possessed by said device and a signal supply destination possessed by another of the devices or between a connection between a signal supply destination possessed by said device and a signal supply source possessed by another of the devices and updates, in accordance with content of the set connection, the signal supply destination information and the signal supply source information stored in said storage section of said device.

9. The audio system as claimed in claim 8, wherein said control device further comprises:

a storage section which stores connection information indicative of the connection set by said connection setting section;

an identification section which identifies a predetermined signal supply source in a predetermined one of said plurality of devices; and a synchronization section which, when said control device has been newly connected to said audio system in operation, 1) updates, on the basis of the connection information stored in said storage section, all of the signal supply destination information and the signal supply source information, stored in respective ones of the storage sections of said plurality of devices, except for the signal supply destination information and the signal supply source information pertaining to the signal supply source identified by said identification section and 2) updates the connection information, stored in said storage section of said control device, on the basis of the signal supply destination information and the signal supply source information pertaining to the signal supply source identified by said identification section.

10. The audio system as claimed in claim 8, wherein said control device further comprises:

a storage section which stores connection information indicative of the connection set by said connection setting section;

an identification section which identifies predetermined two devices, from among said plurality of devices, possessing a signal supply source and a signal supply destination, respectively, for which a connection has been set by said connection setting section; and a synchronization section which, when said control device has been newly connected to said audio system in operation, 1) updates, on the basis of the connection information stored in said storage section, all of the signal supply destination information and the signal supply source information, stored in respective ones of the storage sections of said plurality of devices, except for the signal supply destination information and the signal supply source information pertaining to the connection between the two devices identified by said identification section and 2) updates the connection information, stored in said storage section of said control device, on the basis of the signal supply destination information and the signal supply source information pertaining to the connection between the two devices identified by said identification section.

11. The audio system as claimed in claim 8, wherein said control device further comprises:

a storage section which stores connection information indicative of the connection set by said connection setting section;

an identification section which identifies predetermined two devices, from among said plurality of devices, possessing a signal supply source and a signal supply destination, respectively, for which a connection has been set by said connection setting section; and a synchronization section which, when said control device has been newly connected to said audio system in operation, 1) updates, on the basis of the connection information stored in said storage section, all of the signal supply destination information and the signal supply source information, stored in respective ones of the storage sections of said plurality of devices, except for the signal supply destination information and the signal supply source information pertaining to the connection between the two devices identified by said identification section and 2) updates the connection information, stored in said storage section of said control device, on the basis of all information except for the signal supply destination information and the signal supply source information pertaining to the connection between the two devices identified by said identification section.

12. An audio system including a control device, a plurality of devices and an audio network connecting the plurality of devices, each of the plurality of devices having at least one of a plurality of signal supply sources and a plurality of signal supply destinations, the audio network having a plurality of transmission channels for transmitting audio signals of a plurality of channels between the plurality of devices, said control device comprising:

a priority setting section which sets a given one of the plurality of signal supply sources of each of the devices at a higher priority than any other signal supply source of the device, each of said plurality of devices comprising:

a reservation section which reserves a plurality of the transmission channels;

a storage section which has stored therein signal supply destination information pertaining to a signal supply source possessed by said device and signal supply source information pertaining to a signal supply destination possessed by said device;

a transmission setting section which, on the basis of the signal supply destination information stored in said storage section, allocates one of the transmission channels, reserved for the device by said reservation section, to a signal supply source possessed by said device and makes a setting for outputting an audio signal, supplied from the signal supply source, via the transmission channel allocated to the signal supply source, said transmission setting section allocating one of the transmission channels to the signal supply source, set at the higher priority by said priority setting section, with a priority over the other signal supply source;

an output notification section which notifies another device on the network of signal output information indicative of the signal supply source of the audio signal being outputted by said device via the allocated one of the transmission channels reserved for the device by said reservation section; and a reception setting section which, on the basis of the signal supply source information stored in said storage section and signal output information notified by the output notification section of another of the devices and for a signal supply destination possessed by said device, determines a transmission channel via which an audio signal is to be received and makes a setting for receiving the audio signal from the determined transmission channel.

13. The audio system as claimed in claim 12, wherein said transmission setting section of each of the devices further comprises a cancellation section which cancels allocation of the already allocated transmission channels except for the transmission channel allocated to the signal supply source set at the higher priority, and wherein said reservation section of each of the devices is arranged in such a manner that, when the allocation of the already allocated transmission channels has been canceled by said transmission setting section of the device, said reservation section releases the transmission channels, for which the allocation has been canceled, from reservation for the device.

\* \* \* \* \*